United States Patent
Cohen et al.

(10) Patent No.: US 9,747,426 B2
(45) Date of Patent: *Aug. 29, 2017

(54) HANDLING MASQUERADING ELEMENTS

(71) Applicant: SEARETE LLC, Bellevue, WA (US)

(72) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Lowell L. Wood, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,857

(22) Filed: Oct. 4, 2013

(65) Prior Publication Data

US 2014/0165211 A1 Jun. 12, 2014

Related U.S. Application Data

(63) Continuation-in-part of application No. 11/515,495, filed on Aug. 31, 2006, now Pat. No. 8,640,248, which is a continuation-in-part of application No. 11/515,221, filed on Aug. 31, 2006, now Pat. No. 8,555,396, which is a continuation-in-part of
(Continued)

(51) Int. Cl.
*G06F 21/10* (2013.01)
*G06F 21/16* (2013.01)
*G06F 21/57* (2013.01)
*H04K 1/10* (2006.01)

(52) U.S. Cl.
CPC .............. *G06F 21/16* (2013.01); *G06F 21/10* (2013.01); *G06F 21/577* (2013.01); *H04K 1/10* (2013.01)

(58) Field of Classification Search
CPC ........ G06F 21/10; G06F 21/16; G06F 21/577; H04K 1/10
See application file for complete search history.

(56) References Cited

U.S. PATENT DOCUMENTS

| 5,606,609 A | 2/1997 | Houser et al. |
| 5,822,435 A * | 10/1998 | Boebert et al. ............... 713/192 |
| 5,862,260 A | 1/1999 | Rhoads |

(Continued)

OTHER PUBLICATIONS

Dhamija, Rachna et al., "The Battle Against Phishing: Dynamic Security Skins", Usable Privacy and Securi ty (SOUPS) 2005, Jul. 6-8, 2005, pp. 77-88.*

(Continued)

*Primary Examiner* — Michael Pyzocha

(57) ABSTRACT

Embodiments include a method, a computing device, and a computer program product. An embodiment provides a method implemented in a computing environment. The method includes receiving a designation of an individualized digital identifier. The method also includes associating a human-perceptible form of the designated individualized digital identifier with each element of a group of human-perceivable elements displayed by the computing environment.

34 Claims, 49 Drawing Sheets

Related U.S. Application Data application No. 11/515,375, filed on Aug. 31, 2006, now Pat. No. 8,327,155.

(56) References Cited

U.S. PATENT DOCUMENTS

| | | | |
|---|---|---|---|
| 5,918,223 | A | 6/1999 | Blum et al. |
| 5,943,422 | A | 8/1999 | Van Wie et al. |
| 6,018,724 | A * | 1/2000 | Arent .................. G06F 21/645 705/39 |
| 6,072,489 | A * | 6/2000 | Gough et al. ................. 715/803 |
| 6,131,162 | A | 10/2000 | Yoshiura et al. |
| 6,345,256 | B1 | 2/2002 | Milsted et al. |
| 6,577,746 | B1 | 6/2003 | Evans et al. |
| 6,600,571 | B1 | 7/2003 | Ito |
| 6,614,914 | B1 | 9/2003 | Rhoads et al. |
| 6,965,682 | B1 | 11/2005 | Davis et al. |
| 7,027,179 | B2 | 4/2006 | Mori |
| 7,072,493 | B2 | 7/2006 | Venkatesan et al. |
| 7,302,585 | B1 * | 11/2007 | Proudler et al. .............. 713/189 |
| 7,565,535 | B2 * | 7/2009 | Roberts et al. ............... 713/168 |
| 7,831,840 | B1 * | 11/2010 | Love .................. H04L 63/1475 713/165 |
| 2002/0008703 | A1 | 1/2002 | Merrill et al. |
| 2002/0103645 | A1 * | 8/2002 | Uemura et al. ............... 704/246 |
| 2002/0104006 | A1 | 8/2002 | Boate et al. |
| 2003/0023878 | A1 | 1/2003 | Rosenberg et al. |
| 2003/0044006 | A1 | 3/2003 | Riddick et al. |
| 2003/0055737 | A1 * | 3/2003 | Pope .................... G06F 21/606 705/26.35 |
| 2003/0191967 | A1 | 10/2003 | Naccache |
| 2003/0210267 | A1 | 11/2003 | Kylberg et al. |
| 2004/0015512 | A1 | 1/2004 | Ashe et al. |
| 2004/0083369 | A1 | 4/2004 | Erlingsson et al. |
| 2005/0091486 | A1 * | 4/2005 | Avraham et al. ............. 713/162 |
| 2005/0091661 | A1 * | 4/2005 | Kurien .................... G06F 21/53 719/310 |
| 2005/0149726 | A1 | 7/2005 | Joshi et al. |
| 2005/0172229 | A1 * | 8/2005 | Reno et al. .................... 715/700 |
| 2005/0204165 | A1 | 9/2005 | Nason et al. |
| 2005/0204335 | A1 * | 9/2005 | Mercer .................... G06F 17/50 717/113 |
| 2005/0275661 | A1 * | 12/2005 | Cihula et al. ................. 345/619 |
| 2006/0015722 | A1 * | 1/2006 | Rowan ................ H04L 63/0823 713/166 |
| 2006/0120559 | A1 | 6/2006 | Levy |
| 2006/0157559 | A1 * | 7/2006 | Levy ...................... G06K 17/00 235/380 |
| 2006/0161629 | A1 * | 7/2006 | Cohen et al. ................. 709/206 |
| 2006/0161987 | A1 | 7/2006 | Levy-Yurista |
| 2006/0170669 | A1 * | 8/2006 | Walker .................. G06F 3/0362 345/418 |
| 2006/0178902 | A1 | 8/2006 | Vicars et al. |
| 2006/0218399 | A1 | 9/2006 | FitzGerald et al. |
| 2006/0253584 | A1 * | 11/2006 | Dixon .................... G06Q 30/02 709/225 |
| 2006/0259873 | A1 * | 11/2006 | Mister .......................... 715/781 |
| 2007/0028113 | A1 * | 2/2007 | Moskowitz ................... 713/176 |
| 2008/0059801 | A1 | 3/2008 | Cohen et al. |
| 2008/0059802 | A1 * | 3/2008 | Cohen et al. ................. 713/176 |
| 2008/0072286 | A1 * | 3/2008 | Cohen et al. ..................... 726/2 |

OTHER PUBLICATIONS

Dhamija, Rachna et al. "The Battle Against Phishing: Dynamic Security Skins", Symposium on Usable Privacy and Security (SOUPS) 2005, Jul. 6-8, 2005, Pittsburgh, PA, USA, pp. 77-88.*
Qi, Fang et al., "Preventing Web-Spoofing with Automatic Detecting Security Indicator", ISPEC 2006, LNCS 3903, pp. 112-122.*
"Alert dialog box"; Wikipedia; pp. 1-2; bearing date Jun. 21, 2006; printed on Jul. 12, 2006; located at http://en.wikipedia.org/wiki/Alert_dialog_box; Wikimedia Foundation, Inc.
"API"; Computer Desktop Encyclopedia; bearing dates of 1981-2005 and 2005; pp. 1-3; Ver. 18.4, 4$^{th}$ Quarter; printed on Jul. 31, 2006; The Computer Language Company Inc.
"dialog box"; Computer Desktop Encyclopedia; pp. 1; bearing dates of 1981-2005; printed on Jul. 12, 2006; the Computer Language Company Inc.; Ver. 18.4, 4$^{th}$ Quarter 2005.
"dialog box"; Webopedia; bearing dates of Dec. 4, 2002 and 2006; pp. 1-3; printed on Jul. 12, 2006; located at http://webopedia.com/TERM/D/dialog_box.html; Jupitermedia Corporation.
"Dialog box"; Wikipedia; pp. 1-2; bearing date Jun. 25, 2006; printed on Jul. 12, 2006; located at http://en.wikipedia.org/wiki/Dialog_box; Wikimedia Foundation, Inc.
"digital watermark"; Computer Desktop Encyclopedia; pp. 1; bearing dates of 1981-2005; printed on Jul. 12, 2006; the Computer Language Company Inc.; Ver. 18.4, 4$^{th}$ Quarter 2005.
"digital watermark"; Webopedia; bearing dates of Oct. 27, 2003 and 2006; pp. 1-3; printed on Aug. 22, 2006; located at http://webopedia.com/TERM/D/digital_watermark.html; Jupitermedia Corporation.
"Digital watermarking"; Wikipedia; pp. 1-2; bearing date Aug. 15, 2006; Aug. 22, 2006; located at http://en.wikipedia.org/wiki/Digital_watermarking; Wikimedia Foundation, Inc.
"GUI"; Computer Desktop Encyclopedia; bearing dates of 1981-2005 and 2005; pp. 1-3; Ver. 18.4, 4$^{th}$ Quarter; The Computer Language Company Inc.
"How does it work"; Norman:Antivirus | Firewall | Network security; pp. 1-2; printed on Aug. 2, 2006; located at http://www.norman.com/Virus/Sandbox/20374/en-us.
"Multiple Browsers Window Injection Vulnerability Test"; Secunia; pp. 1-2; printed on Jul. 14, 2006; located at http://secunia.com/multiple_browsers_window_injection_vulnerability_test/.
Netscape Communicator "'Window spoofing Security Bug'"; Netscape Communicator 4.5 window spoofing bug; pp. 1; printed on Jul. 14, 2006; located at http://www.guninski.com/b14.html.
"Norman SandBox Pro-active virus protection"; Norman; pp. 1-2; printed on Aug. 2, 2006; located at http://www.norman.com/.
"Norman Virus Control 5.8"; Free Downloads Center; pp. 1; printed located at http://www.freedownloadscenter.com/Utilities/Anti-Virus_Utilities/Norman_Virus_Control.html.
"Norman's SandBox Technology Protects Against Latest Virus Outbreaks"; e-consultancy—Press Release; bearing a date of Jul. 28, 2004; pp. 1-2; printed on Aug. 2, 2006; located at http://www.e-consultancy.com/news-blog/156926/norman-s-sandbox-technology-protects-against-latest-virus-outbreaks.html.
"Overview"; GreenBorder Technology; bearing a date of 2006; pp. 1; printed on Aug. 3, 2006; Green Border Technologies, Inc.; located at http://greenborder.com/technology/.
"Shop, Bank and Surf the Internet—in Total Safety & Privacy"; GreenBorder; bearing a date of 2006; pp. 1; printed on Aug. 3, 2006; Green Border Technologies, Inc.; located at http://greenborder.com/consumer/.
"User Interface"; Human Machine Interface; bearing a date of 2005; pp. 1-4; Farlex, Inc.; printed on Aug. 7, 2006; located at http://encyclopedia.thefreedictionary.com/Human+Machine+Interface.
"Window (computing)"; Wikipedia; pp. 1-3; printed on Jul. 17, 2006; located at: http://en.wikipedia.org/wiki/Window_%28computing%29.
"window"; Computer Desktop Encyclopedia; bearing dates of 1981-2005 and 2005; pp. 1; Ver. 18.4, 4$^{th}$ Quarter; printed on Aug. 7, 2006; The Computer Language Company Inc.
Felten, Edward W.; Balfanz, Dirk; Dean, Drew; Wallach, Dan S.; "Web Spoofing an Internet Con Game"; Technical Report 540-96; pp. 1-9; printed on Jul. 14, 2006; located at http://bau2.uibk.ac.at/matic/spoofing.htm; Princeton University.
He, Dajun; Sun, Qibin; Tian, Qi; "A Semi-Fragile Object Based Video Authentication System"; IEEE; bearing date 2003; pp. 814-817; Media Engineering.
Intellectual Property Office Examination Report Under Section 18(3); App. No. GB0904765.5; Oct. 27, 2010; pp. 1-3.
Intellectual Property Office Examination Report Under Section 18(3); App. No. GB0904767.1; Nov. 3, 2010; pp. 1-3.
Intellectual Property Office Search Report Under Section 18(3); App. No. GB0904764.8; Oct. 5, 2010; pp. 1-3.
International Search Report and Written Opinion for International Application PCT/US2007/19243, Aug. 31, 2007.

(56) References Cited

OTHER PUBLICATIONS

International Search Report and Written Opinion for International Application PCT/US2007/18886, Aug. 27, 2007.
Vibber, Kelson; Foreman, Katherine; "Stealing pop-ups from your bank"; K-Squared Ramblings; bearing dates Dec. 8, 2004 and 2002-2006; pp. 1-2; printed on Jul. 14, 2006; located at http://www.hyperborea.org/journal/archives/2004/12/08/stealing-pop-ups-from-your-bank/; WordPress.

* cited by examiner

505 A computer-readable signal-bearing medium bearing the program instructions.

510 Program instructions operable to perform a process in a computing device of a computing environment, the process including:
  receiving an indication of a selected watermark;
  allowing an operating system privileges in the selected watermark; and
  associating a visible manifestation of the selected watermark with each visual area of at least two human-visual areas generated for displaying an output of the operating system.

512 The allowing an operating system privileges in the selected watermark further includes:
  allowing an operating system full privileges in the selected watermark and allowing another program limited privileges in the selected watermark.

514 The allowing an operating system privileges in the selected watermark further includes:
  allowing an operating system full privileges in the selected watermark and allowing another program read-only privileges in the selected watermark.

522 The computer-readable signal-bearing medium includes a computer storage medium.

524 The computer-readable signal-bearing medium includes a communication medium.

1105 A computer-readable signal-bearing medium bearing the program instructions.

1110 Program instructions operable to perform a process in a computing device, the process including:
receiving a designation of an individualized digital identifier;
restricting access to the designated individualized digital identifier to an operating system program; and
associating a human-perceptible form of the designated individualized digital identifier with each human-perceivable element of a group of elements displayed in response to the operating system program of the computing device.

1112 The group of human-perceivable elements displayed includes at least one of a window, a content, a streaming content, a presentation, a facsimile, an avatar, a gif, a button, and/or a bit map.

1122 The computer-readable signal-bearing medium includes a computer storage medium.

1124 The computer-readable signal-bearing medium includes a communication medium.

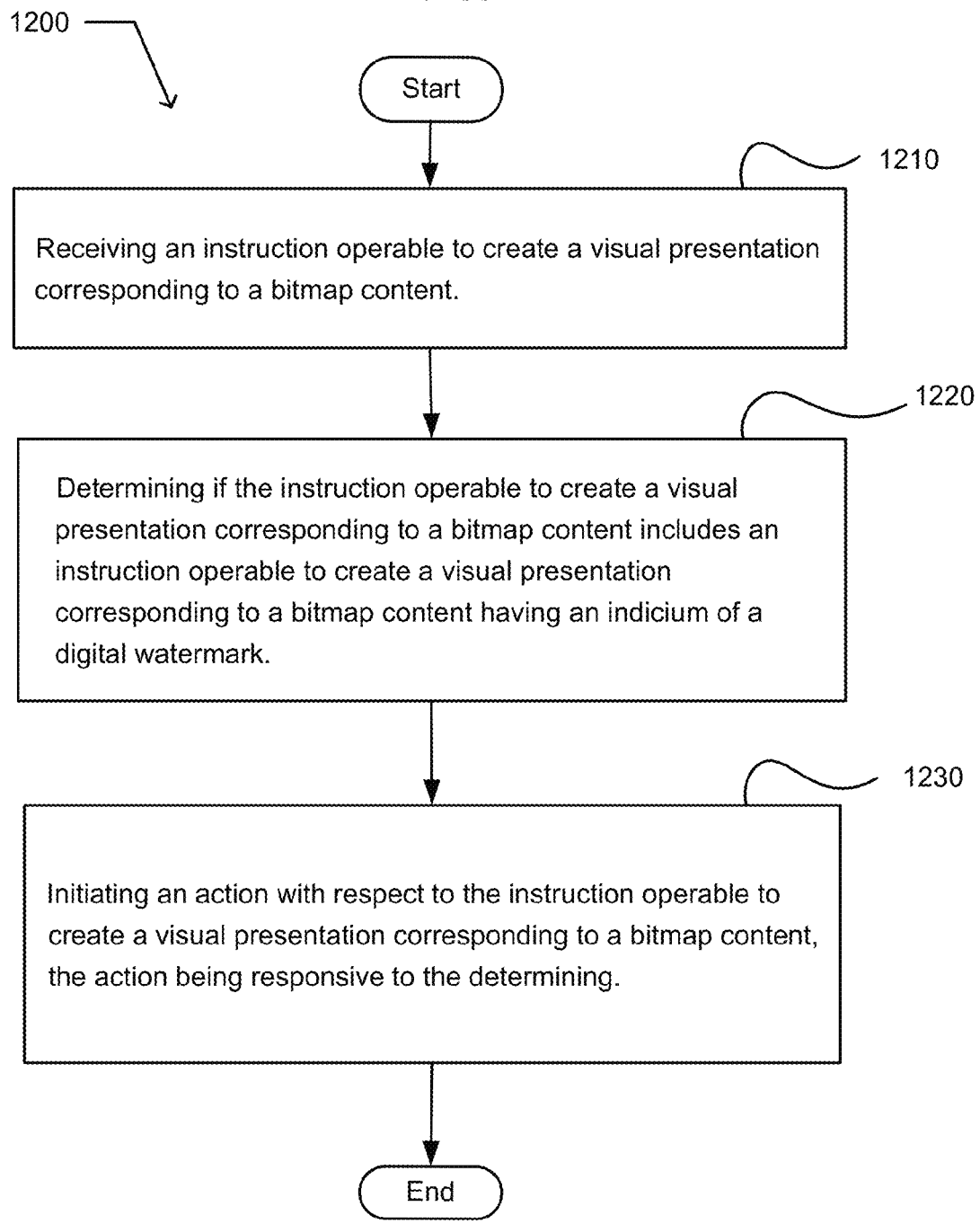

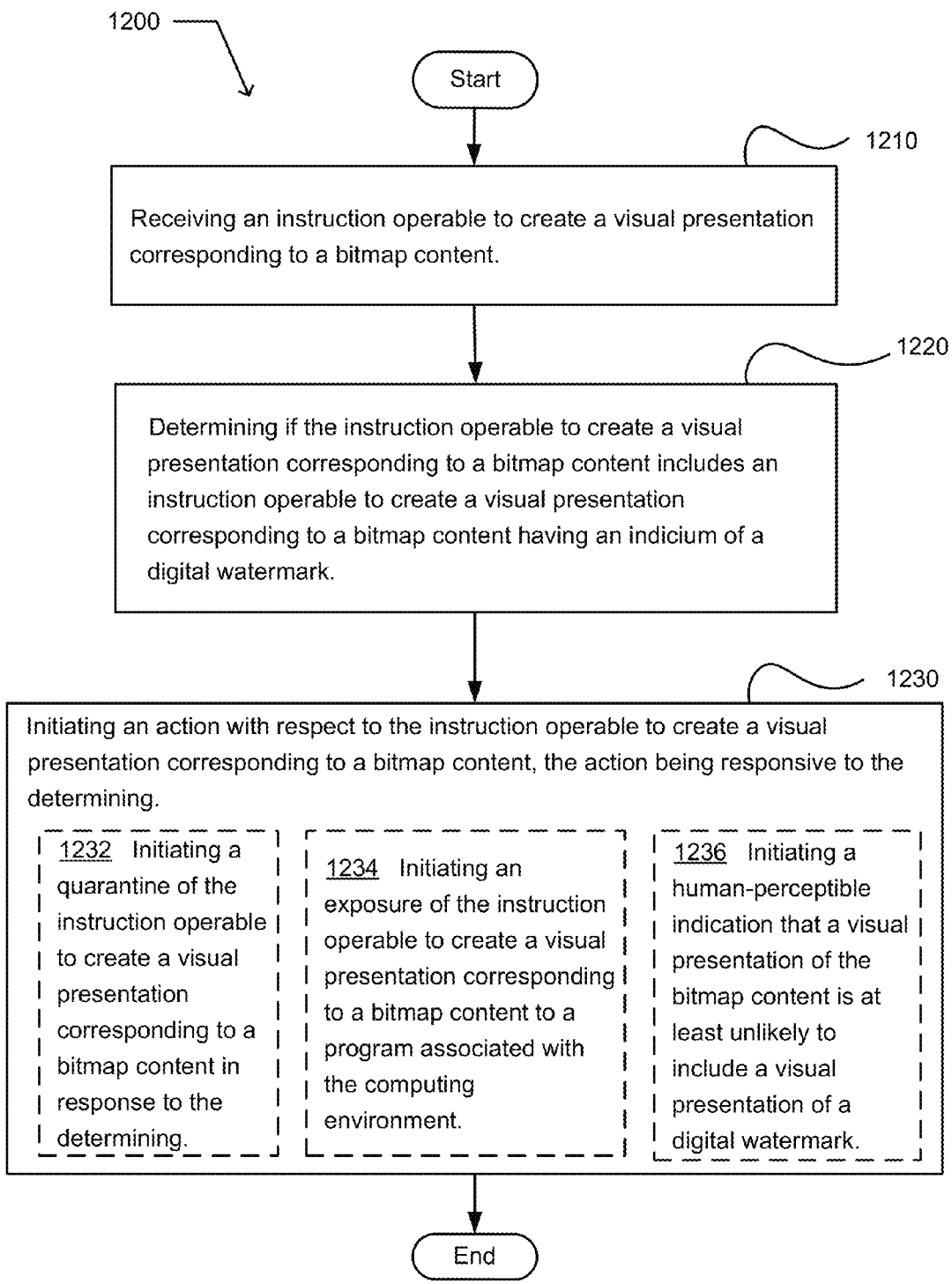

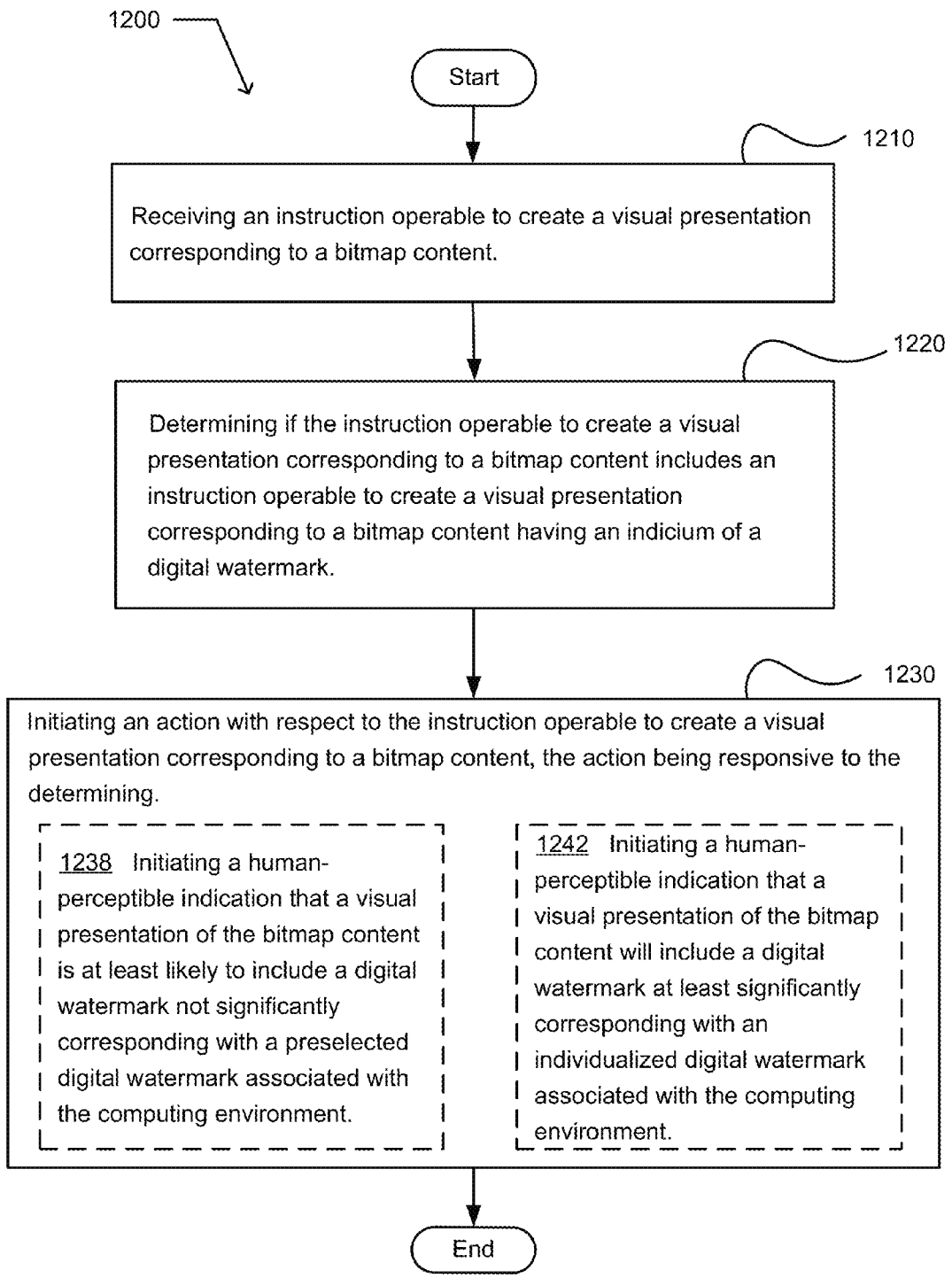

1405 A computer-readable signal-bearing medium bearing the program instructions.

1410 Program instructions operable to perform a process in a computing device of a computing environment, the process including:
  receive an instruction operable to create a visual presentation corresponding to a bitmap content;
  determine if the instruction operable to create a visual presentation corresponding to a bitmap content includes an instruction operable to create a visual presentation corresponding to a bitmap content having an indicium of a digital watermark; and
  initiate an action with respect to the instruction operable to create a visual presentation corresponding to a bitmap content in response to the determining.

1422 The computer-readable signal-bearing medium includes a computer storage medium.

1424 The computer-readable signal-bearing medium includes a communication medium.

FIG. 43

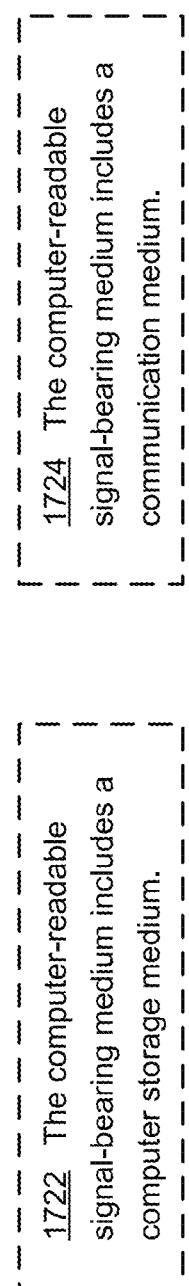

1700

1705 A computer-readable signal-bearing medium bearing the program instructions.

1710 Program instructions operable to perform a process in a computing device of a computing environment, the process including:
  receive an instruction to create a visual presentation corresponding to a bitmap content;
  determining if the instruction to create a visual presentation corresponding to a bitmap content includes an instruction to create a visual presentation corresponding to a bitmap content having an indicium of a digital watermark; and
  if the instruction to create a visual presentation corresponding to a bitmap content does not include an instruction to create a visual presentation corresponding to a bitmap content having an indicium of a digital watermark, displaying a human-understandable notification reflecting an absence of a digital watermark.

1722 The computer-readable signal-bearing medium includes a computer storage medium.

1724 The computer-readable signal-bearing medium includes a communication medium.

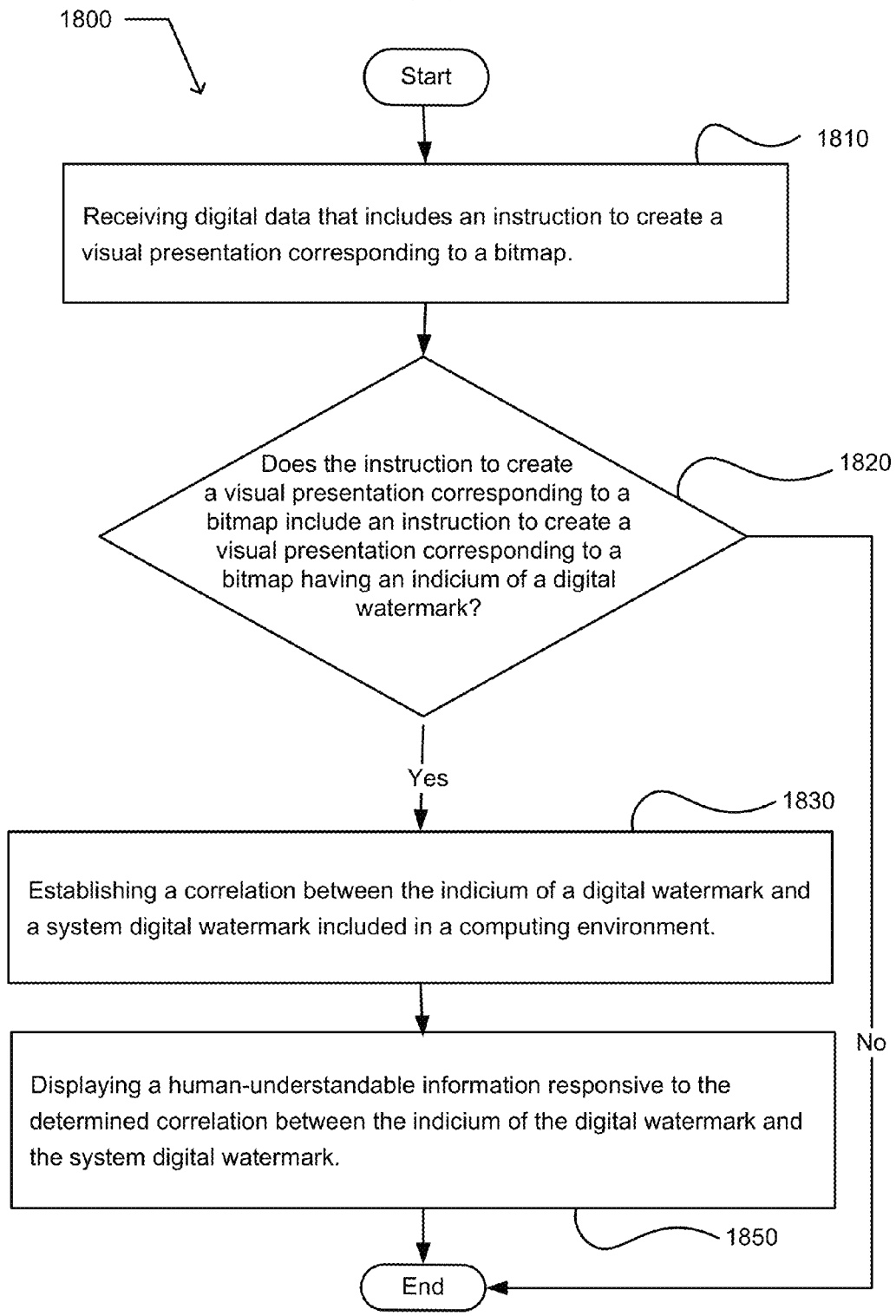

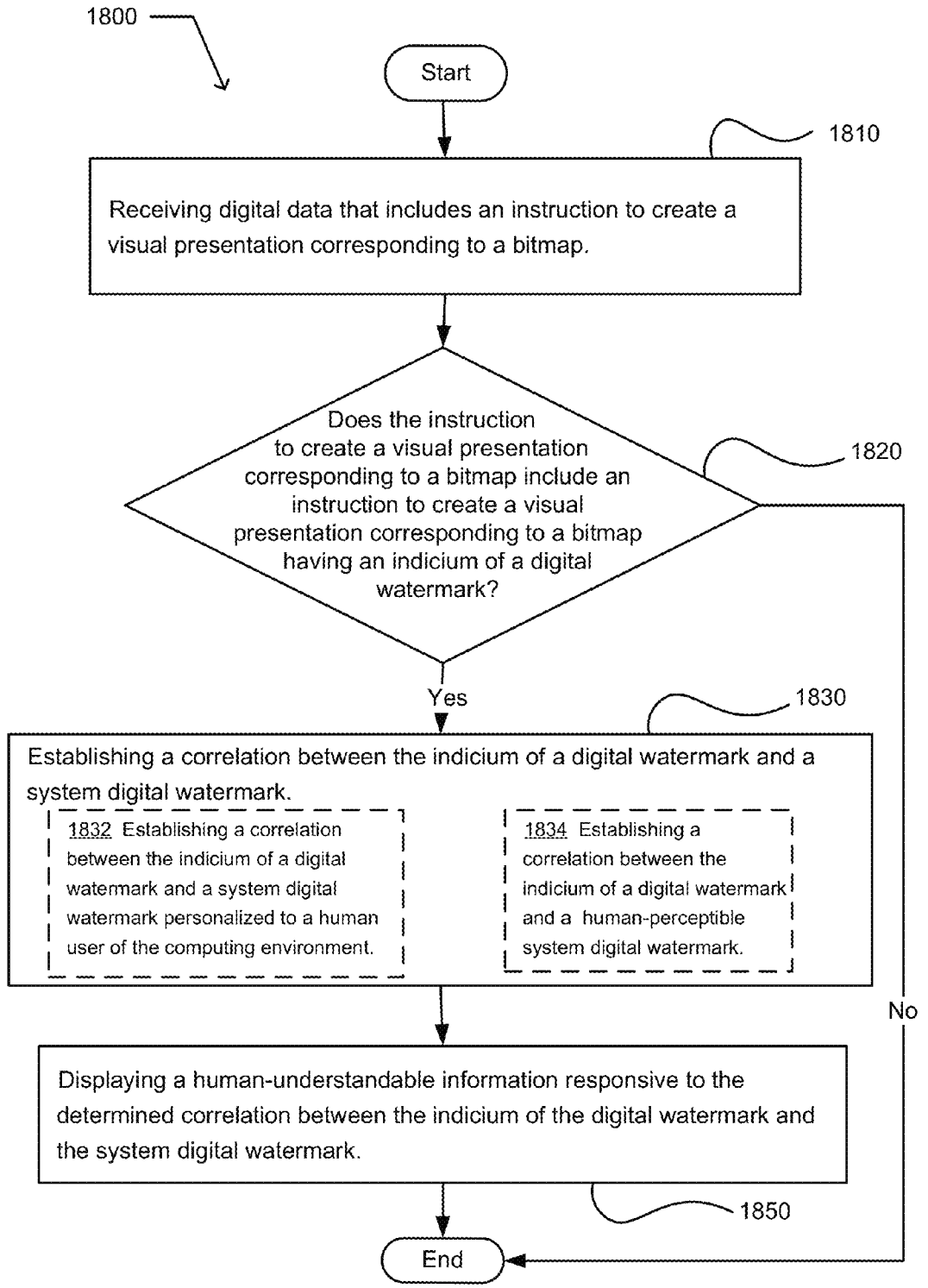

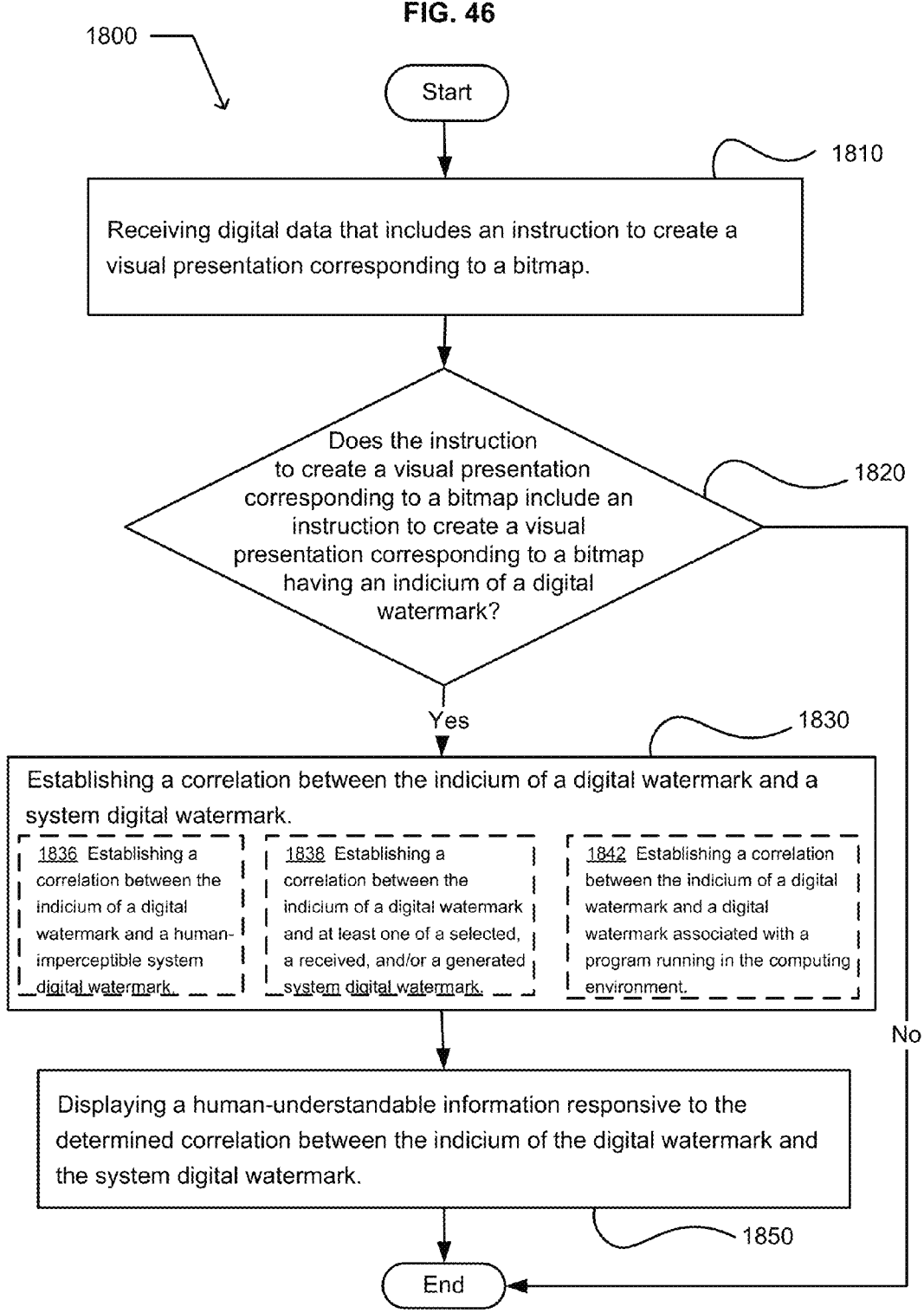

1905 A computer-readable signal-bearing medium bearing the program instructions.

1910 Program instructions operable to perform a process in a computing device of a computing environment, the process including:
  receiving digital data that includes an instruction to create a visual presentation corresponding to a bitmap;
  determining if the instruction to create a visual presentation corresponding to a bitmap includes an instruction to create a visual presentation corresponding to a bitmap having an indicium of a digital watermark; and
  if the instruction to create a visual presentation corresponding to a bitmap having an indicium of a digital watermark,
    establishing a correlation between the indicium of a digital watermark and a system digital watermark of a computing environment that includes the computing device, and
    displaying a human-understandable information responsive to the determined correlation between the indicium of the digital watermark and the system digital watermark.

1922 The computer-readable signal-bearing medium includes a computer storage medium.

1924 The computer-readable signal-bearing medium includes a communication medium.

HANDLING MASQUERADING ELEMENTS

If an Application Data Sheet (ADS) has been filed on the filing date of this application, it is incorporated by reference herein. Any applications claimed on the ADS for priority under 35 U.S.C. §§119, 120, 121 or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States Patent application entitled HANDLING MASQUERADING ELEMENTS, naming Alexander J. Cohen, Edward K. Y. Jung, Royce A. Levien, Robert W. Lord, Mark A. Malamud, William Henry Mangione-Smith, John D. Rinaldo, Jr. and Lowell L. Wood, Jr. as inventors, U.S. Ser. No. 11/515,495, filed Aug. 31, 2006.

For purposes of the USPTO extra-statutory requirements, the present application constitutes a continuation-in-part of United States Patent application entitled AUTHENTICATABLE DISPLAYED CONTENT, naming Alexander J. Cohen, Edward K. Y. Jung, Royce A. Levien, Robert W. Lord, Mark A. Malamud, William Henry Mangione-Smith, John D. Rinaldo, Jr. and Lowell L. Wood, Jr. as inventors, U.S. Ser. No. 11/515,221, filed Aug. 31, 2006.

For purposes of the USPTO extra-statutory requirements, the present application constitutes a continuation-in-part of United States Patent application entitled SCREENING FOR MASQUERADING CONTENT, naming Alexander J. Cohen, Edward K. Y. Jung, Royce A. Levien, Robert W. Lord, Mark A. Malamud, William Henry Mangione-Smith, John D. Rinaldo, Jr. and Lowell L. Wood, Jr. as inventors, U.S. Ser. No. 11/515,375, filed Aug. 31, 2006.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a method implemented in a computing environment. The method includes receiving an indication of a selected watermark. The method also includes incorporating a human-perceivable manifestation of the selected watermark in each visual area of at least two human-visual areas displaying an output of an authorized program running in the computing environment. In addition to the foregoing, other method embodiments are described in the claims, drawings, and text that form a part of the present application.

Another embodiment provides a method implemented in a computing environment. The method includes receiving an indication of a selected watermark, and restricting access to the selected watermark to an authorized program running in the computing environment. The method also includes incorporating a human-perceivable manifestation of the selected watermark in each visual area of at least two human-visual areas displaying an output of an authorized program running in the computing environment. The method may include suppressing a visual area displaying an output that does not include the selected watermark in response to a received a human-initiated input. The method may further include automatically suppressing a visual area displaying an output that does not include the selected watermark. In addition to the foregoing, other method embodiments are described in the claims, drawings, and text that form a part of the present application.

A further embodiment provides a computing device. The computing device includes an information store configured by computer program that includes computer program instructions. The computer program instructions are operable to perform a process in a computer processor. The process including receiving an indication of a selected watermark, and allowing a control program privileges in the selected watermark. The process further including associating human-perceivable manifestation of the selected watermark with each visual area of at least two visual areas generated for a human viewable display of an output of the operating system. The computing device may further include a display surface operable to display each visual area of at least two visual areas generated for a human viewing of an output of the operating system. The computing device may also include a user interface operable to receive an indication of the selected watermark in response to a user action. In addition to the foregoing, other computing device embodiments are described in the claims, drawings, and text that form a part of the present application.

An embodiment provides a computer program product. The computer program product includes a computer-readable signal-bearing medium bearing program instructions. The program instructions are operable to perform a process in a computing device of a computing environment. The process includes receiving an indication of a selected watermark, and allowing an operating system privileges in the selected watermark. The process also includes associating a visible manifestation of the selected watermark with each visual area of at least two human-visual areas generated for displaying an output of the operating system. In addition to the foregoing, other computer program product embodiments are described in the claims, drawings, and text that form a part of the present application.

Another embodiment provides a method implemented in a computing environment. The method includes receiving a designation of an individualized digital identifier. The method also includes associating a human-perceptible form of the designated individualized digital identifier with each element of a group of human-perceivable elements displayed by the computing environment. In addition to the foregoing, other method embodiments are described in the claims, drawings, and text that form a part of the present application.

A further embodiment provides a method implemented in a computing environment. The method includes receiving a designation of an individualized digital identifier, and restricting access to the designated individualized digital identifier to a trusted program. The method also includes associating a human-perceptible form of the designated individualized digital identifier with each element of a group of human-perceivable elements displayed in response to the trusted program by the computing environment. The method may include scanning an element displayed by the computing environment for a presence of the designated individualized digital identifier, and broadcasting a human recognizable notification if the individualized digital identifier is not associated with the element. In addition to the foregoing, other method embodiments are described in the claims, drawings, and text that form a part of the present application.

An embodiment provides a computing device. The computing device includes a display operable to visually present each element of the group of elements to a human user and an information store configurable by a computer program. The computer program includes instructions operable to perform a process in a processor. The process includes receiving a designation of an individualized digital identifier, and limiting access to the designated individualized digital identifier to an application programming interface callable by a privileged code. The process also includes associating a human-perceptible form of the designated individualized digital identifier with each element of a group of elements displayed in response to a program running in the computing device. In addition to the foregoing, other computing device embodiments are described in the claims, drawings, and text that form a part of the present application.

Another embodiment provides a computer program product. The computer program product includes a computer-readable signal-bearing medium bearing program instructions. The program instructions are operable to perform a process in a computing device. The process includes receiving a designation of an individualized digital identifier, and restricting access to the designated individualized digital identifier to an operating system program. The process also includes associating a human-perceptible form of the designated individualized digital identifier with each human-perceivable element of a group of elements displayed in response to the operating system program of the computing device. In addition to the foregoing, other computer program product embodiments are described in the claims, drawings, and text that form a part of the present application.

A further embodiment provides a method. The method includes receiving an instruction operable to create a visual presentation corresponding to a bitmap content. The method also includes determining if the instruction operable to create a visual presentation corresponding to a bitmap content includes an instruction operable to create a visual presentation corresponding to a bitmap content having an indicium of a digital watermark. The method further includes initiating an action with respect to the instruction operable to create a visual presentation corresponding to a bitmap content, the action being responsive to the determining. In addition to the foregoing, other method embodiments are described in the claims, drawings, and text that form a part of the present application.

An embodiment provides a computing device. The computing device includes an information store configured by a computer program that includes computer program instructions. The computer program instructions are operable to perform a process in a computer processor. The process includes receiving an instruction to create a visual presentation corresponding to a bitmap content. The process also includes determining if the instruction to create a visual presentation corresponding to a bitmap content includes an instruction to create a visual presentation corresponding to a bitmap content having an indicium of a digital watermark. The process further includes initiating an action with respect to the instruction to create a visual presentation corresponding to a bitmap content, the action being responsive to the determining. In addition to the foregoing, other computing device embodiments are described in the claims, drawings, and text that form a part of the present application.

Another embodiment provides a computer program product. The computer program product includes a computer-readable signal-bearing medium bearing program instructions. The program instructions are operable to perform a process in a computing device of a computing environment. The process includes receiving an instruction operable to create a visual presentation corresponding to a bitmap content. The process also includes determining if the instruction operable to create a visual presentation corresponding to a bitmap content includes an instruction operable to create a visual presentation corresponding to a bitmap content having an indicium of a digital watermark. The process further includes initiating an action with respect to the instruction operable to create a visual presentation corresponding to a bitmap content in response to the determining. The computer-readable signal-bearing medium may include a computer storage medium. The computer-readable signal-bearing medium may include a communication medium. In addition to the foregoing, other computer program product embodiments are described in the claims, drawings, and text that form a part of the present application.

A further embodiment provides a method implemented in a computing environment. The method includes receiving an instruction to create a visual presentation corresponding to a bitmap content. The method also includes determining if the instruction to create a visual presentation corresponding to a bitmap content includes an instruction to create a visual presentation corresponding to a bitmap content having an indicium of a digital watermark. If the instruction to create a visual presentation corresponding to a bitmap content does not include an instruction to create a visual presentation corresponding to a bitmap content having an indicium of a digital watermark, the method includes displaying a human-understandable notification reflecting an absence of a digital watermark. In addition to the foregoing, other computing device embodiments are described in the claims, drawings, and text that form a part of the present application.

An embodiment provides a computing device. The computing device includes means for receiving an instruction to create a visual presentation corresponding to a bitmap content. The computing device also includes means for determining if the instruction to create a visual presentation corresponding to a bitmap content includes an instruction to create a visual presentation corresponding to a bitmap content having an indicium of a digital watermark. The computing device further includes means for displaying a human-understandable notification reflecting an absence of a digital watermark if the instruction to create a visual presentation corresponding to a bitmap content does not include an instruction to create a visual presentation corresponding to a bitmap content having an indicium of a digital watermark. In addition to the foregoing, other computing device embodiments are described in the claims, drawings, and text that form a part of the present application.

Another embodiment provides a computer program product. The computer program product includes a computer-readable signal-bearing medium bearing program instructions. The program instructions are operable to perform a process in a computing device of a computing environment. The process includes receiving an instruction to create a visual presentation corresponding to a bitmap content. The process also includes determining if the instruction to create a visual presentation corresponding to a bitmap content includes an instruction to create a visual presentation corresponding to a bitmap content having an indicium of a digital watermark. If the instruction to create a visual presentation corresponding to a bitmap content does not include an instruction to create a visual presentation corresponding to a bitmap content having an indicium of a digital watermark, the process further includes displaying a human-understandable notification reflecting an absence of a digital watermark. In addition to the foregoing, other computer program product embodiments are described in the claims, drawings, and text that form a part of the present application.

A further embodiment provides a method implemented in a computing environment that includes a system digital watermark. A human-perceptible manifestation of the system digital watermark being incorporatable in a displayable content provided by a program running in the computing environment. The method includes receiving digital data that includes an instruction to create a visual presentation corresponding to a bitmap. The method also includes determining if the instruction to create a visual presentation corresponding to a bitmap includes an instruction to create a visual presentation corresponding to a bitmap having an indicium of a digital watermark. If the instruction to create a visual presentation corresponding to a bitmap includes an instruction to create a visual presentation corresponding to a bitmap having an indicium of a digital watermark, the method includes establishing a correlation between the indicium of a digital watermark and the system digital watermark, and displaying a human-understandable information responsive to the determined correlation between the indicium of the digital watermark and the system digital watermark. If the determined measure of a correlation is below a preselected level, the method may include exposing to the program running in the computing environment the digital data that includes an instruction to create a visual presentation corresponding to a bitmap. If the determined measure of a correlation is above a preselected level, the method may include isolating from the program running in the computing environment the digital data that includes an instruction to create a visual presentation corresponding to a bitmap. In addition to the foregoing, other method embodiments are described in the claims, drawings, and text that form a part of the present application.

An embodiment provides a computer program product. The computer program product includes a computer-readable signal-bearing medium bearing program instructions. The program instructions being operable to perform a process in a computing device. The process includes receiving digital data that includes an instruction to create a visual presentation corresponding to a bitmap. The process also includes determining if the instruction to create a visual presentation corresponding to a bitmap includes an instruction to create a visual presentation corresponding to a bitmap having an indicium of a digital watermark. If the instruction to create a visual presentation corresponding to a bitmap includes an instruction to create a visual presentation corresponding to a bitmap having an indicium of a digital watermark, the process includes establishing a correlation between the indicium of a digital watermark and a system digital watermark of a computing environment that includes the computing device, and displaying a human-understandable information responsive to the determined correlation between the indicium of the digital watermark and the system digital watermark. In addition to the foregoing, other method embodiments are described in the claims, drawings, and text that form a part of the present application.

Another embodiment provides a computing device. The computing device includes means for receiving digital data that includes an instruction to create a visual presentation corresponding to a bitmap. The computing device also includes means for determining if the instruction to create a visual presentation corresponding to a bitmap includes an instruction to create a visual presentation corresponding to a bitmap having an indicium of a digital watermark. The computing device further includes means for establishing a correlation between the indicium of a digital watermark and a system digital watermark of a computing environment that includes the computing device. The computing device also includes means for displaying a human-understandable information responsive to the determined correlation between the indicium of the digital watermark and the system digital watermark. In addition to the foregoing, other computing device embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 19 illustrates an exemplary computer program product;

FIG. 35 illustrates an exemplary computer program product in which embodiments may be implemented;

FIG. 36 illustrates an exemplary operational flow implemented in a computing environment and operable to practice embodiments;

FIG. 37 illustrates an alternative embodiment of the exemplary operational flow of FIG. 36;

FIG. 38 illustrates another alternative embodiment of the exemplary operational flow of FIG. 36;

FIG. 40 illustrates an exemplary computer program product in which embodiments may be implemented;

FIG. 43 illustrates a computer program product in which embodiments may be implemented;

FIG. 44 illustrates an exemplary operational flow implemented in a computing environment that includes a system digital watermark;

FIG. 45 illustrates an alternative embodiment of the operational flow described in conjunction with FIG. 44;

FIG. 46 illustrates a further embodiment of the operational flow described in conjunction with FIG. 44;

FIG. 48 illustrates an exemplary computer program product in which embodiments may be implemented.

DETAILED DESCRIPTION

Figure 1:
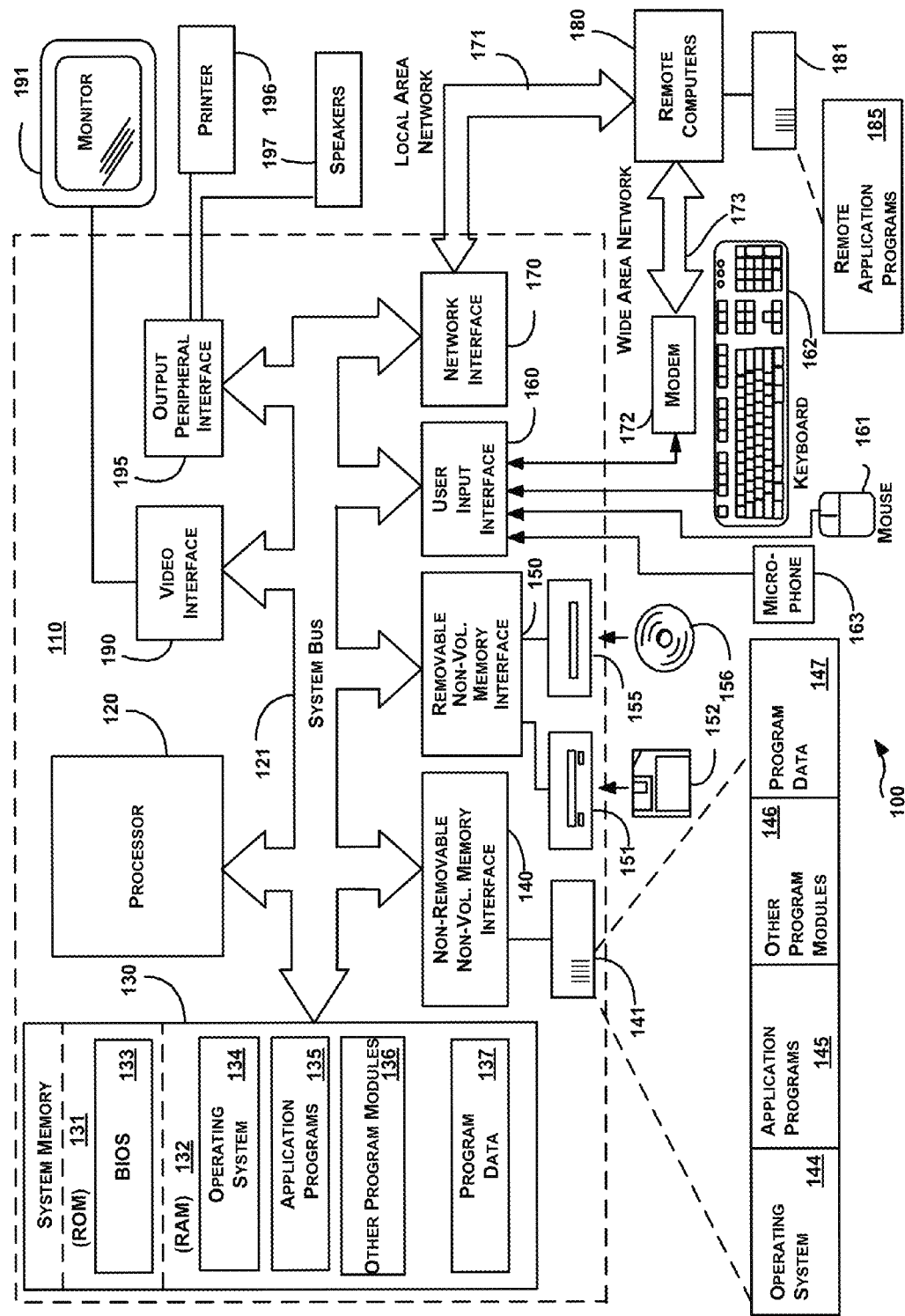
FIG. 1 illustrates an exemplary general-purpose computing system in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. In an embodiment, an information store may include a computer storage media. In a further embodiment, an information store may include a group of digital information storage devices. In another embodiment, an information store may include a quantum memory device.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
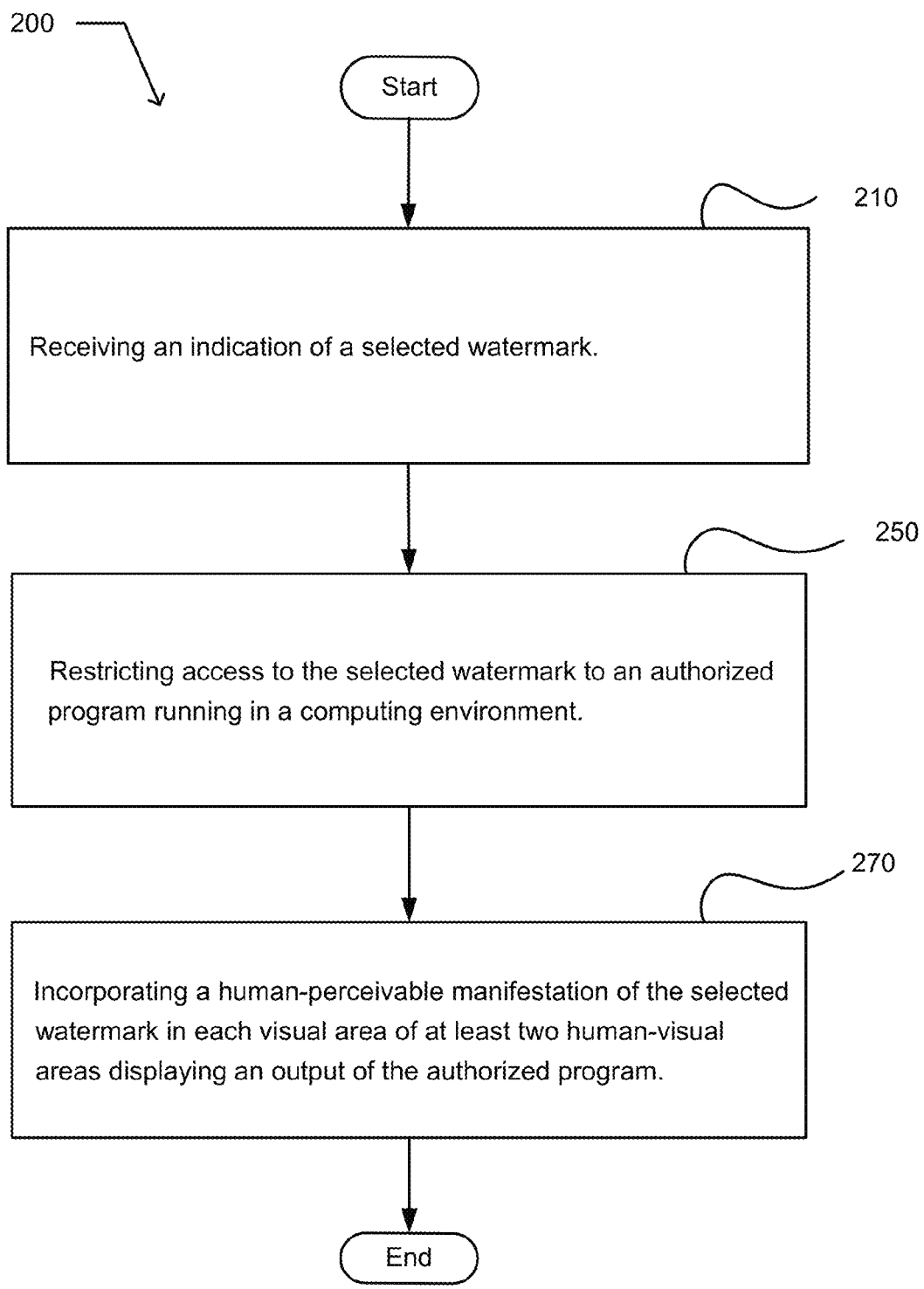
FIG. 2 illustrates an exemplary operational flow implemented in a computing environment.

FIG. 2 illustrates an exemplary operational flow 200 implemented in a computing environment. In an embodiment, the operational flow may be implemented using the computing system environment 100 of FIG. 1. After a start operation, the operational flow 200 moves to a determination operation 210. The determination operation receives an indication of a selected watermark. A rights operation 250 restricts access to the selected watermark to an authorized program running in a computing environment. In an embodiment, an authorized program may include at least two authorized programs. An integration operation 270 incorporates a human-perceivable manifestation of the selected watermark in each visual area of at least two human-visual areas displaying an output of the authorized program. The operational flow then moves to an end operation.

In an embodiment, a watermark may include a digital watermark. In another embodiment, a watermark may include a visually and/or audibly reproducible pattern of bits useful to a human user in authentication of a content and/or differentiation of one content from another content.

In an embodiment of the integration operation 270, the at least two human-visual areas may be displayed simultaneously and/or sequentially. In another embodiment, each visual area of the at least two human-visual areas may be displayed on and/or from a single physical surface. In an further embodiment, a sequential display of the at least two human-visual areas may including sequential displays temporally separated, for example, by seconds, minutes, hours, days, and/or weeks. For example, the visual areas may include at least two windows that are sequentially displayed from at least a substantially portion of a physical area of a flat screen panel display. In a further embodiment, the human-perceivable manifestation of the selected watermark is human-visually discernable in each human visual area displayed by an output of the authorized program.

Figure 3:
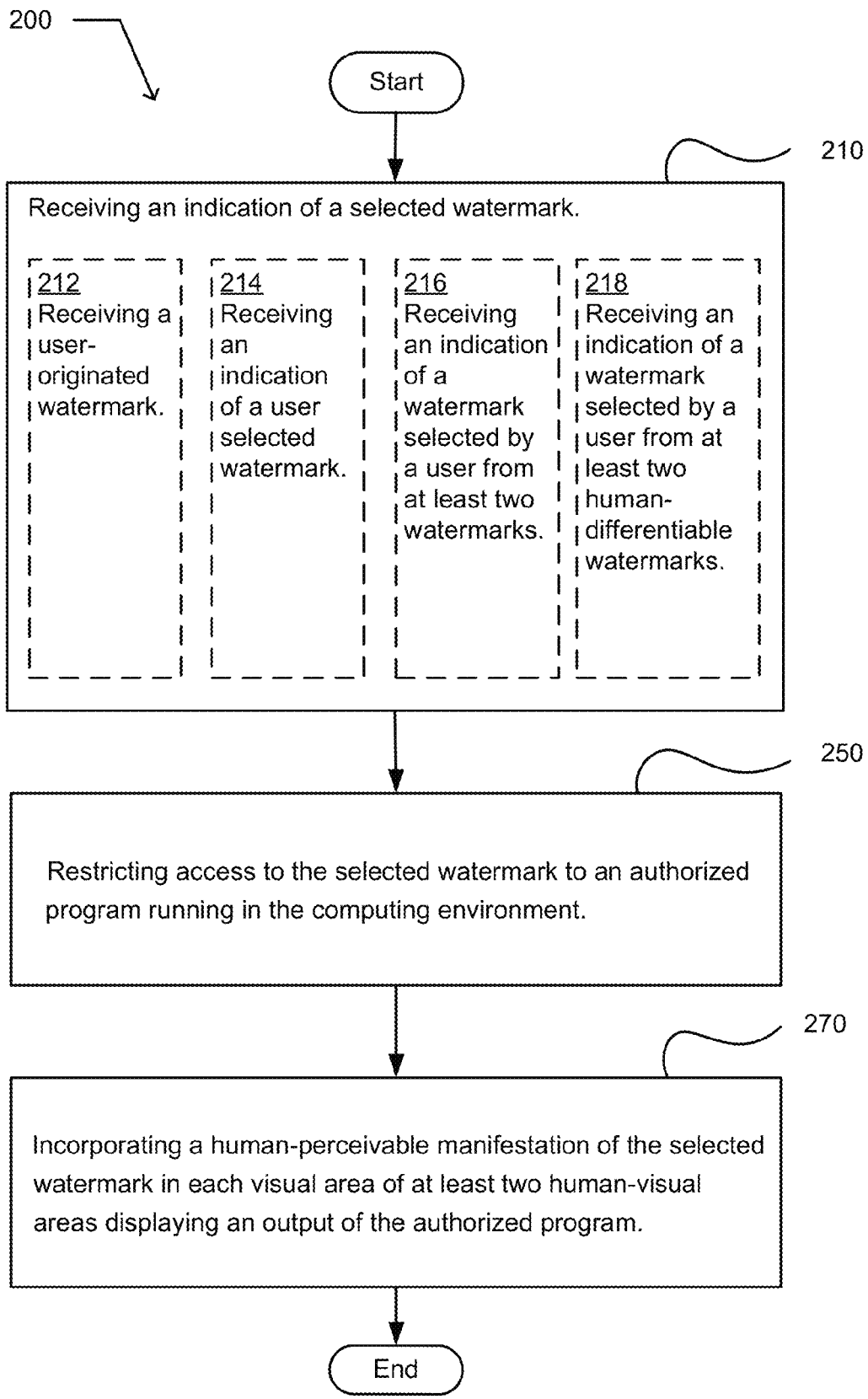
FIG. 3 illustrates an alternative embodiment of the exemplary operational flow of FIG. 2.

FIG. 3 illustrates an alternative embodiment of the exemplary operational flow 200 of FIG. 2. The determination operation 210 may include at least one additional operation. The at least one additional operation may include an operation 212, an operation 214, an operation 216, and/or an operation 218. The operation 212 receives a user-originated watermark. The operation 214 receives an indication of a user-selected watermark. The operation 216 receives an indication of a watermark selected by a user from at least two watermarks. The operation 218 receives an indication of a watermark selected by a user from at least two human-differentiable watermarks.

Figure 4:
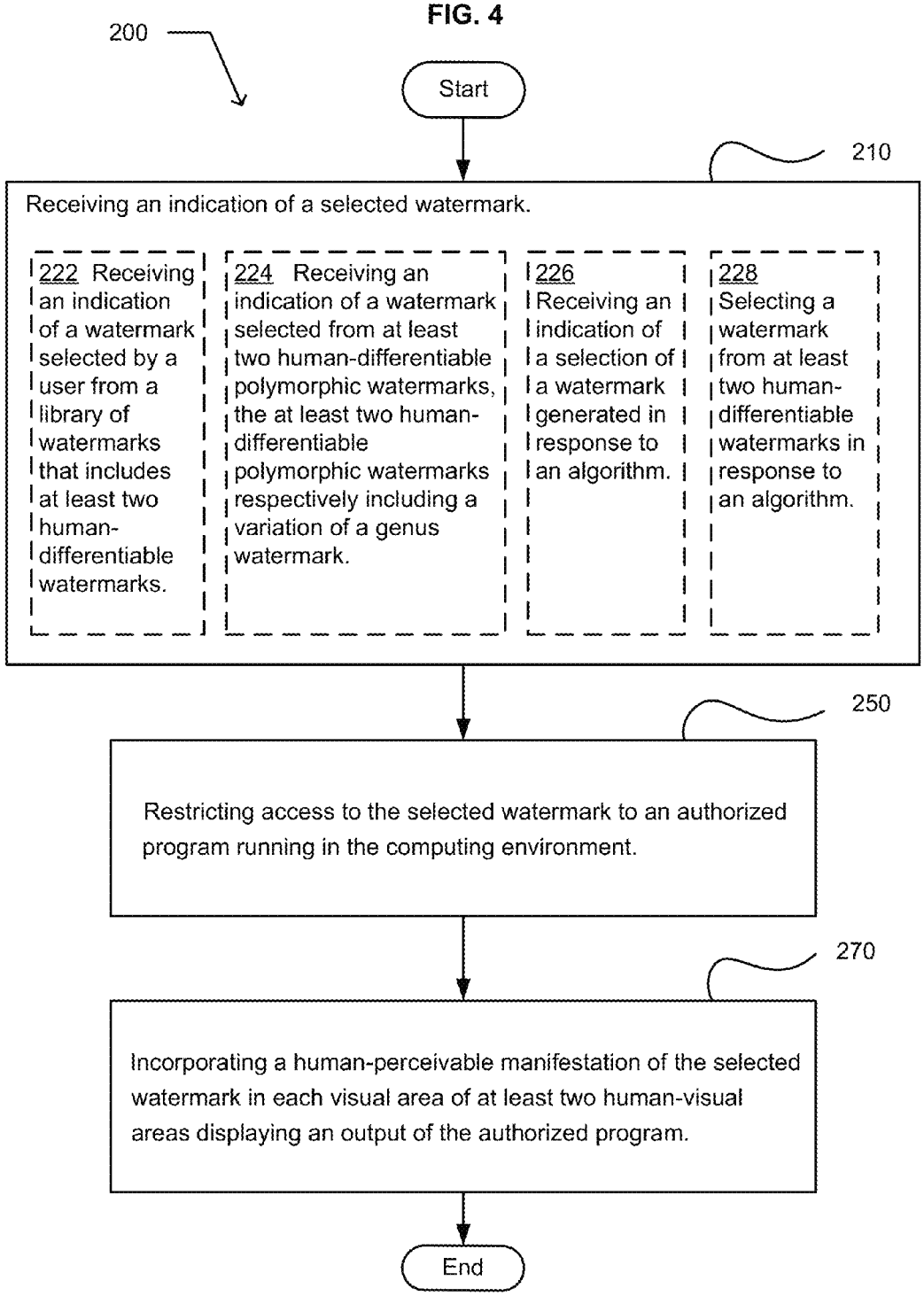
FIG. 4 illustrates another alternative embodiment of the exemplary operational flow of FIG. 2.

FIG. 4 illustrates another alternative embodiment of the exemplary operational flow 200 of FIG. 2. The determination operation 210 may include at least one additional operation. The at least one additional operation may include an operation 222, an operation 224, an operation 226, and/or an operation 228. The operation 222 receives an indication of a watermark selected by a user from a library of watermarks that includes at least two human-differentiable watermarks. The operation 224 receives an indication of a watermark selected from at least two human-differentiable polymorphic watermarks, the at least two human-differentiable polymorphic watermarks respectively including a variation of a genus watermark. The operation 226 receives an indication of a selection of a watermark generated in response to an algorithm. For example, in an embodiment an algorithm may generate a watermark in response to a random number or a pseudo random number. In another embodiment, an algorithm may generate a watermark in response to a combination of unique identifiers, such as by a hash of a current date, a MAC address of a computing device, a birthday of a user, a serial number associated with an operating system of the computing device or other program, and/or a current date. The operation 228 selects a watermark from at least two human-differentiable watermarks in response to an algorithm.

Figure 5:
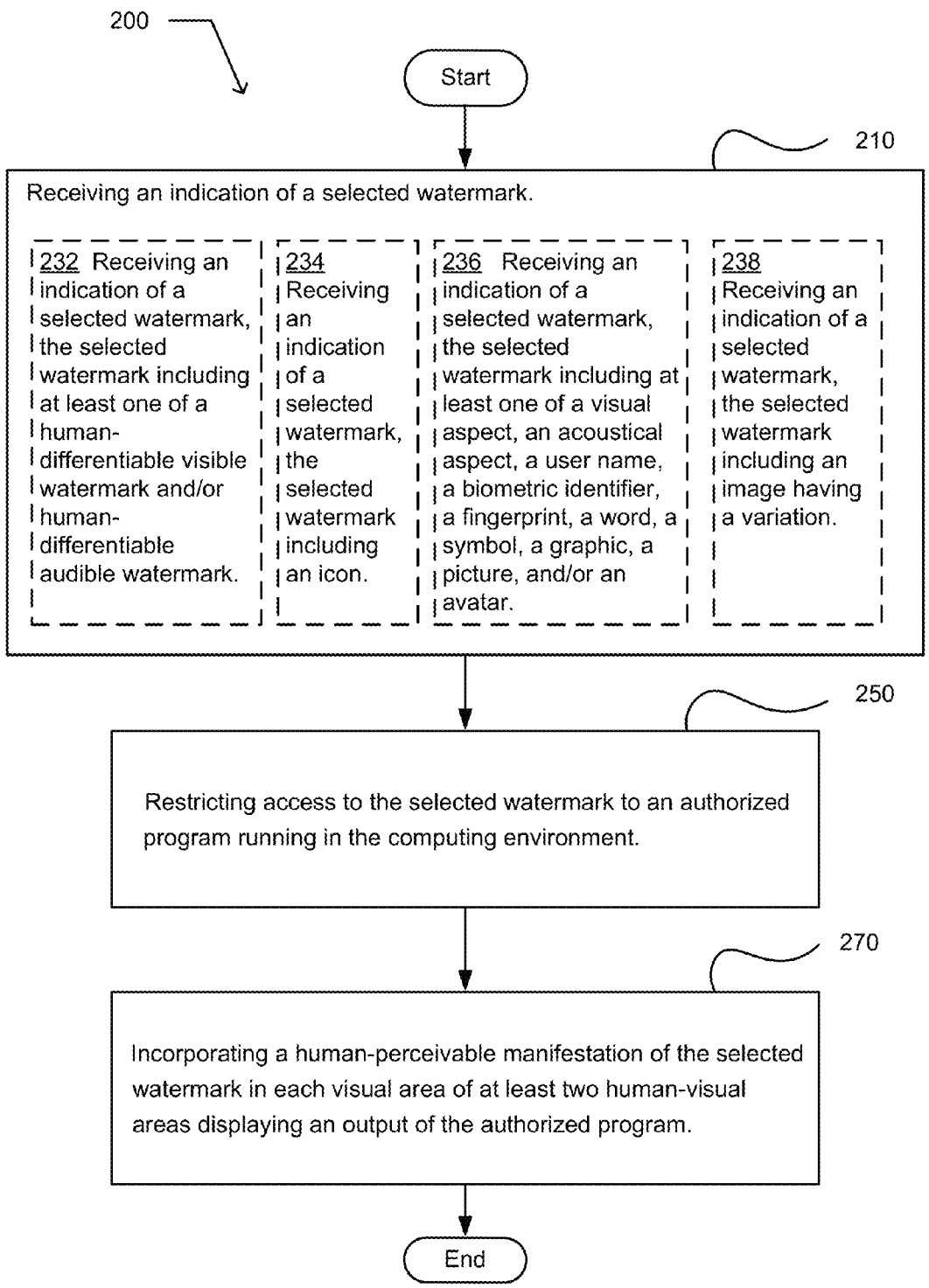
FIG. 5 illustrates a further alternative embodiment of the exemplary operational flow of FIG. 2.

FIG. 5 illustrates a further alternative embodiment of the exemplary operational flow 200 of FIG. 2. The determination operation 210 may include at least one additional operation. The at least one additional operation may include an operation 232, an operation 234, an operation 236, and/or an operation 238. The operation 232 receives an indication of a selected watermark, the selected watermark including at least one of a human-differentiable visible watermark and/or human-differentiable audible watermark. The operation 234 receives an indication of a selected watermark, the selected watermark including an icon. For example, an icon may include a small pictorial representation of an object. In an embodiment, an icon may include a commonly known icon, such as an icon representative of a Mario Brother from Super Mario Brothers© Nintendo. In another example, an icon may include a picture or other representation of a user. The operation 236 receives an indication of a selected watermark, the selected watermark including at least one of a visual aspect, an acoustical aspect, a user name, a biometric identifier, a fingerprint, a word, a symbol, a graphic, a picture, and/or an avatar. In another embodiment, the selected watermark may include a user's name. The operation 238 receives an indication of a selected watermark, the selected watermark including an image having a variation.

Figure 6:
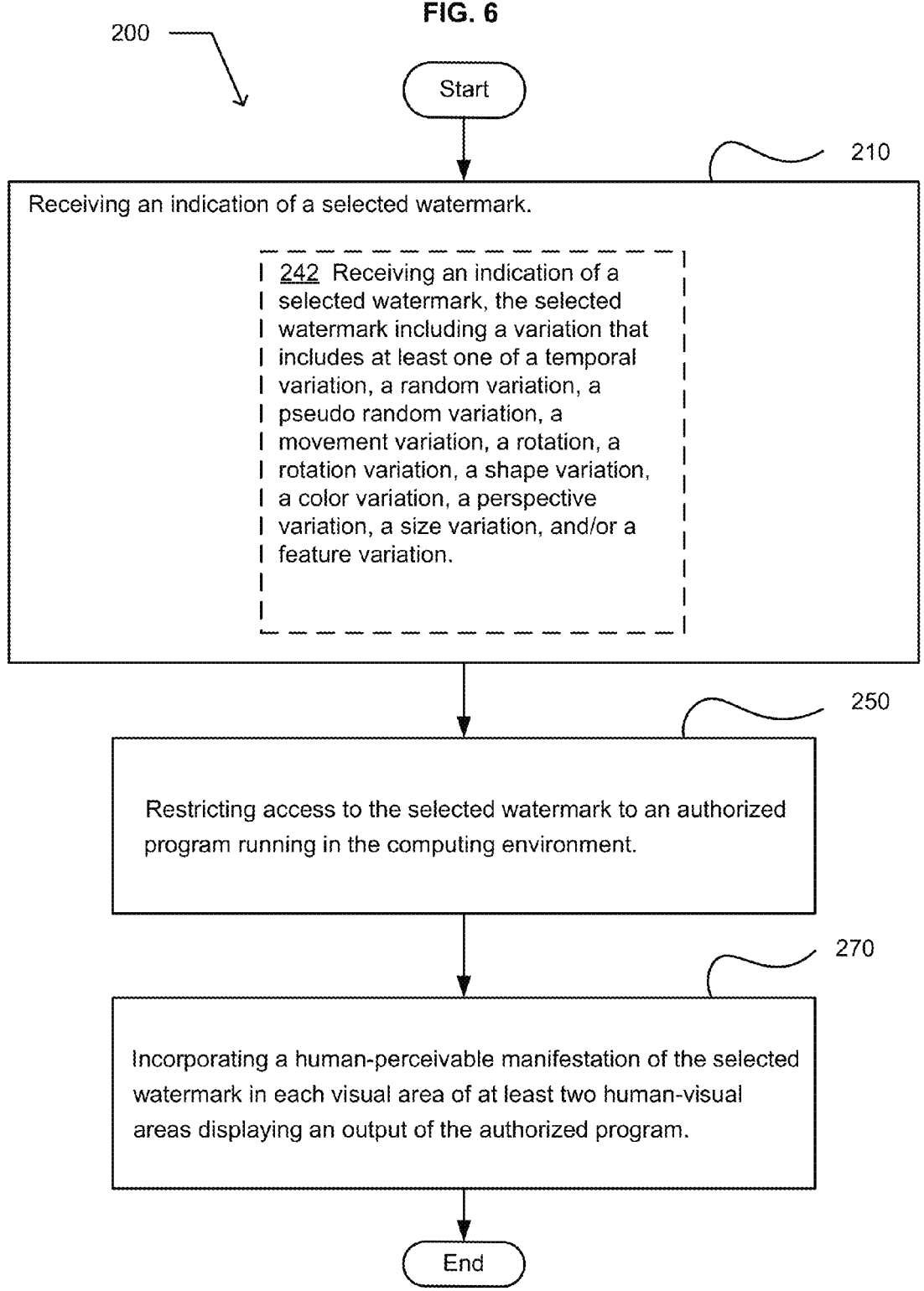
FIG. 6 illustrates an alternative embodiment of the exemplary operational flow 200 of FIG. 2.

FIG. 6 illustrates an alternative embodiment of the exemplary operational flow 200 of FIG. 2. The determination operation 210 may include at least one additional operation. The at least one additional operation may include an operation 242. The operation 242 receives an indication of a selected watermark, the selected watermark including a variation. The variation may include at least one of a temporal variation, a random variation, a pseudo random variation, a movement variation, a rotation, a rotation variation, a shape variation, a color variation, a perspective variation, a size variation, and/or a feature variation. For example, a temporal variation may include an image of a planet, a face, a wheel, and/or an object that rotates. A temporal variation may occur over a relatively short time, such as one second, and/or over a relatively longer time, such as monthly. A feature variation may include a star that sparkles, or a varying width of a component of a watermark. Another variation may include a representation of a United States President that changes daily in order of their election. A variation may include a dynamic variation that includes a synchronization or other temporal or visual relationship to another watermark or other element active on the same system/environment. Another variation may include a responsive watermark that does something in response to a user action, such as appearing in response to a user action. A further variation is an invariant quality, including a static relationship of a watermark with respect to another watermark and/or other elements within the same computing system and/or environment.

In embodiments, a watermark may share a system and/or environment aspect, such as a background color, a style, and/or a font, etc., including incorporation through duplication or transparency. A watermark may include a polymorphic variation within a system and/or environment and/or other domain, such as a workgroup or network. A watermark may include a shared and/or a variable aspect in combination with others. A watermark may be selected and/or generated in a manner to make it at least substantially unique by using one or more unique aspects and/or identifiers associated with a machine, system, account, or user, etc. A watermark may be user invisible, and may be user queryable/displayable on user request. A watermark may be recognizable by code, including modules that take action— e.g., warn or do not present items with watermark imitations especially those that a user might mistake for legitimate.

Figure 7:
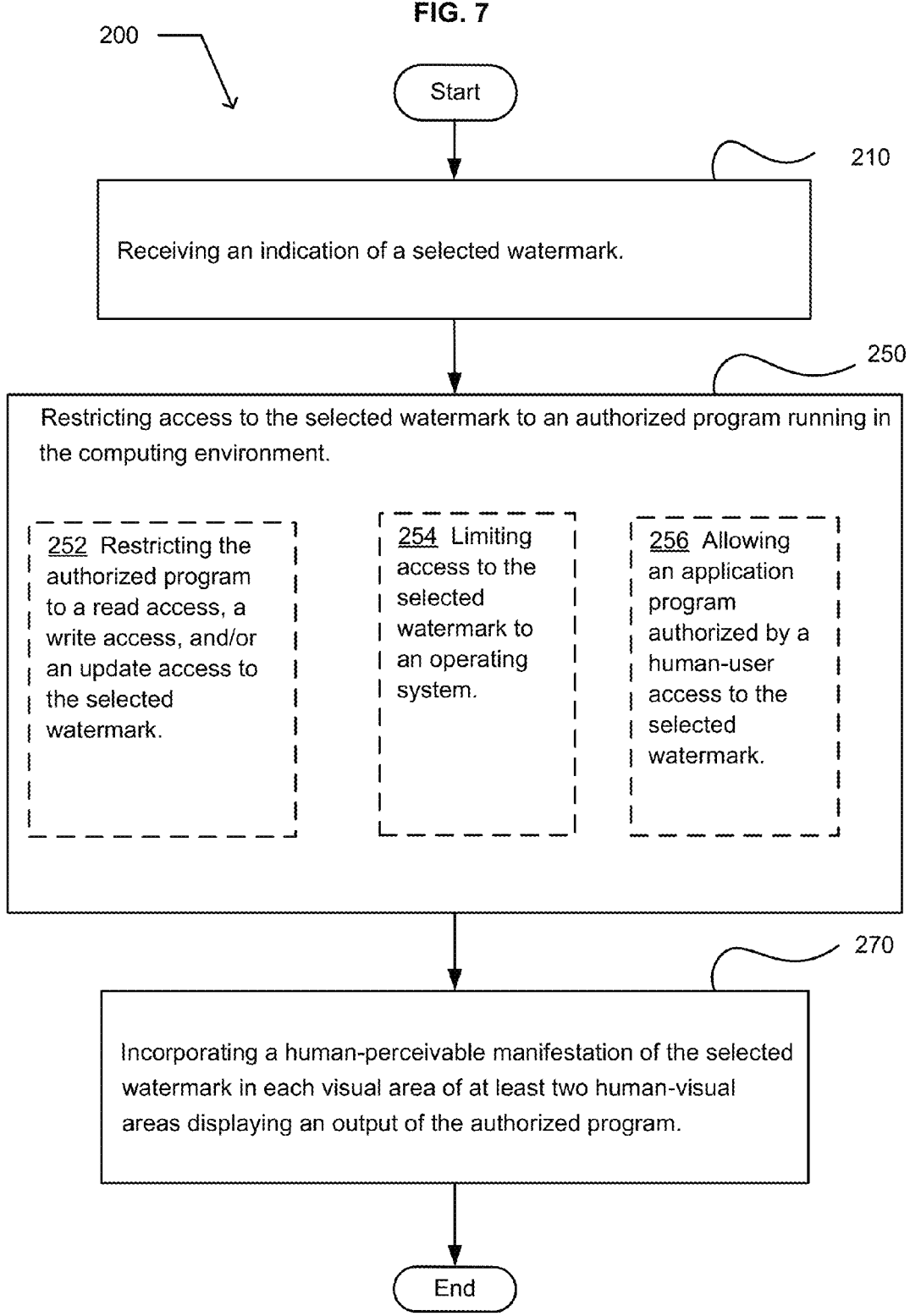
FIG. 7 illustrates a further alternative embodiment of the exemplary operational flow of FIG. 2.

FIG. 7 illustrates a further alternative embodiment of the exemplary operational flow 200 of FIG. 2. The rights operation 250 may include at least one additional operation. The at least one additional operation may include an operation 252, an operation 254, and/or an operation 256. The operation 252 restricts the authorized program to a read access, a write access, and/or an update access to the selected watermark. The operation 254 limits access to the selected watermark to an operating system. The operation 256 allows an application program authorized by a human-user to access the selected watermark.

Figure 8:
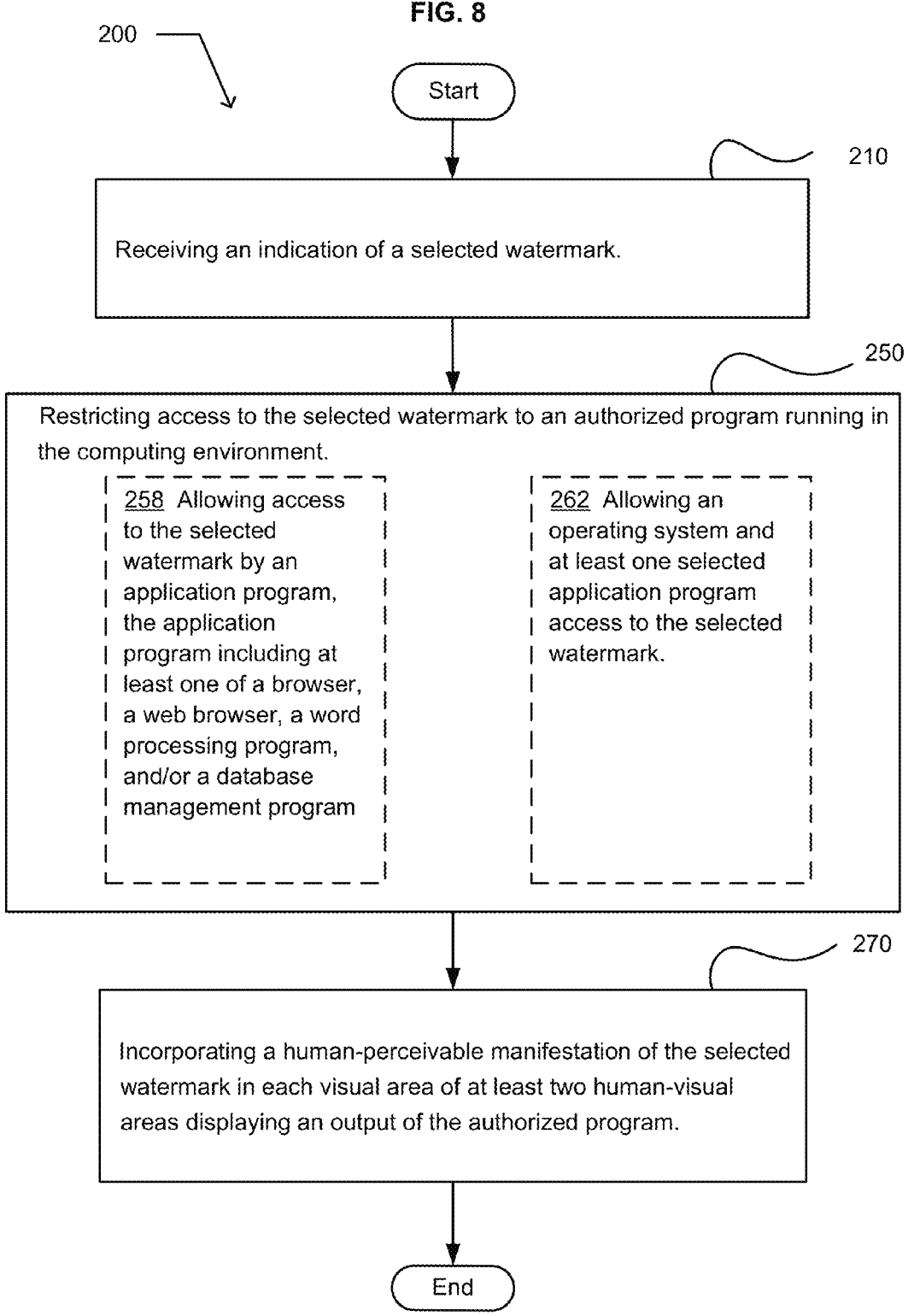
FIG. 8 illustrates a further alternative embodiment of the exemplary operational flow of FIG. 2.

FIG. 8 illustrates a further alternative embodiment of the exemplary operational flow 200 of FIG. 2. The rights operation 250 may include at least one additional operation. The at least one additional operation may include an operation 258, and/or an operation 262. The operation 258 allows access to the selected watermark by an application program, the application program including at least one of a browser, a web browser, a word processing program, and/or a database management program. The operation 262 allows an operating system and at least one selected application program access to the selected watermark.

Figure 9:
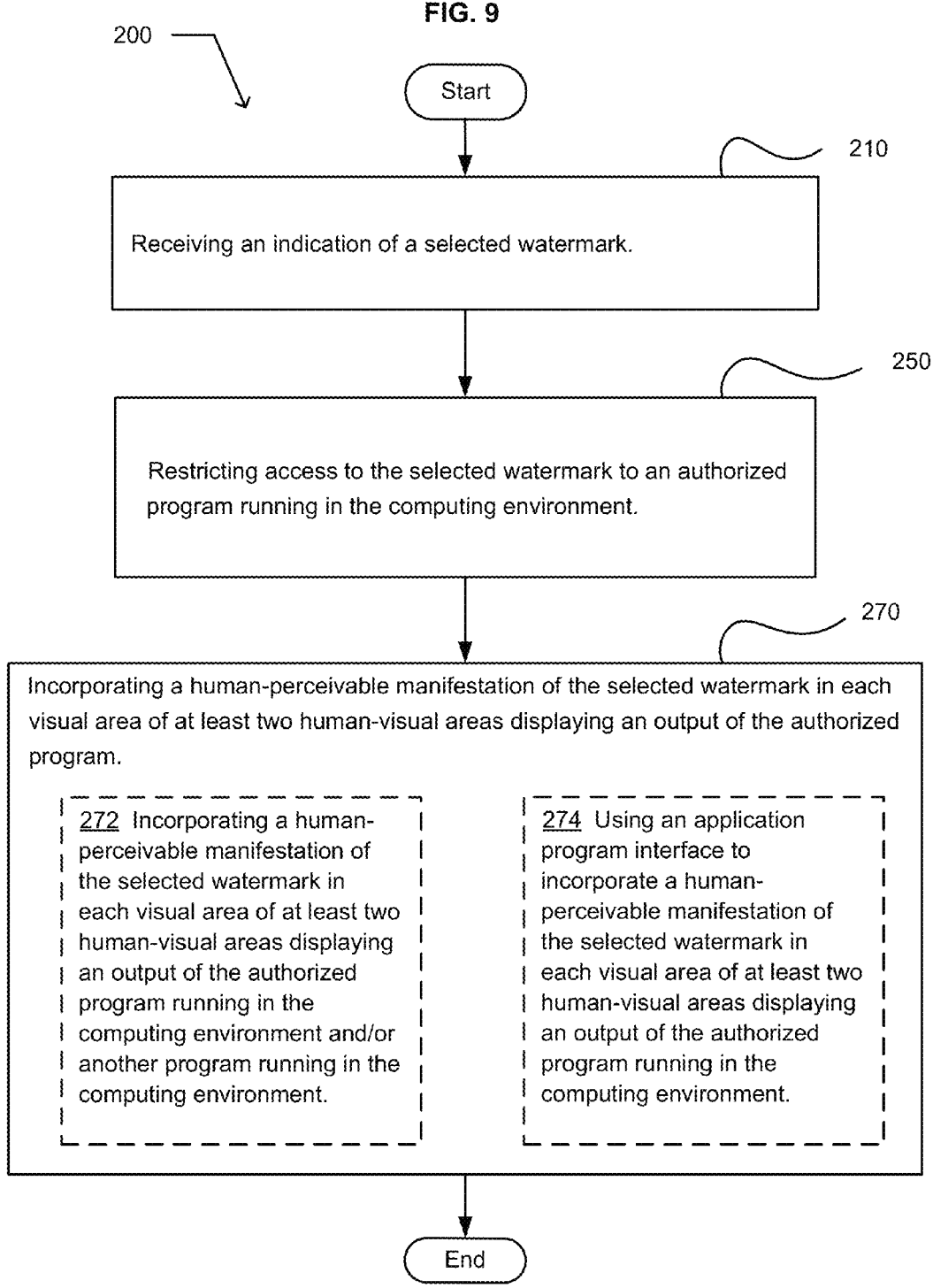
FIG. 9 illustrates an alternative embodiment of the exemplary operational flow of FIG. 2.

FIG. 9 illustrates an alternative embodiment of the exemplary operational flow 200 of FIG. 2. The integration operation 270 may include at least one additional operation. The at least one additional operation may include an operation 272, and/or an operation 274. The operation 272 incorporates a human-perceivable manifestation of the selected watermark in each visual area of at least two human-visual areas displaying an output of the authorized program running in the computing environment and/or another program running in the computing environment. The operation 274 uses an application program interface to incorporate a human-perceivable manifestation of the selected watermark in each visual area of at least two human-visual areas displaying an output of the authorized program running in the computing environment.

Figure 10:
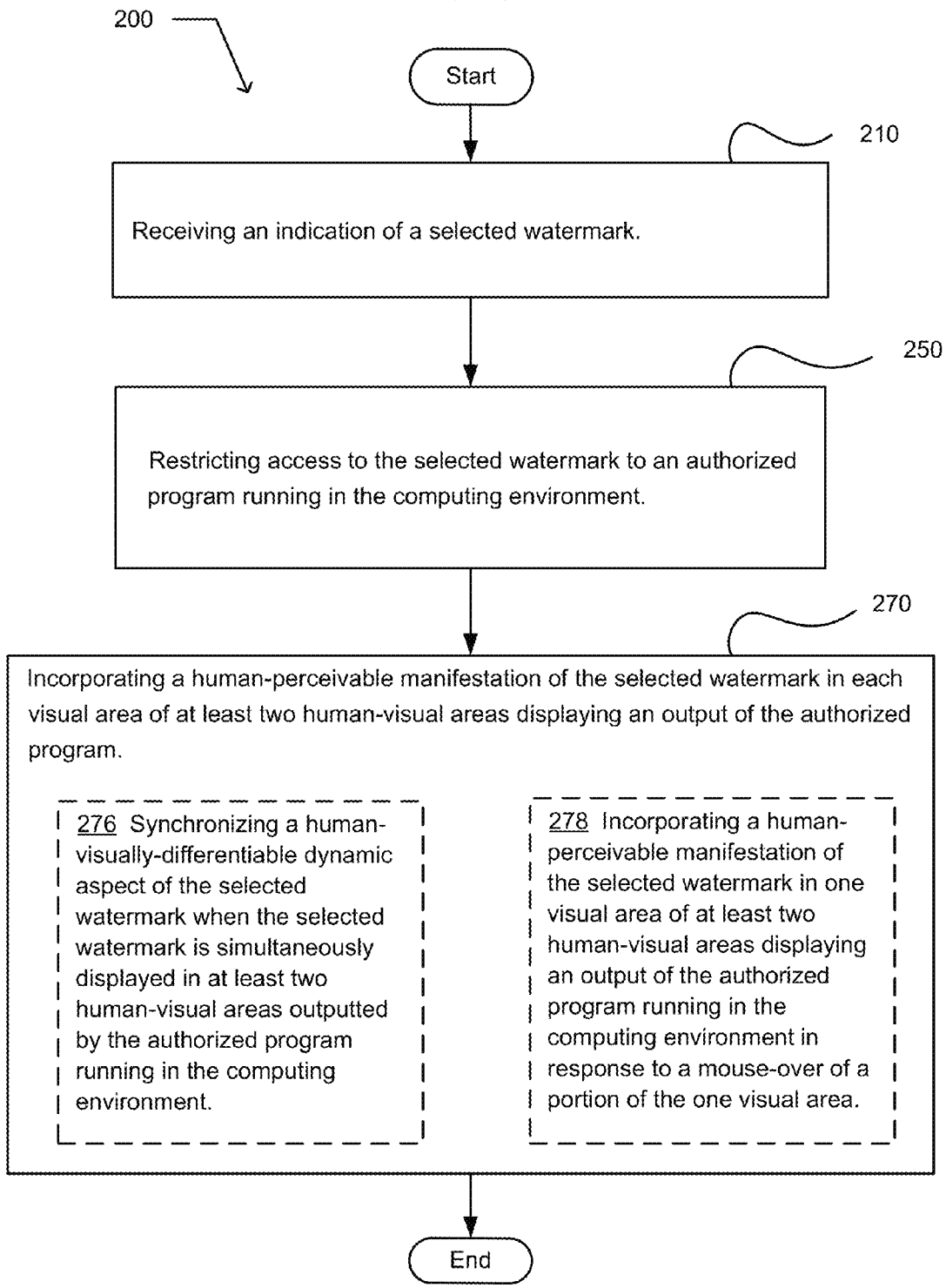
FIG. 10 illustrates another alternative embodiment of the exemplary operational flow of FIG. 2.

FIG. 10 illustrates another alternative embodiment of the exemplary operational flow 200 of FIG. 2. The integration operation 270 may include at least one additional operation. The at least one additional operation may include an operation 276, and/or an operation 278. The operation 276 synchronizes a human-visually-differentiable dynamic aspect of the selected watermark when the selected watermark is simultaneously displayed in at least two human-visual areas outputted by the authorized program running in the computing environment. For example, if the selected watermark includes a bouncing icon, the bouncing movement of is synchronized when the selected water mark is displayed in two simultaneously displayed windows. The operation 278 incorporates a human-perceivable manifestation of the selected watermark in one visual area of at least two human-visual areas displaying an output of the authorized program running in the computing environment in response to a mouse-over of a portion of the one visual area.

Figure 11:
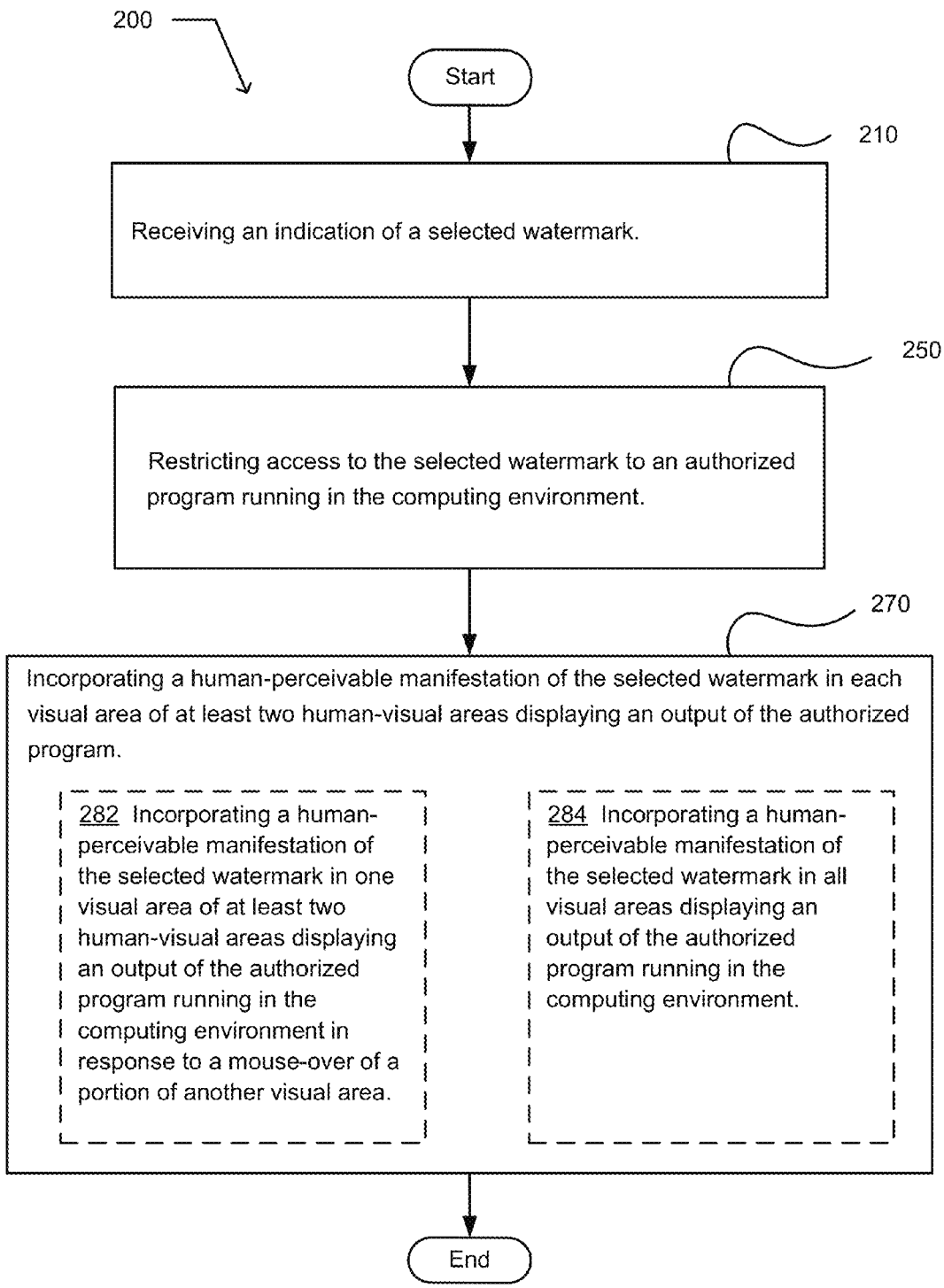
FIG. 11 illustrates a further alternative embodiment of the exemplary operational flow of FIG. 2.

FIG. 11 illustrates a further alternative embodiment of the exemplary operational flow 200 of FIG. 2. The integration operation 270 may include at least one additional operation. The at least one additional operation may include an operation 282, and/or an operation 284. The operation 282 incorporates a human-perceivable manifestation of the selected watermark in one visual area of at least two human-visual areas displaying an output of the authorized program running in the computing environment in response to a mouse-over of a portion of another visual area. The operation 284 incorporates a human-perceivable manifestation of the selected watermark in all visual areas displaying an output of the authorized program running in the computing environment.

Figure 12:
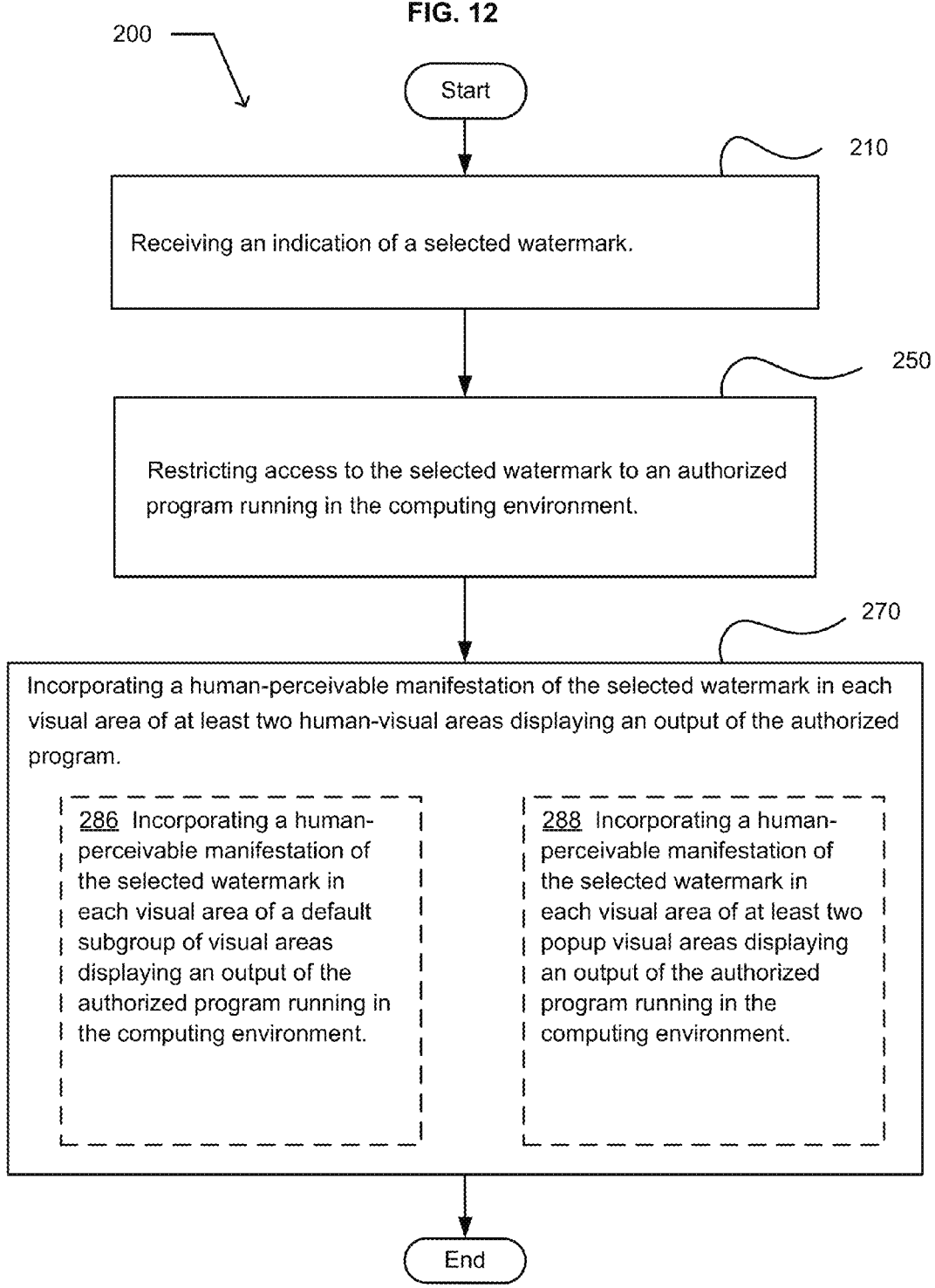
FIG. 12 illustrates an alternative embodiment of the exemplary operational flow of FIG. 2.

FIG. 12 illustrates an alternative embodiment of the exemplary operational flow 200 of FIG. 2. The integration operation 270 may include at least one additional operation. The at least one additional operation may include an operation 286, and/or an operation 288. The operation 286 incorporates a human-perceivable manifestation of the selected watermark in each visual area of a default subgroup of visual areas displaying an output of the authorized program running in the computing environment. The operation 288 incorporates a human-perceivable manifestation of the selected watermark in each visual area of at least two popup visual areas displaying an output of the authorized program running in the computing environment.

Figure 13:
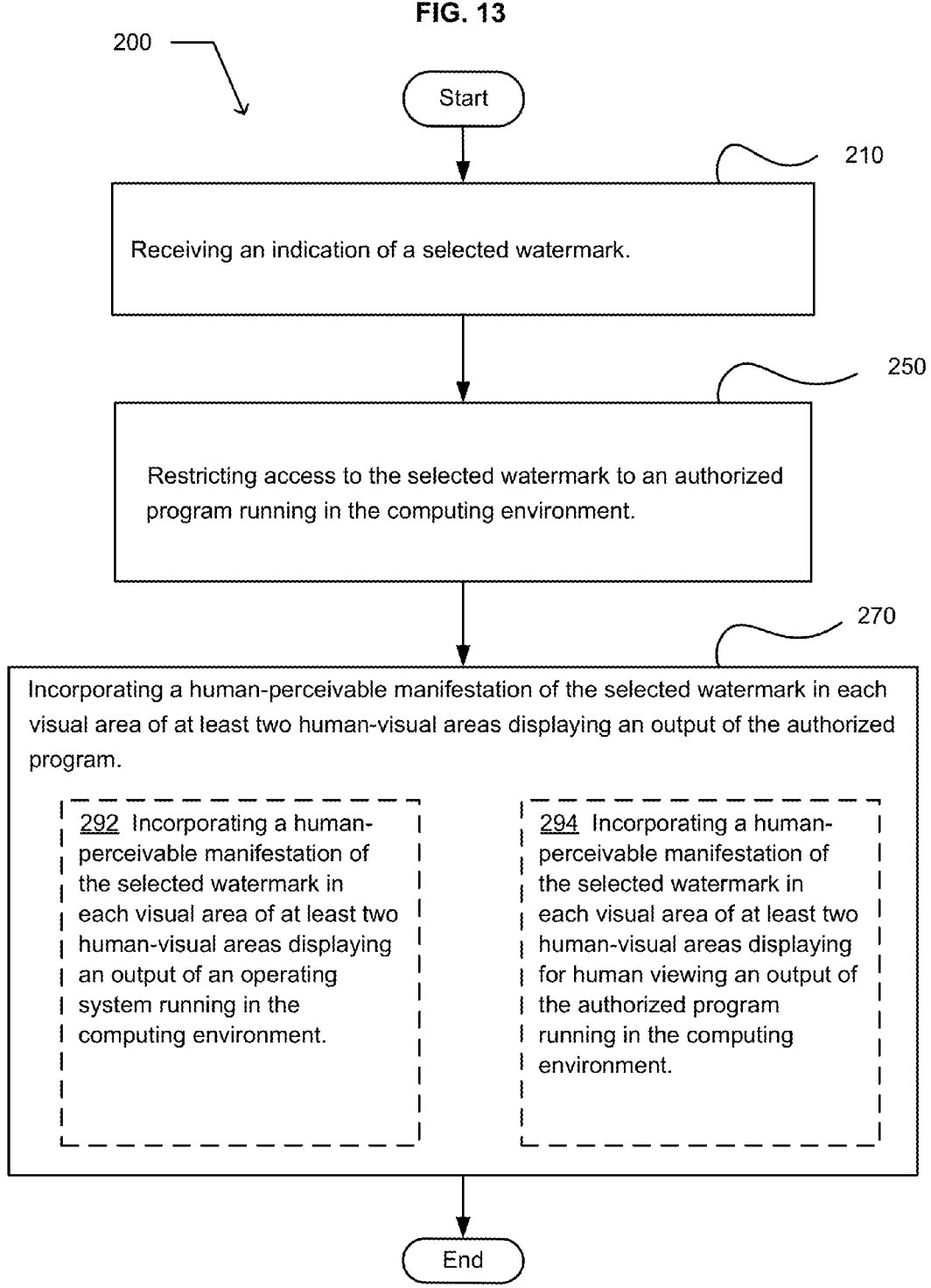
FIG. 13 illustrates another alternative embodiment of the exemplary operational flow of FIG. 2.

FIG. 13 illustrates another alternative embodiment of the exemplary operational flow 200 of FIG. 2. The integration operation 270 may include at least one additional operation. The at least one additional operation may include an operation 292, and/or an operation 294. The operation 292 incorporates a human-perceivable manifestation of the selected watermark in each visual area of at least two human-visual areas displaying an output of an operating system running in the computing environment. The operation 294 incorporates a human-perceivable manifestation of the selected watermark in each visual area of at least two human-visual areas displaying for human viewing an output of the authorized program running in the computing environment.

Figure 14:
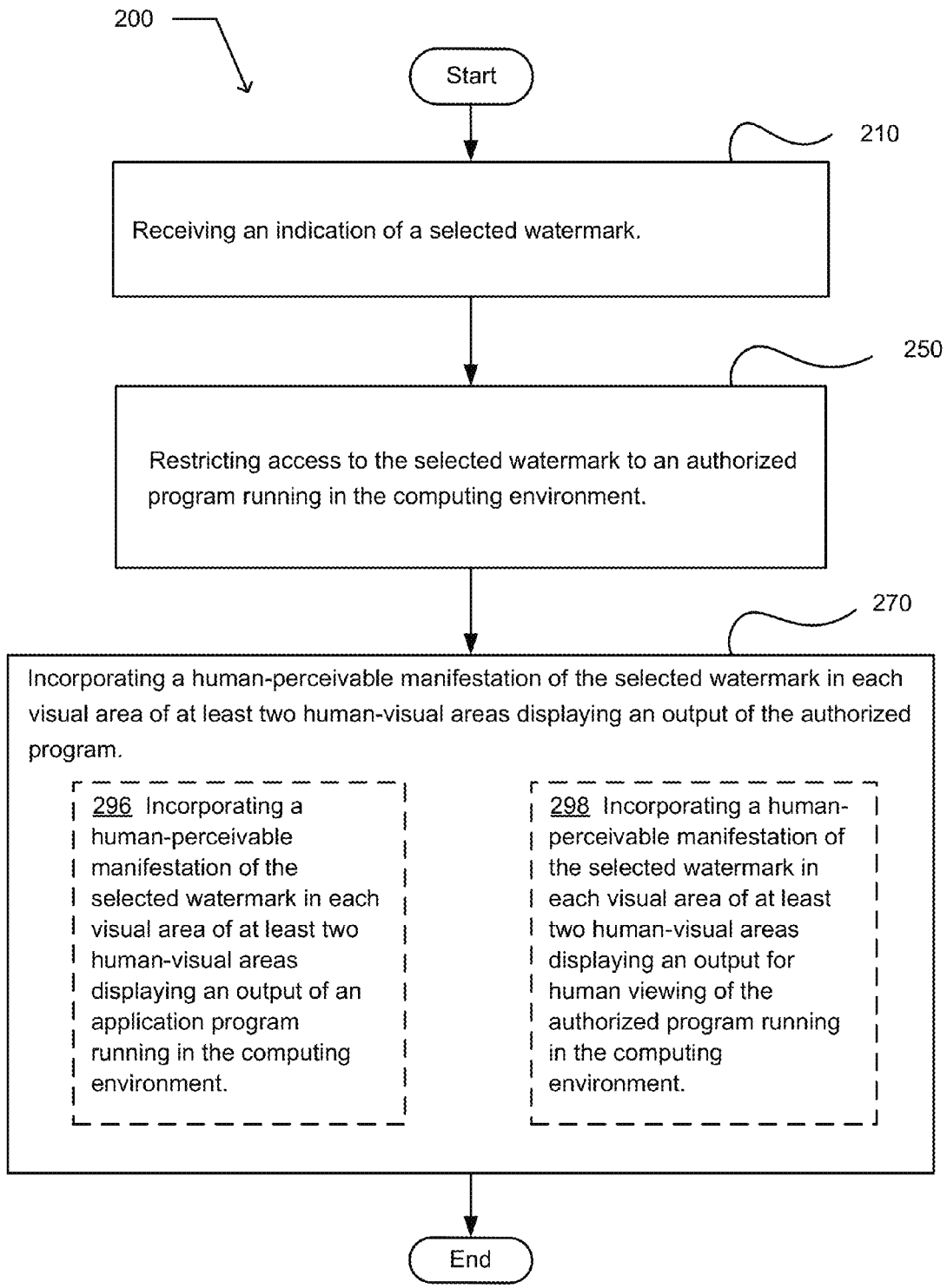
FIG. 14 illustrates a further alternative embodiment of the exemplary operational flow of FIG. 2.

FIG. 14 illustrates a further alternative embodiment of the exemplary operational flow 200 of FIG. 2. The integration operation 270 may include at least one additional operation. The at least one additional operation may include an operation 296, and/or an operation 298. The operation 296 incorporates a human-perceivable manifestation of the selected watermark in each visual area of at least two human-visual areas displaying an output of an application program running in the computing environment. The operation 298 incorporates a human-perceivable manifestation of the selected watermark in each visual area of at least two human-visual areas displaying an output for human viewing of the authorized program running in the computing environment.

Figure 15:
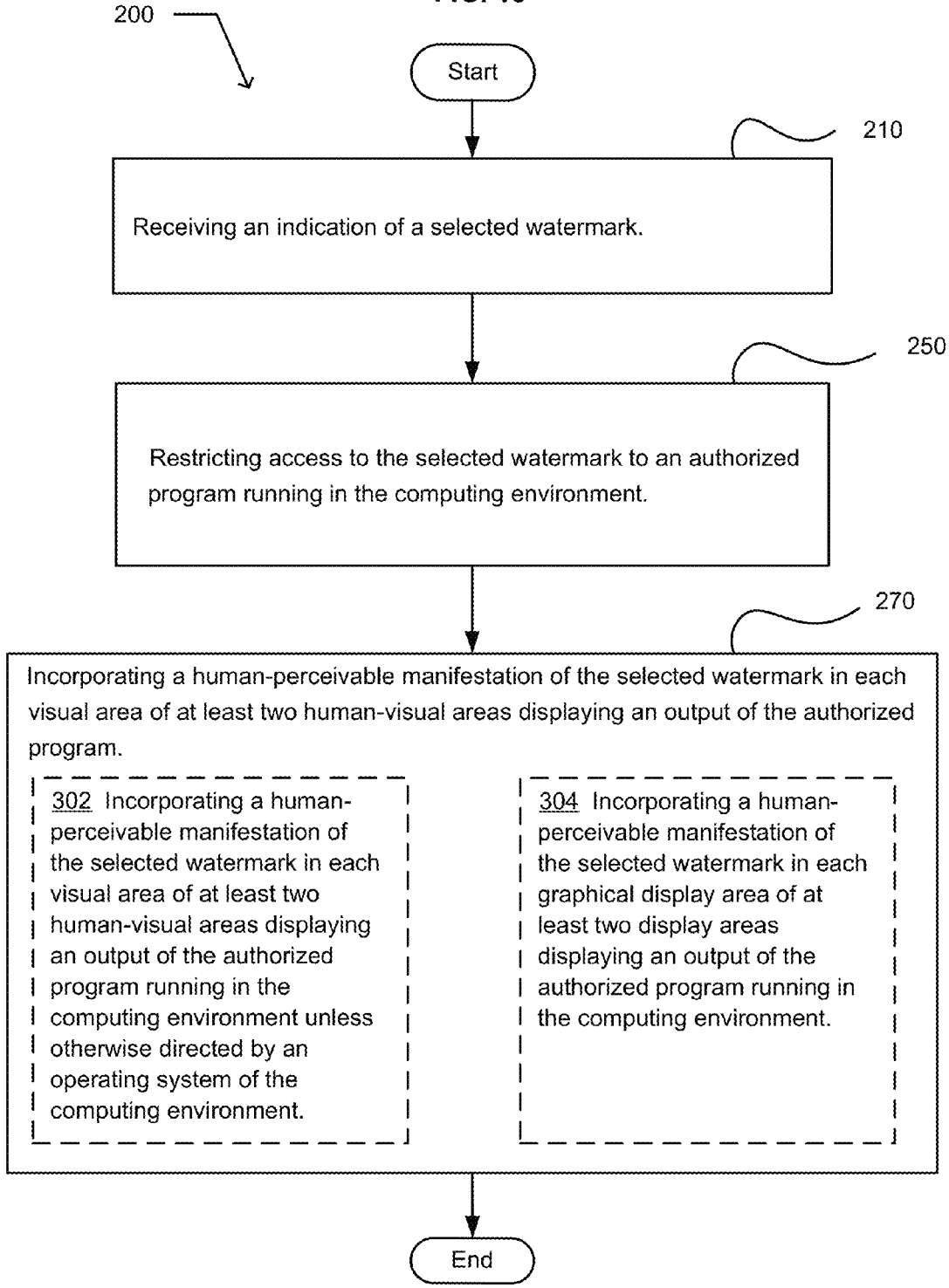
FIG. 15 illustrates an alternative embodiment of the exemplary operational flow of FIG. 2.

FIG. 15 illustrates an alternative embodiment of the exemplary operational flow 200 of FIG. 2. The integration operation 270 may include at least one additional operation. The at least one additional operation may include an operation 302, and/or an operation 304. The operation 302 incorporates a human-perceivable manifestation of the selected watermark in each visual area of at least two human-visual areas displaying an output of the authorized program running in the computing environment unless otherwise directed by an operating system of the computing environment. The operation 304 incorporates a human-perceivable manifestation of the selected watermark in each graphical display area of at least two display areas displaying an output of the authorized program running in the computing environment.

Figure 16:
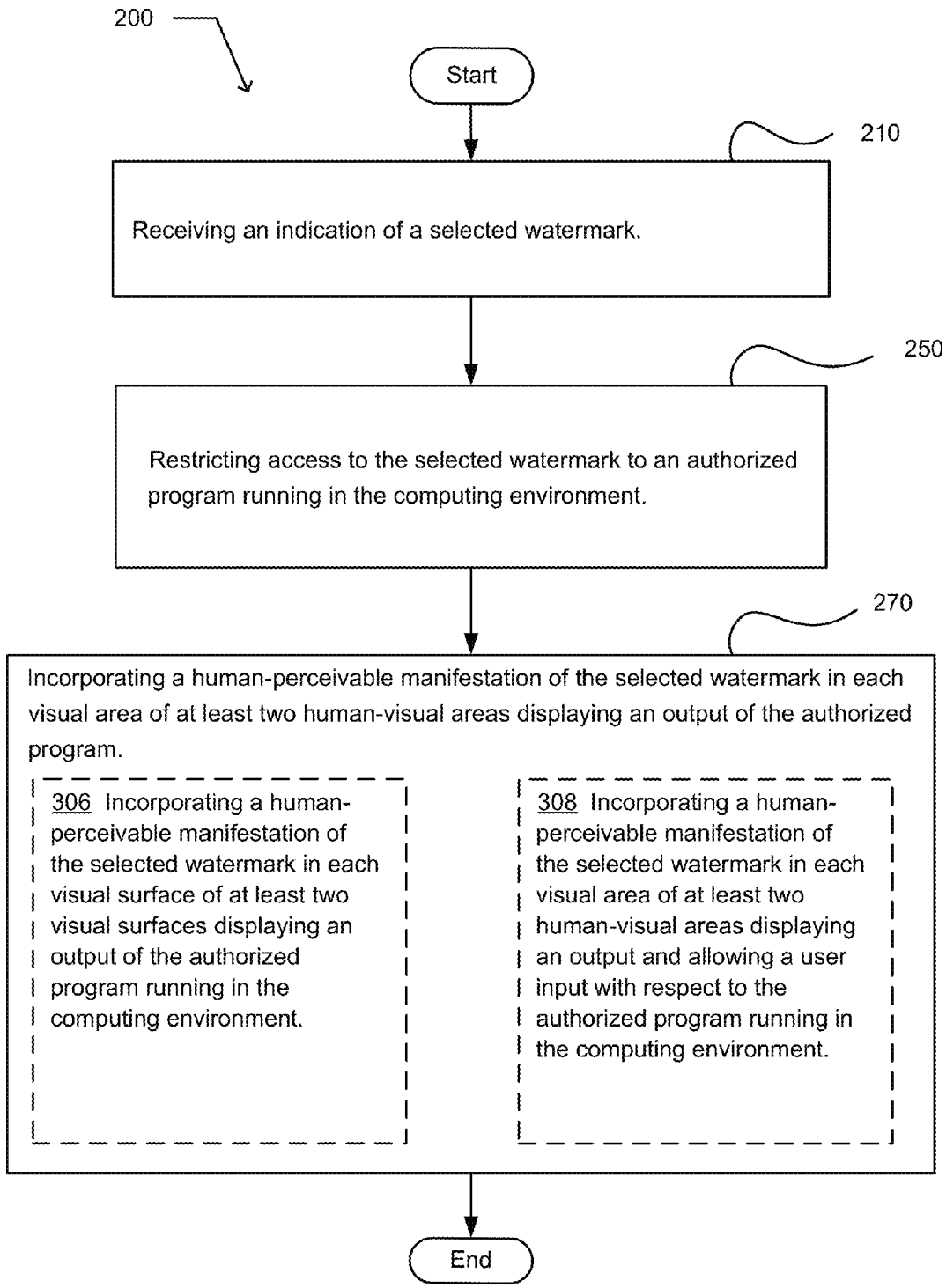
FIG. 16 illustrates another alternative embodiment of the exemplary operational flow of FIG. 2.

FIG. 16 illustrates another alternative embodiment of the exemplary operational flow 200 of FIG. 2. The integration operation 270 may include at least one additional operation. The at least one additional operation may include an operation 306, and/or an operation 308. The operation 306 incorporates a human-perceivable manifestation of the selected watermark in each visual surface of at least two visual surfaces displaying an output of the authorized program running in the computing environment. The operation 308 incorporates a human-perceivable manifestation of the selected watermark in each visual area of at least two human-visual areas displaying an output and allowing a user input with respect to the authorized program running in the computing environment.

In an embodiment of the integration operation 270, the selected watermark may be incorporated in a window by an operating system and/or the authorized program. In another embodiment, the selected watermark may be visually prominent and located proximate to a feature of a window, such as next to a "yes" and/or a "no" button of a dialog box. In another embodiment, the watermark may include a watermark displayed proximate to or within a dialog box during a mouseover of a genuine dialog box. In a further embodiment, a dialog box changes color and/or causes a script display, such as a "genuine button" during a mouseover. A color change may be responsive to a trust level of the program that caused display of the dialog box. In another embodiment, the operating system causes a user visually-differentiable display during a mouseover of an image, such as a jpeg, gif, tiff, and/or a bitmap based image when compared to that displayed during a mouseover of an operating system generated dialog box and/or a dialog box button.

In another embodiment, the selected watermark may be positioned at any suitable location with respect to a visual area and/or may have any suitable degree of conspicuousness. For example, the selected watermark may be position with respect to a button, a form, a frame, a window title bar, and/or an object title bar. A level of conspicuousness may be under a user or a configuration control. For example, a novice user might want a "super secure" setting that placed a visually conspicuous watermark in all the buttons while an experience user might opt for an embodiment in which a subtle watermark is placed in the corner of the window. In a further embodiment, the selected watermark may include a visual watermark, an audio watermark, a tactile, and/or hepatic watermark.

In a further embodiment, a watermark may include a window, such as a popup window, displayed at least partially contemporaneously with another window, and/or on top of the window. In an embodiment, a watermark may include at least a portion of a window, another window displayed in a visual combination with the window, and/or on top of the window.

Figure 17:
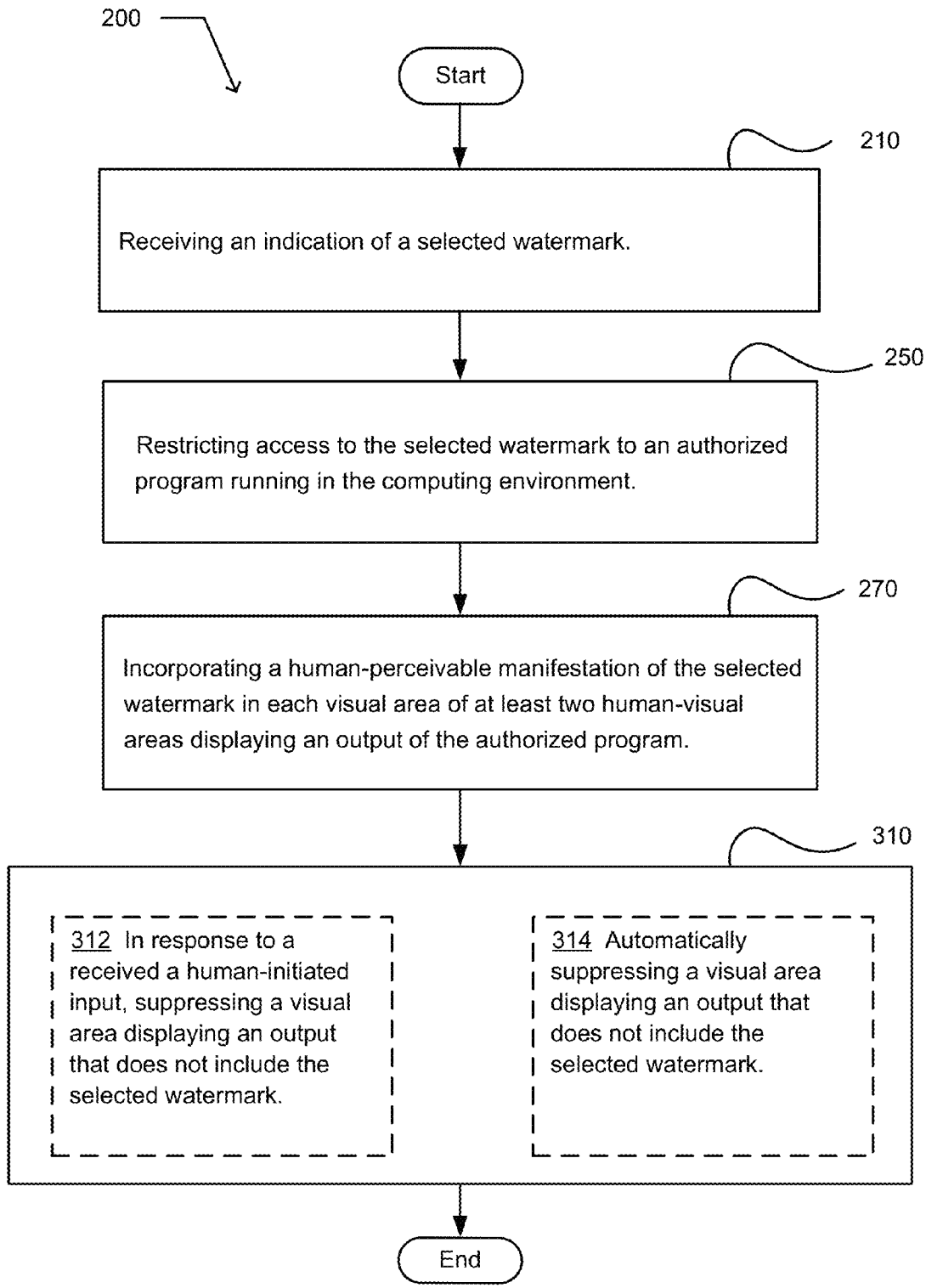
FIG. 17 illustrates a further alternative embodiment of the exemplary operational flow of FIG. 2.

FIG. 17 illustrates a further alternative embodiment of the exemplary operational flow 200 of FIG. 2. The operational flow may include at least one additional operation 310. The at least one additional operation may include an operation 312, and/or an operation 314. The operation 312 suppresses a visual area displaying an output that does not include the selected watermark in response to a received a human-initiated input. The operation 314 automatically suppresses a visual area displaying an output that does not include the selected watermark.

Returning to FIG. 2, an alternative embodiment of the operational flow 200 is includes an operational flow 200A. After a start operation, the operational flow 200A moves to the determination operation 210. The determination operation receives an indication of a selected watermark. The integration operation 270 incorporates incorporating a human-perceivable manifestation of the selected watermark in each visual area of at least two human-visual areas displaying an output of an authorized program running in the computing environment. The operational flow then proceeds to an end operation.

Figure 18:
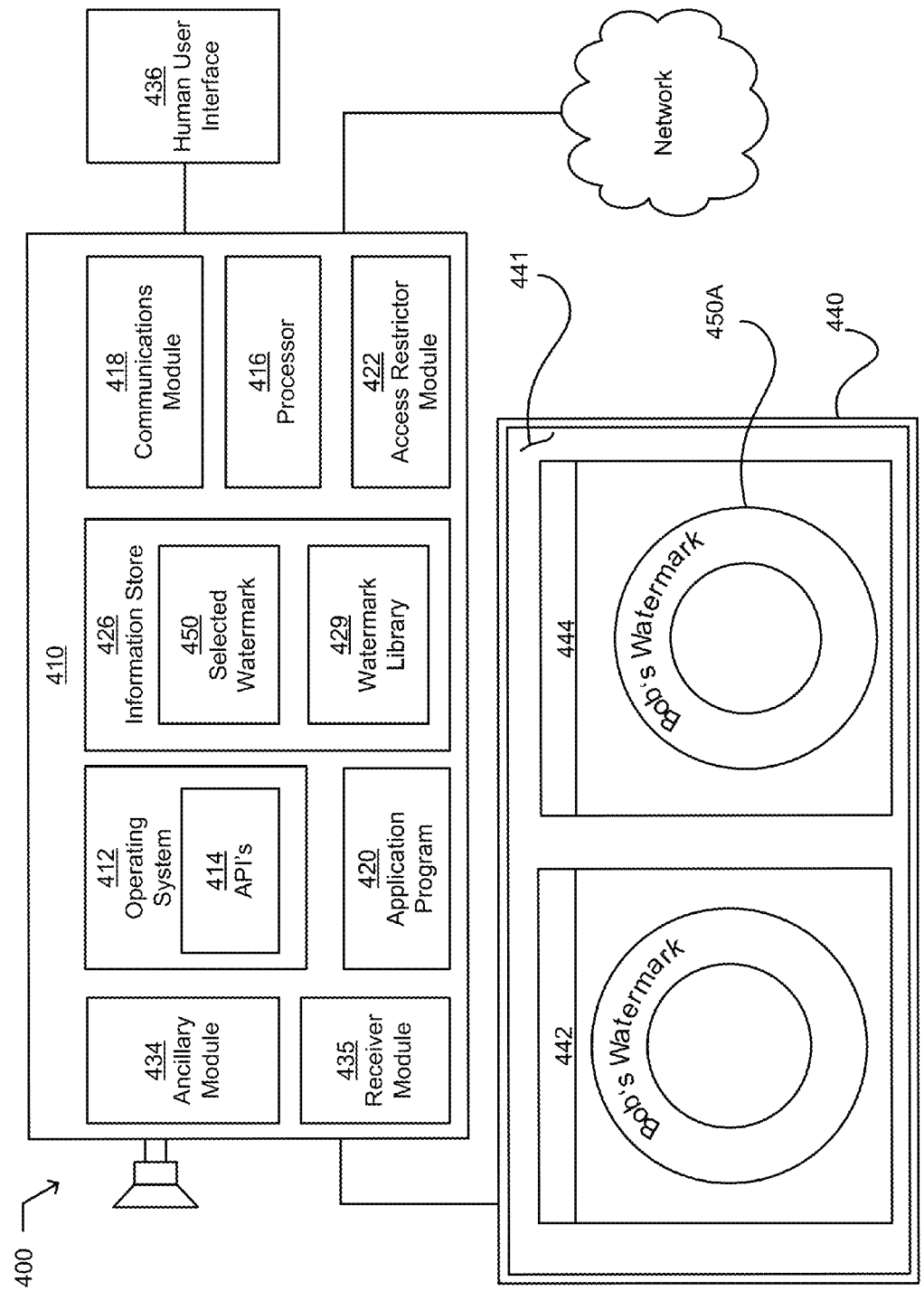
FIG. 18 illustrates an exemplary environment in which an embodiment of the operational flow may be implemented.

FIG. 18 illustrates an exemplary environment 400 in which an embodiment of the operational flow 200 may be implemented. The exemplary environment includes a computing device 410, a human user interface 436, and a visual display 440. The visual display illustrates a display surface 441 that is operable to display an output of an authorized program running in the computing environment. The display surface is also operable to display at least two human-visual display areas 442 and 444. The display areas are illustrated as windows, such as may be generated by a Microsoft Windows XP operating system or by an Apple Mac OS X operating system.

A receiver module 435 of the computing device may receive an indication of a selected watermark 450. The indication may be responsive to an action by a human user communicated by the human user interface and/or responsive to a selection from a watermark library by a program, such as an operating system 412 and/or an application program 420. For purposes of illustration, a human-perceivable manifestation 450A of the selected watermark 450 is illustrated as two concentric circles with the name of a user "Bob" followed by "Watermark" disposed between the concentric circles. In an alternative embodiment, the selected watermark may be a watermark generated by a watermark generation program that is a part of an ancillary module 434. An access restrictor module 422 may restrict access to the selected watermark to an authorized program running in the computing environment, such as the operating system 412 and/or an application program 420. The operating system 412 may incorporate a human-perceivable manifestation of the selected watermark 450 in each visual area of at least two human-visual areas 442 and 444 displaying an output of an authorized program running in the computing environment. The user "Bob" will know that a window displayed by the display 440 is authentic or genuine when the window includes the selected watermark "Bob's Watermark." Conversely, the user Bob will likewise know that a window not bearing the selected watermark "Bob's Watermark" was not outputted by an authorized program. A non-watermarked window or a wrongly watermarked window may be bitmap spoofing a legitimate window, or may be a window outputted by an authorized program such a malware program. The absence of the selected watermark is expected to aid the user Bob in deciding not to interact with a non-watermarked window, and thus not clicking on the non-watermarked window or not entering personal information in boxes displayed in a the non-watermarked window that may be linked to malware.

In an embodiment, the computing device 410 of FIG. 18 includes an information store 426 configured by computer program that includes computer program instructions. The computer program may be included in the operating system 412 and/or an application program 420. The computer program instructions are operable to perform a process in a computer processor. The process includes receiving an indication of a selected watermark, illustrated as the human-perceivable manifestation 450A of the selected watermark 450. The process also includes allowing a control program privileges in the selected watermark. In another embodiment, the allowing a control program privileges may be implemented using the access restrictor module 422. The process further includes associating a human-perceivable manifestation of the selected watermark with each visual area of at least two visual areas 442 and 444 generated for a human viewable display of an output of the operating system.

In a further embodiment, the process including receiving an indication of a selected watermark 450 further includes a process including receiving an indication of a selected watermark. The selected watermark including at least one of a user-originated watermark, a user selected watermark, a watermark selected by a user from at least two watermarks, a watermark selected by a user from a library of watermarks that includes at least two human-differentiable watermarks, a watermark selected from at least two human-differentiable polymorphic watermarks, a watermark generated in response to an algorithm, and/or a watermark selected from at least two human-differentiable watermarks in response to an algorithm. In another embodiment, the process including allowing a control program privileges in the selected watermark further includes a process including allowing a control program full privileges in the selected watermark and limited privileges in the selected watermark for all other programs. In a further embodiment, the process including allowing a control program privileges in the selected watermark further includes a process including allowing at least one of an operating system, a database management system, and/or a communications protocol privileges in the selected watermark.

In an embodiment, the process including allowing a control program privileges in the selected watermark 450 further includes a process including allowing at least one of an operating system, a database management system, and/or a communications protocol privileges in the selected watermark. In another embodiment, the process including allowing a control program privileges in the selected watermark further includes a process including allowing a control program full privileges in the selected watermark and another program a limited privilege in the selected watermark. In a further embodiment, the process including allowing a control program privileges in the selected watermark further includes a process including allowing a control program full privileges in the selected watermark and another program a read-only privilege in the selected watermark. In another embodiment, the process including allowing a control program privileges in the selected watermark further includes a process including allowing a control program full privileges in the selected watermark and denying another program privileges in the selected watermark.

In an embodiment, the computing device 410 further includes a display surface 441 operable to display each visual area of at least two visual areas 442 and 444 generated for a human viewing of an output of the operating system 412. In another embodiment, the computing device further includes a human user interface 436 operable to receive an indication of the selected watermark 450 in response to a user action.

FIG. 19 illustrates an exemplary computer program product 500. The computer program product includes a computer-readable signal-bearing medium 505 bearing computer program instructions 510. The program instructions are operable to perform a process in a computing device of a computing environment. The process includes receiving an indication of a selected watermark, and allowing an operating system privileges in the selected watermark. The process also includes associating a visible manifestation of the selected watermark with each visual area of at least two human-visual areas generated for displaying an output of the operating system.

In an alternative embodiment, the computer program instructions 510 allowing an operating system privileges in the selected watermark further includes allowing an operating system full privileges in the selected watermark. In another alternative embodiment, the computer program instructions allowing an operating system privileges in the selected watermark further includes allowing an operating system full privileges in the selected watermark and allowing another program limited privileges in the selected watermark 512. In a further embodiment, the computer program instructions the allowing an operating system privileges in the selected watermark further includes allowing an operating system full privileges in the selected watermark and allowing another program read-only privileges in the selected watermark 514.

In another embodiment, the computer-readable signal-bearing medium 505 includes a computer storage medium 522. In a further embodiment, the computer-readable signal-bearing medium includes a communication medium 524.

Figure 20:
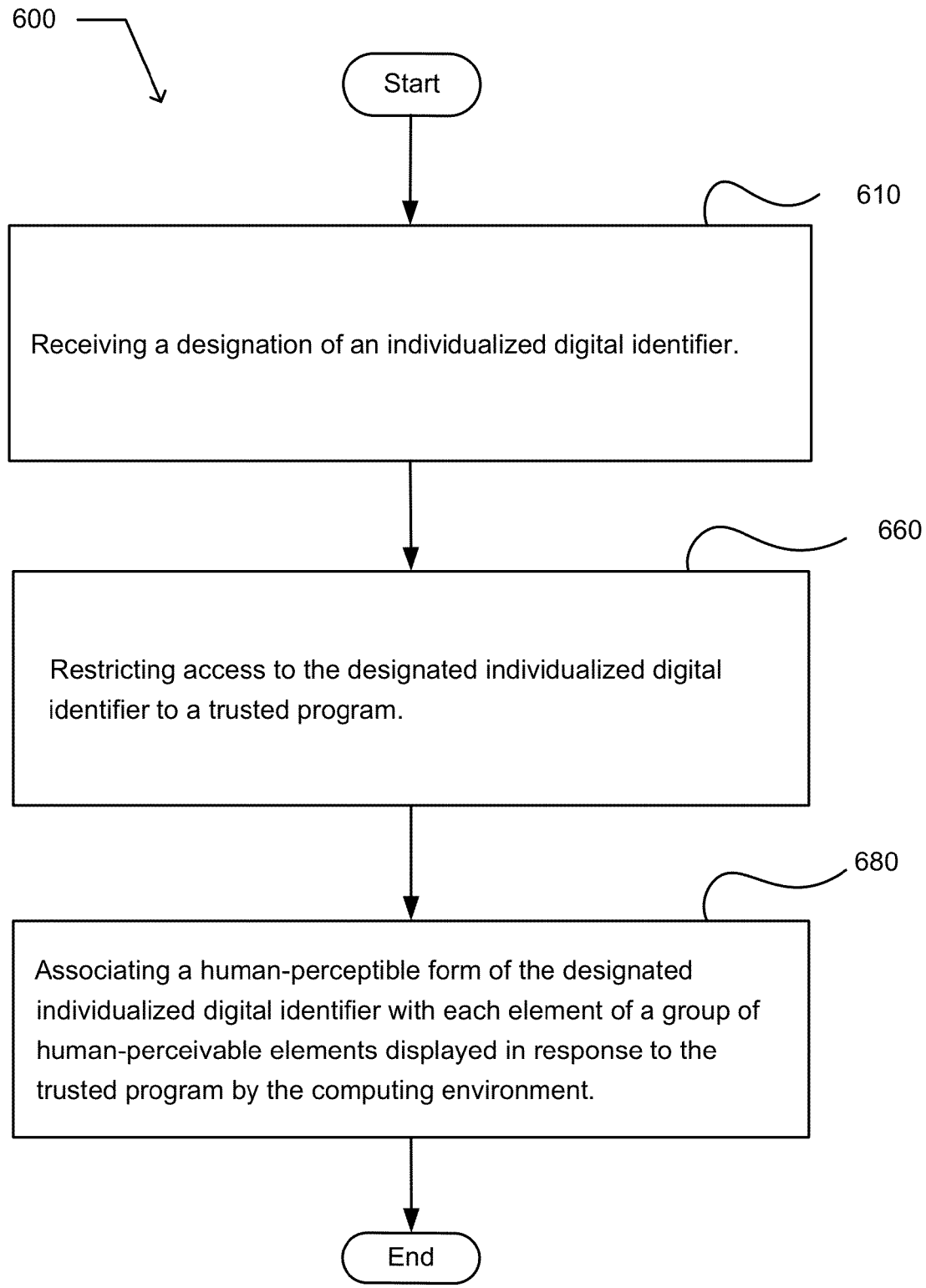
FIG. 20 illustrates an exemplary operational flow implemented in a computing environment.

FIG. 20 illustrates an exemplary operational flow 600 implemented in a computing environment. In an embodiment, the operational flow may be implemented using the computing system environment 100 of FIG. 1, and/or the exemplary environment 400 of FIG. 18. After a start operation, the operational flow 600 moves to an acquiring operation 610. The acquiring operation receives a designation of an individualized digital identifier. A rights management operation 660 restricts access to the designated individualized digital identifier to a trusted program. A relationship operation 680 associates a human-perceptible form of the designated individualized digital identifier with each element of a group of human-perceivable elements displayed in response to the trusted program by the computing environment. The operational flow then moves to an end operation.

In an embodiment, the individualized digital identifier may include any individualized digital identifier useful to an individual human user in recognizing an authentic nature of a content, and/or in differentiating between an authentic content and a false, misleading, and/or a spoofed content. In another embodiment, the individualized digital identifier may include a watermark. In a further embodiment, individualized digital identifier may include an individualized distinguishing tool. In an embodiment, the individualized digital identifier may include a relatively unique individualized digital identifier. The unique individualized digital identifier may include, a semi-unique individualized digital identifier may include, and/or an individualized digital identifier not likely to be at least substantial duplicated by a predetermined percentage of human users. For example, an individualized digital identifier may include an individualized digital identifier not likely to be at least substantially duplicated by no more than 10% of other digital identifiers. In another embodiment, the individualized digital identifier may include an individualized digital identifier having at least one of a visual, sound, tactile, and/or haptic aspect.

Figure 21:
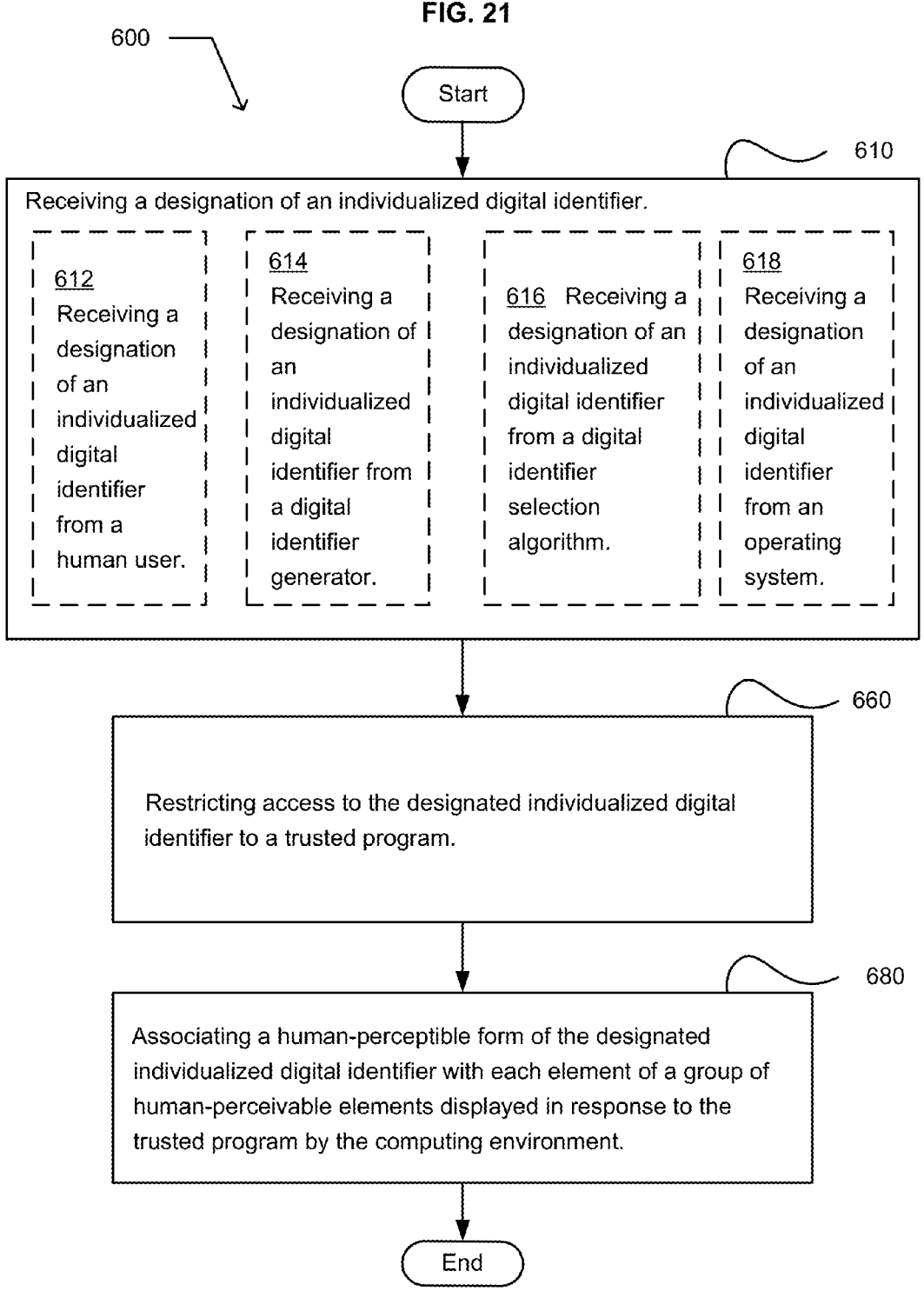
FIG. 21 illustrates an alternative embodiment of the exemplary operational flow of FIG. 20.

FIG. 21 illustrates an alternative embodiment of the exemplary operational flow 600 of FIG. 20. The acquiring operation 610 may include at least one additional operation. The at least one additional operation may include an operation 612, an operation 614, an operation 616, and/or an operation 618. The operation 612 receives a designation of an individualized digital identifier from a human user. The operation 614 receives a designation of an individualized digital identifier from a digital identifier generator. The operation 616 receives a designation of an individualized digital identifier from a digital identifier selection algorithm. The operation 618 receives a designation of an individualized digital identifier from an operating system.

Figure 22:
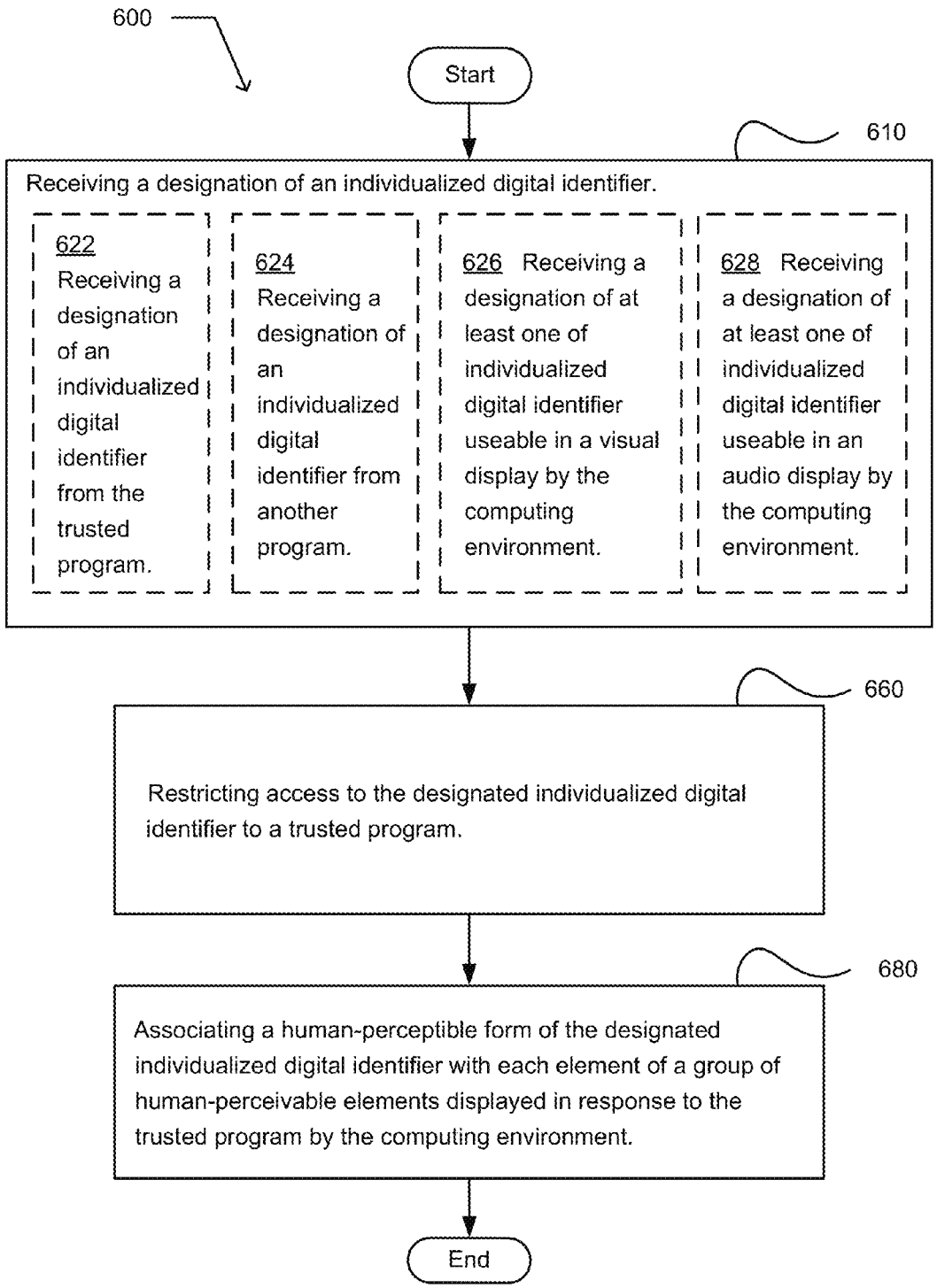
FIG. 22 illustrates another alternative embodiment of the exemplary operational flow of FIG. 20.

FIG. 22 illustrates another alternative embodiment of the exemplary operational flow 600 of FIG. 20. The acquiring operation 610 may include at least one additional operation. The at least one additional operation may include an operation 622, an operation 624, an operation 626, and/or an operation 628. The operation 622 618 receives a designation of an individualized digital identifier from the trusted program. The operation 624 receives a designation of an individualized digital identifier from another program. The operation 626 receives a designation of at least one of individualized digital identifier useable in a visual display by the computing environment. The operation 628 receives a designation of at least one of individualized digital identifier useable in an audio display by the computing environment.

Figure 23:
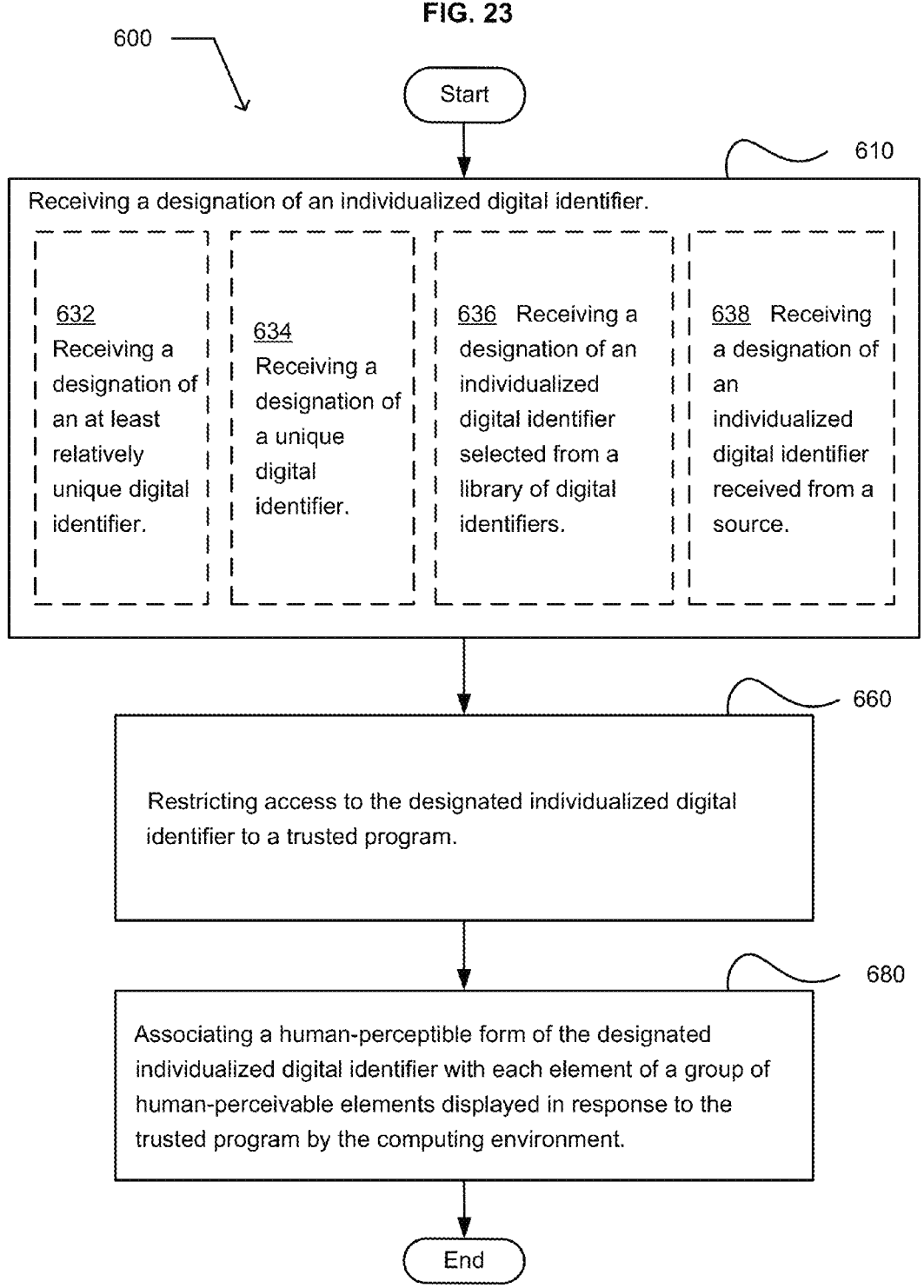
FIG. 23 illustrates a further alternative embodiment of the exemplary operational flow of FIG. 20.

FIG. 23 illustrates a further alternative embodiment of the exemplary operational flow 600 of FIG. 20. The acquiring operation 610 may include at least one additional operation. The at least one additional operation may include an operation 632, an operation 634, an operation 636, and/or an operation 638. The operation 632 receives a designation of an at least relatively unique digital identifier. The operation 634 receives a designation of a unique digital identifier. The operation 636 receives a designation of an individualized digital identifier selected from a library of digital identifiers. The operation 638 receives a designation of an individualized digital identifier received from a source.

Figure 24:
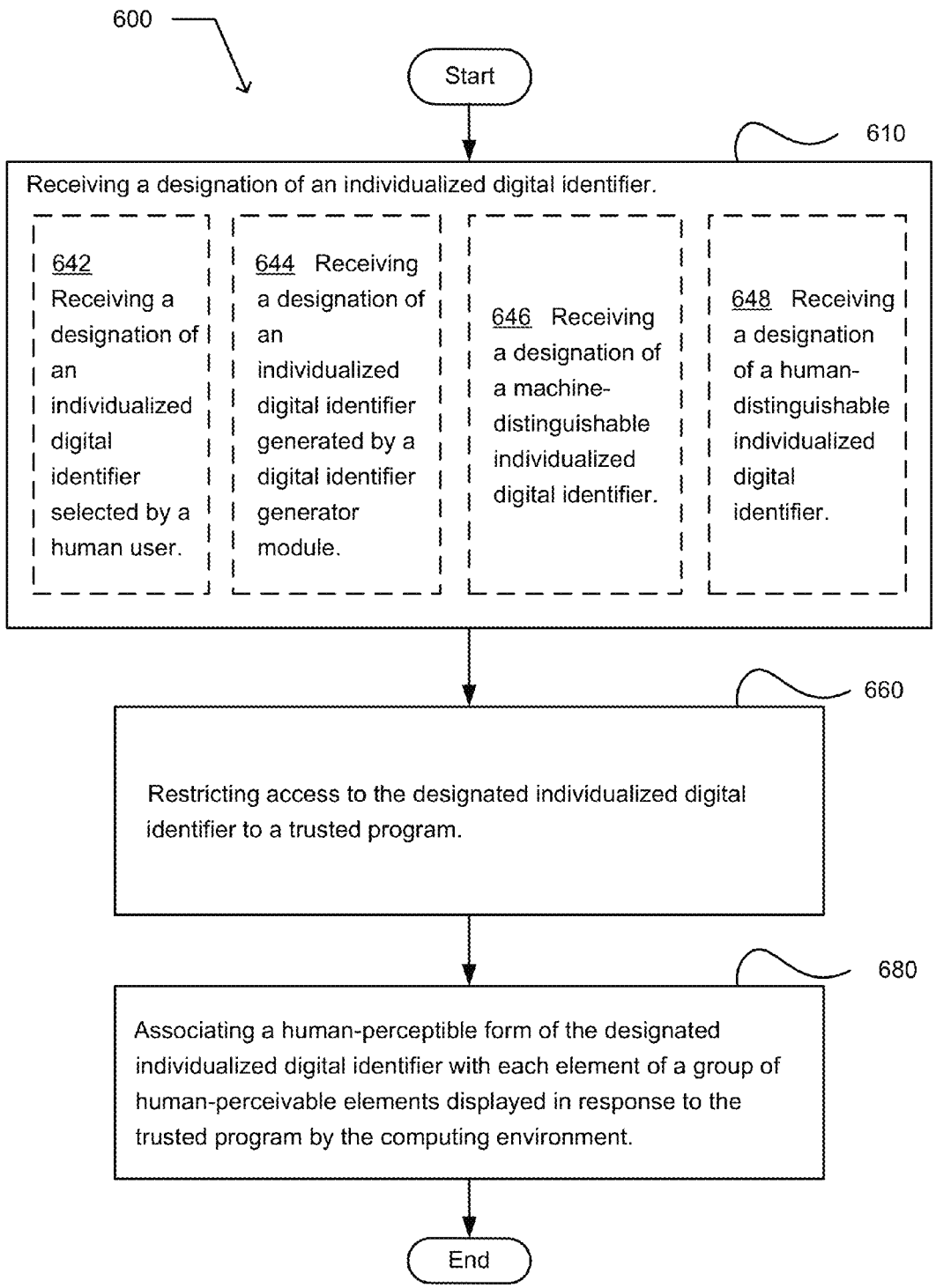
FIG. 24 illustrates an alternative embodiment of the exemplary operational flow of FIG. 20.

FIG. 24 illustrates an alternative embodiment of the exemplary operational flow 600 of FIG. 20. The acquiring operation 610 may include at least one additional operation. The at least one additional operation may include an operation 642, an operation 644, an operation 646, and/or an operation 648. The operation 642 receives a designation of an individualized digital identifier selected by a human user. The operation 644 receives a designation of an individualized digital identifier generated by a digital identifier generator module. The operation 646 receives a designation of a machine-distinguishable individualized digital identifier. The operation 648 receives a designation of a human-distinguishable individualized digital identifier.

Figure 25:
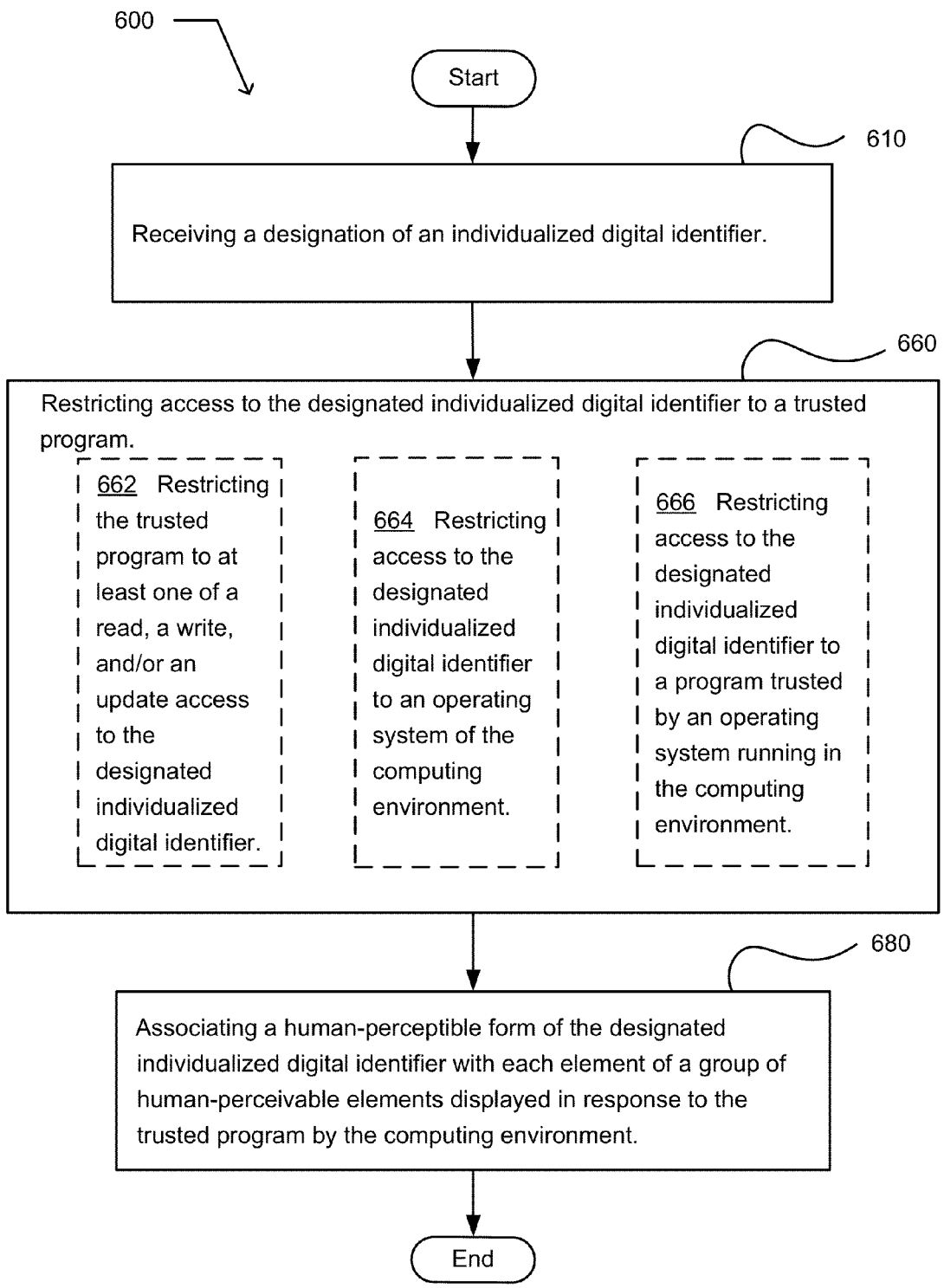
FIG. 25 illustrates another alternative embodiment of the exemplary operational flow of FIG. 20.

FIG. 25 illustrates another alternative embodiment of the exemplary operational flow 600 of FIG. 20. The rights management operation 660 may include at least one additional operation. The at least one additional operation may include an operation 662, an operation 664, and/or an operation 666. The operation 662 restricts the trusted program to at least one of a read, a write, and/or an update access to the designated individualized digital identifier. The operation 664 restricts access to the designated individualized digital identifier to an operating system of the computing environment. The operation 666 restricts access to the designated individualized digital identifier to a program trusted by an operating system running in the computing environment.

Figure 26:
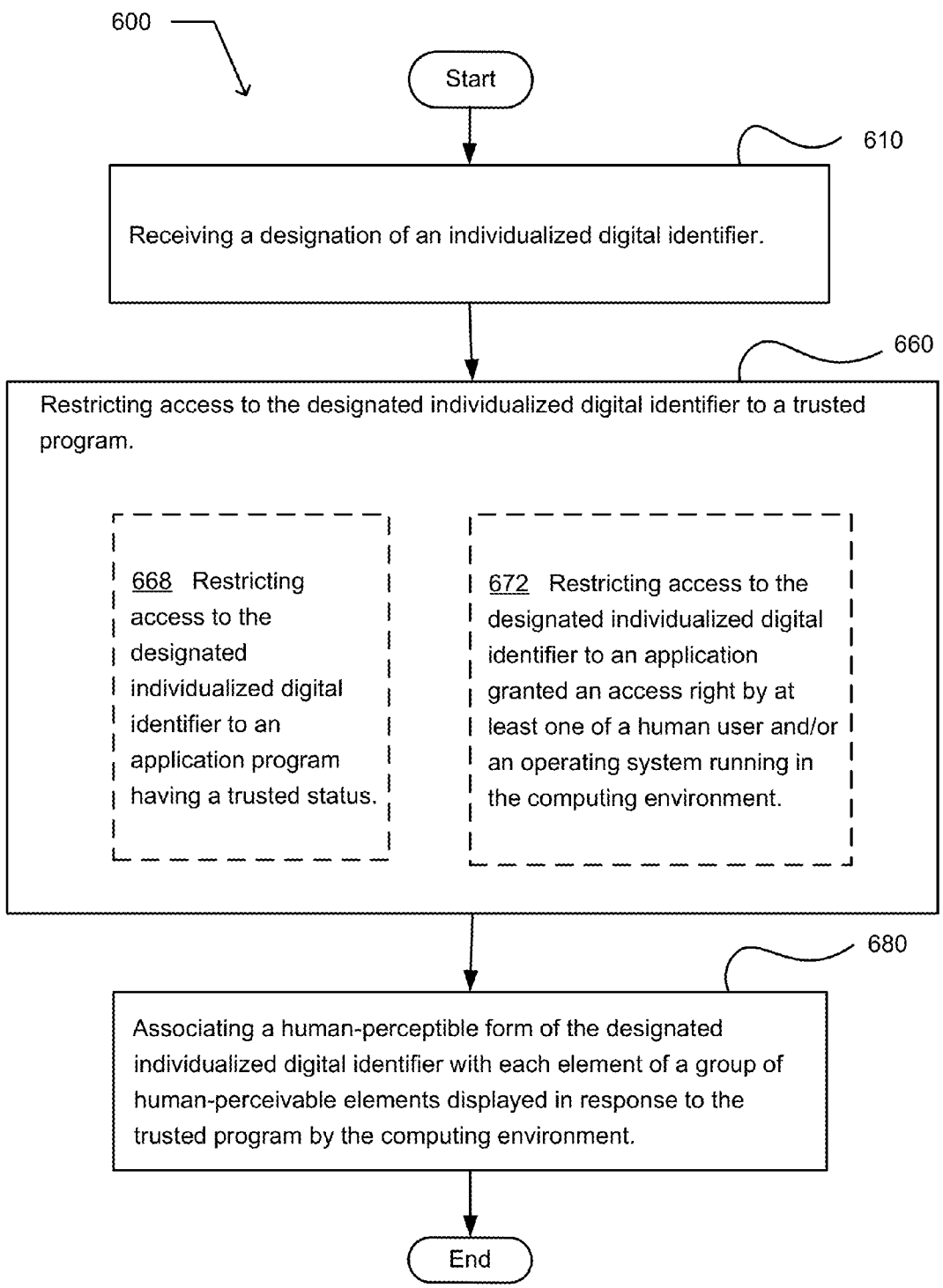
FIG. 26 illustrates a further alternative embodiment of the exemplary operational flow of FIG. 20.

FIG. 26 illustrates a further alternative embodiment of the exemplary operational flow 600 of FIG. 20. The rights management operation 660 may include at least one additional operation. The at least one additional operation may include an operation 668, and/or an operation 672. The operation 668 restricts access to the designated individualized digital identifier to an application program having a trusted status. The operation 672 restricts access to the designated individualized digital identifier to an application granted an access right by at least one of a human user and/or an operating system running in the computing environment.

Figure 27:
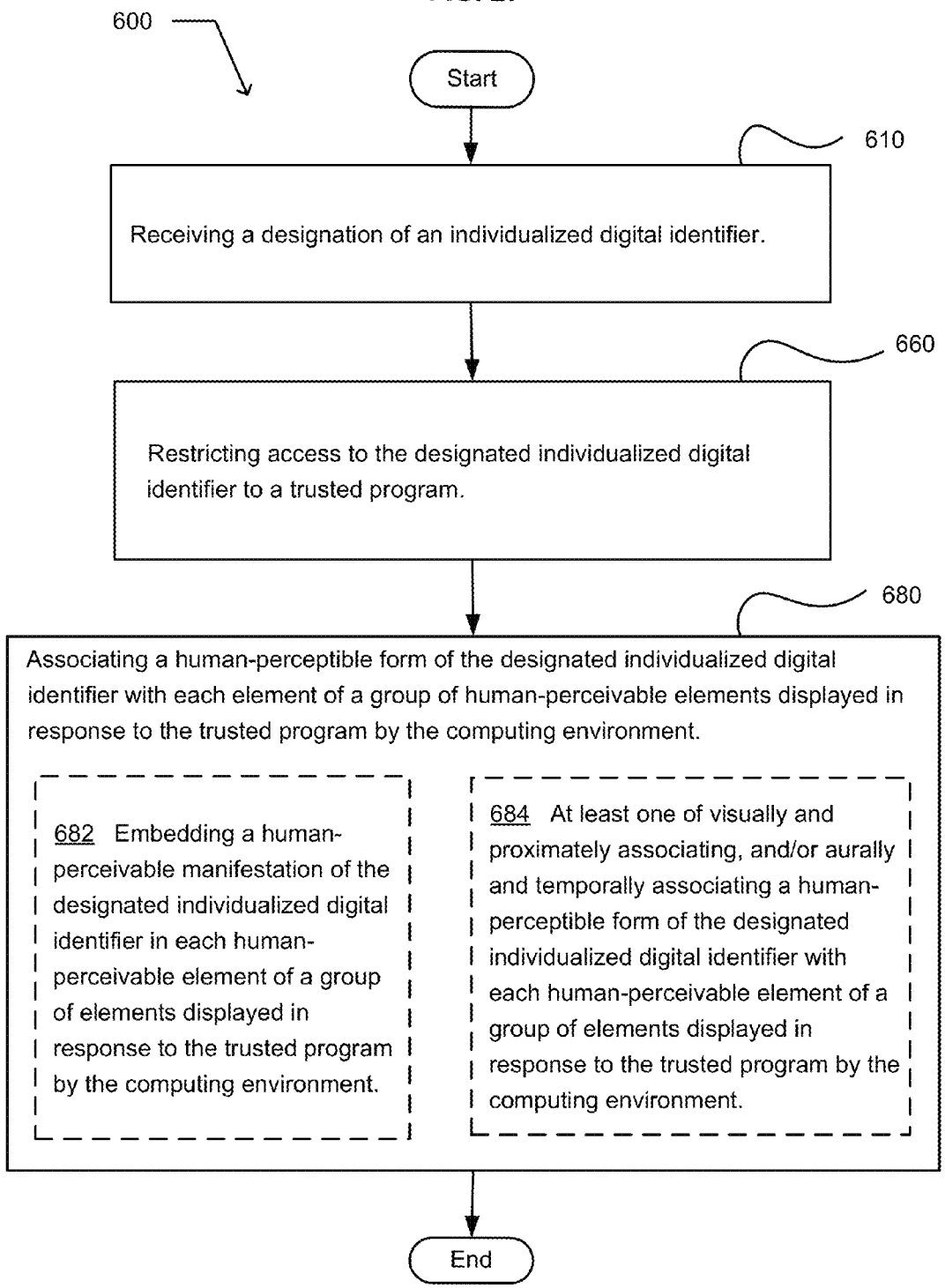
FIG. 27 illustrates an alternative embodiment of the exemplary operational flow of FIG. 20.

FIG. 27 illustrates an alternative embodiment of the exemplary operational flow 600 of FIG. 20. The relationship operation 680 may include at least one additional operation. The at least one additional operation may include an operation 682, and/or an operation 684. The operation 682 embeds a human-perceivable manifestation of the designated individualized digital identifier in each human-perceivable element of a group of elements displayed in response to the trusted program by the computing environment. The operation 684 at least one of visually and proximately associates, and/or aurally and temporally associates a human-perceptible form of the designated individualized digital identifier with each human-perceivable element of a group of elements displayed in response to the trusted program by the computing environment.

Figure 28:
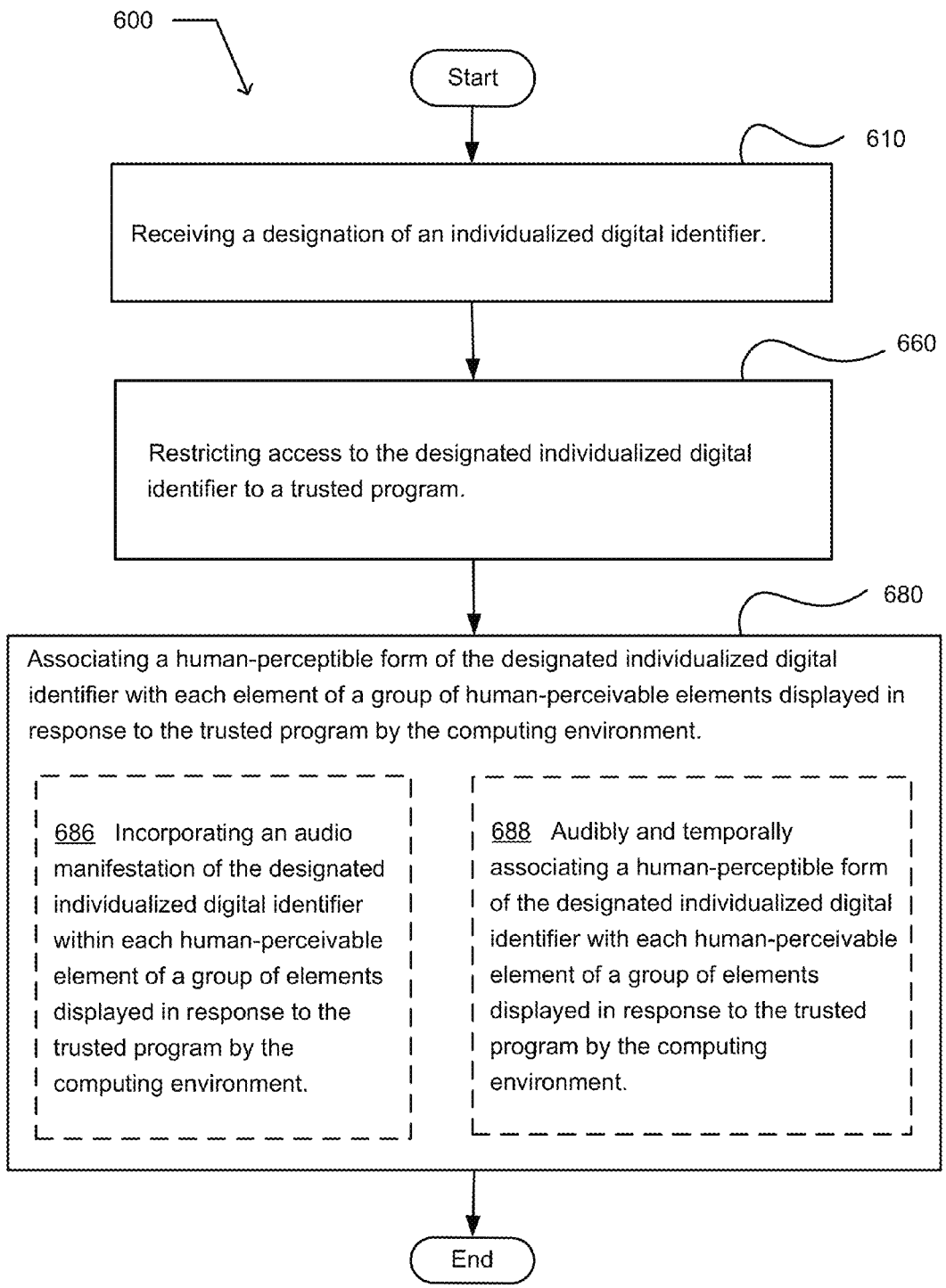
FIG. 28 illustrates another embodiment of the exemplary operational flow of FIG. 20.

FIG. 28 illustrates another embodiment of the exemplary operational flow 600 of FIG. 20. The relationship operation 680 may include at least one additional operation. The at least one additional operation may include an operation 684, and/or an operation 686. The operation 686 incorporates an audio manifestation of the designated individualized digital identifier within each human-perceivable element of a group of elements displayed in response to the trusted program by the computing environment. The operation 688 audibly and temporally associates a human-perceptible form of the designated individualized digital identifier with each human-perceivable element of a group of elements displayed in response to the trusted program by the computing environment.

Figure 29:
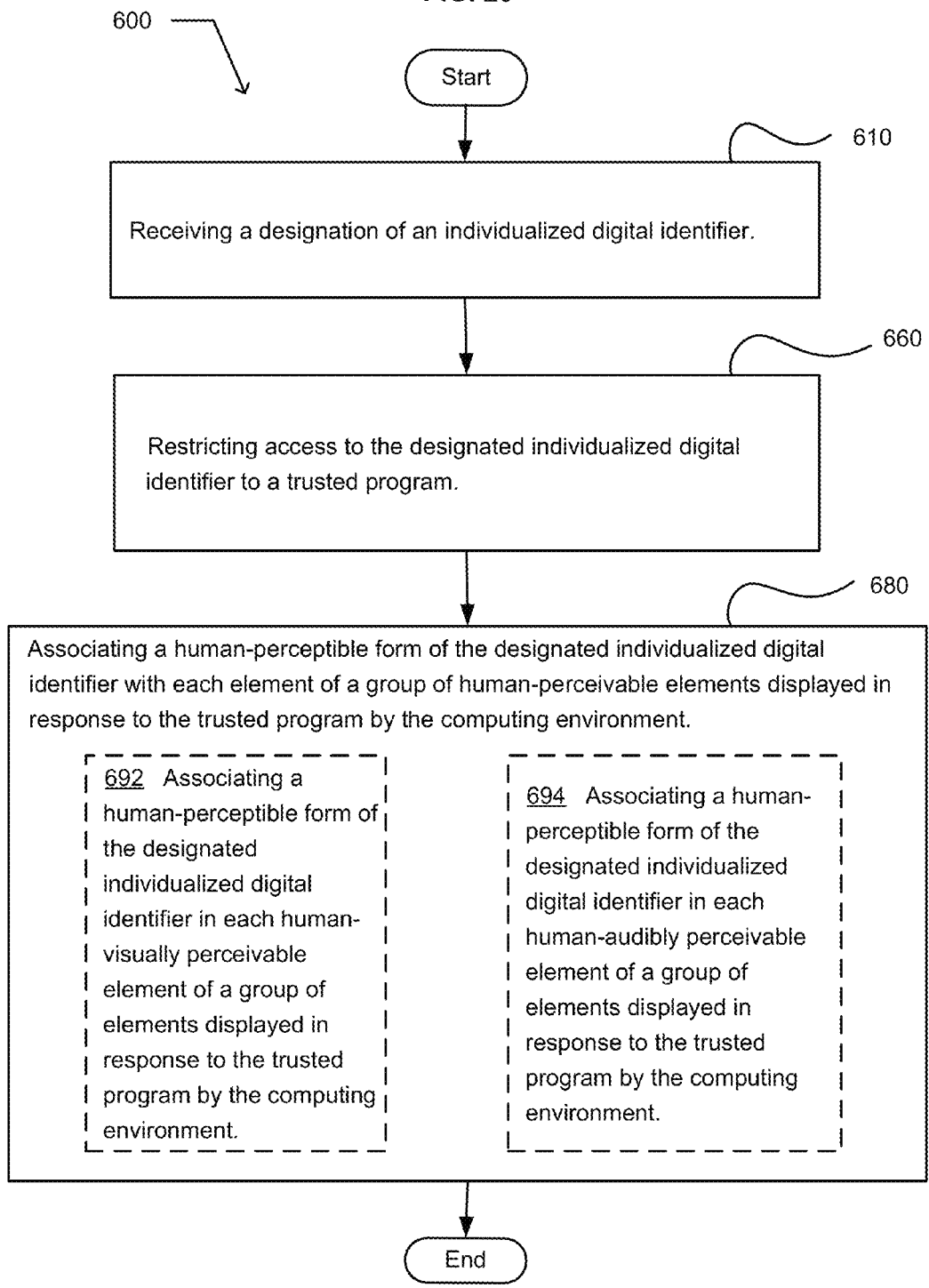
FIG. 29 illustrates a further embodiment of the exemplary operational flow of FIG. 20.

FIG. 29 illustrates a further embodiment of the exemplary operational flow 600 of FIG. 20. The relationship operation 680 may include at least one additional operation. The at least one additional operation may include an operation 692, and/or an operation 694. The operation 692 associates a human-perceptible form of the designated individualized digital identifier in each human-visually perceivable element of a group of elements displayed in response to the trusted program by the computing environment. The operation 694 associates a human-perceptible form of the designated individualized digital identifier in each human-audibly perceivable element of a group of elements displayed in response to the trusted program by the computing environment.

Figure 30:
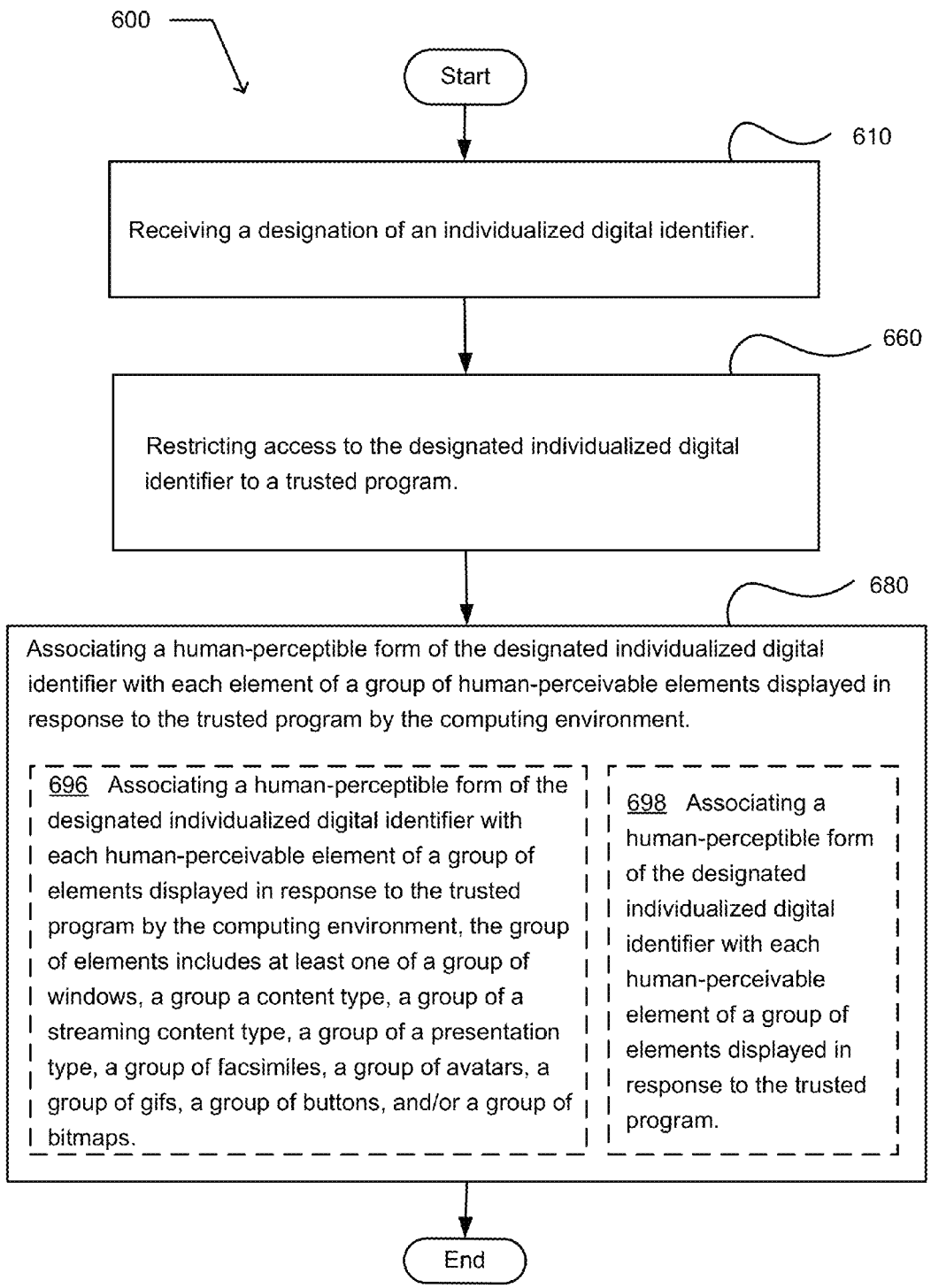
FIG. 30 illustrates an embodiment of the exemplary operational flow of FIG. 20.

FIG. 30 illustrates an embodiment of the exemplary operational flow 600 of FIG. 20. The relationship operation 680 may include at least one additional operation. The at least one additional operation may include an operation 696, and/or an operation 698. The operation 696 associates a human-perceptible form of the designated individualized digital identifier with each human-perceivable element of a group of elements displayed in response to the trusted program by the computing environment, the group of elements includes at least one of a group of windows, a group a content type, a group of a streaming content type, a group of a presentation type, a group of facsimiles, a group of avatars, a group of gifs, a group of buttons, and/or a group of bitmaps. The operation 698 associates a human-perceptible form of the designated individualized digital identifier with each human-perceivable element of a group of elements displayed in response to the trusted program.

Figure 31:
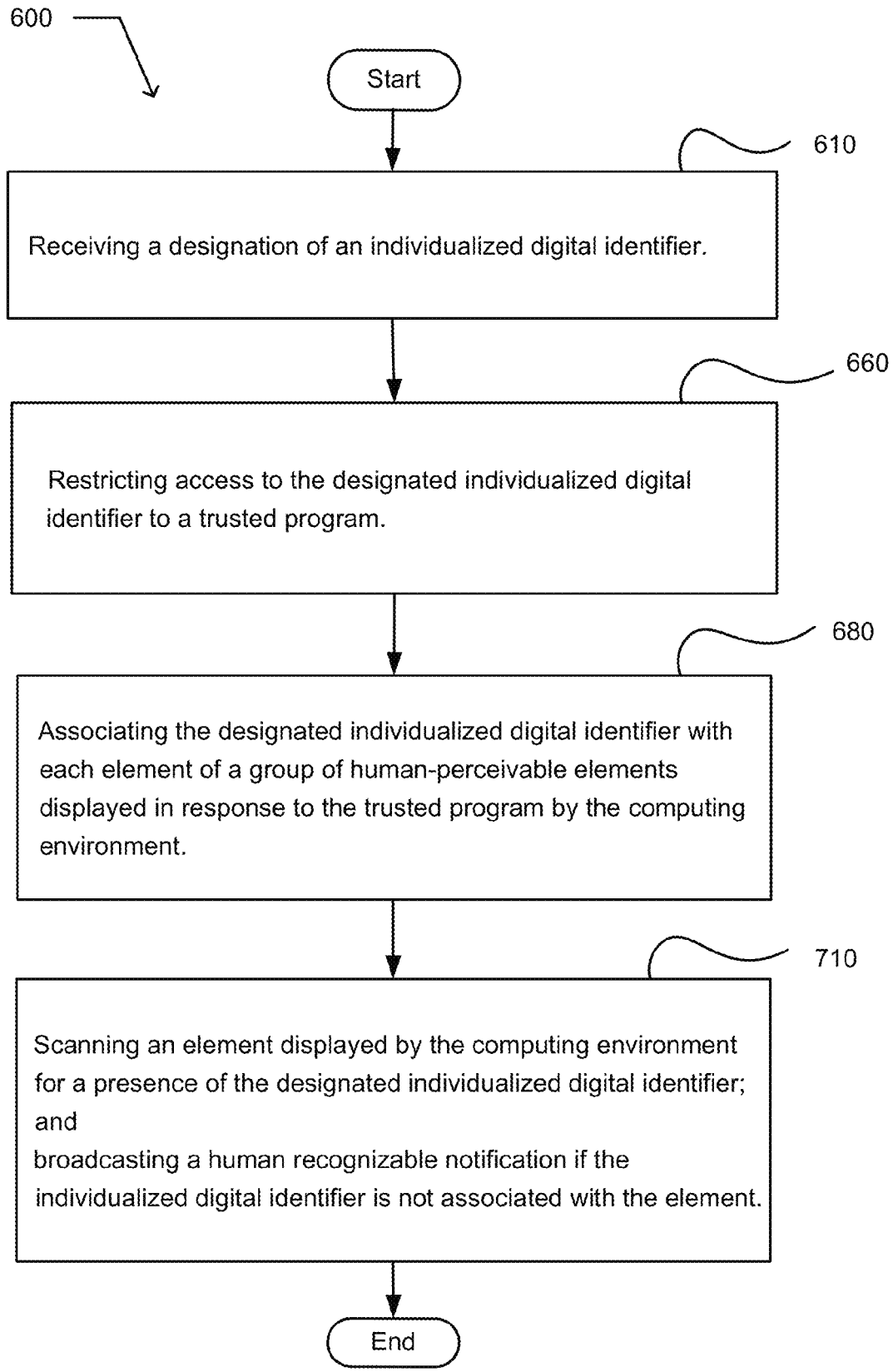
FIG. 31 illustrates an alternative embodiment of the exemplary operational flow of FIG. 20.

FIG. 31 illustrates an alternative embodiment of the exemplary operational flow 600 of FIG. 20. The exemplary operational flow 600 may include at least one additional operation. The at least one additional operation may include an operation 710. The operation 710 scans an element displayed by the computing environment for a presence of the designated individualized digital identifier; and broadcasts a human recognizable notification if the individualized digital identifier is not associated with the element.

Returning to FIG. 20, an alternative embodiment of the operational flow 600 is includes an operational flow 600A. After a start operation, the operational flow 600 moves to an acquiring operation 610. The acquiring operation receives a designation of an individualized digital identifier. A relationship operation 680 associates a human-perceptible form of the designated individualized digital identifier with each element of a group of human-perceivable elements displayed by the computing environment. In an embodiment, the relation operation respectfully associates a human-perceptible form of the designated individualized digital identifier with each element of a group of human-perceivable elements when both the designated individualized digital identifier and each element of a group of human-perceivable elements are displayed.

Figure 32:
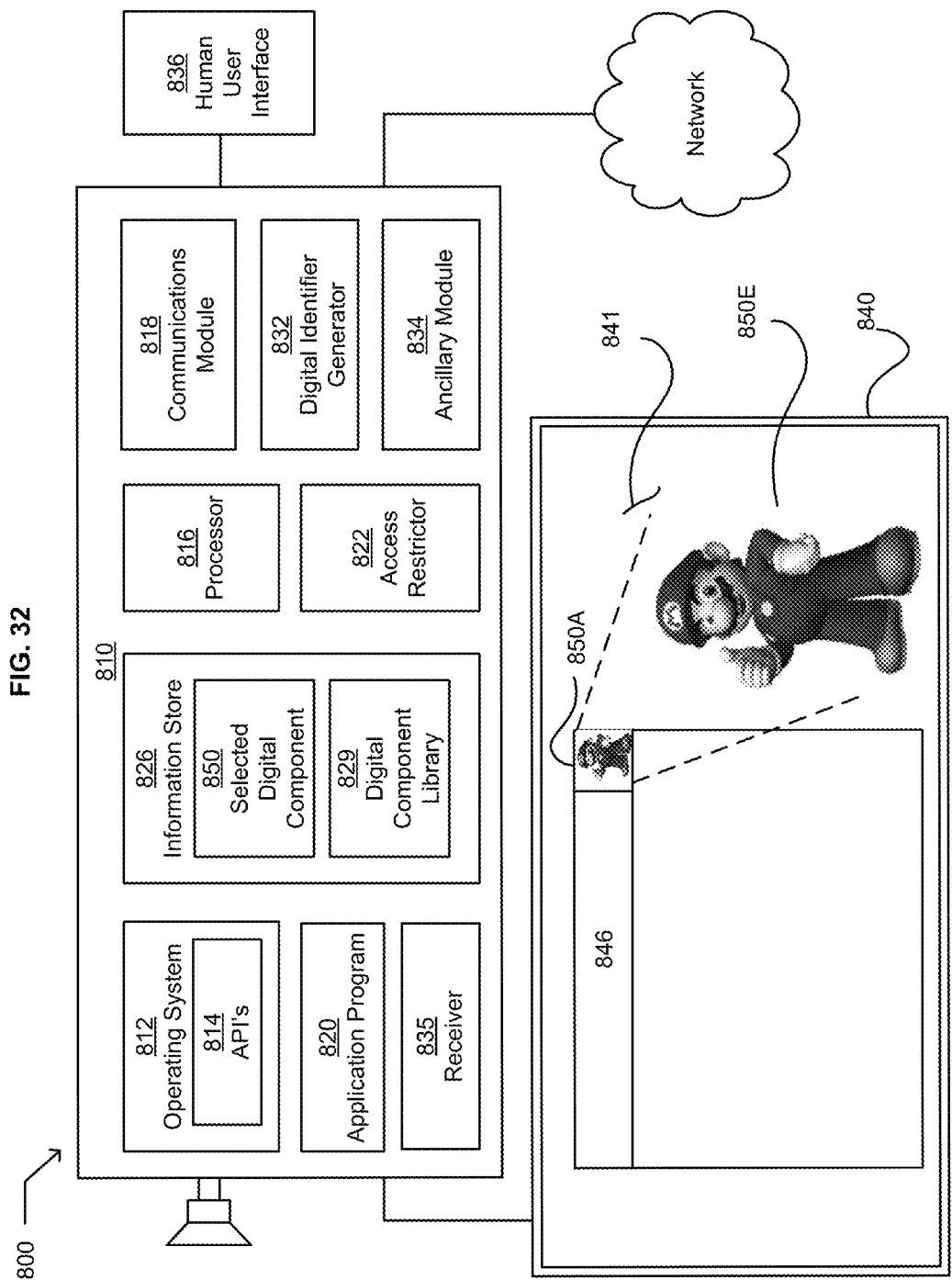
FIG. 32 illustrates an exemplary computing environment in which embodiments of the operational flow may be implemented.

FIG. 32 illustrates an exemplary computing environment 800 in which embodiments of the operational flow 600 may be implemented. The computing environment includes a computing device 810, a human user interface 836, and a visual display 840. The visual display may include visual display of a CRT, a LCD, a laptop display, a desktop monitor, and/or a screen of a portable electronic device, such as a cell phone, a personal digital assistant, or a Blackberry© RIM. The visual display illustrates a display surface 841 operable to display an output of a trusted program running in the computing environment. The display surface is also operable to display at least one human-perceivable element, illustrated as a human-visual display area 846. The display area is illustrated as a window, such as may be generated by a Microsoft Windows XP operating system or by an Apple Mac OS X operating system. The computing environment illustrates an example where a Mario Brother Icon© Nintendo constitutes a human-perceptible form 850A of the selected digital component 850 by the operation 610 of operational flow 600. For example, the digital component may have been received from or selected by a hypothetical human user named "Roy" for illustration purposes. Alternatively, the digital component may have been selected from a digital component library 829 by a digital identifier generator 832. In another alternative, the digital identifier generator may have generated the particular colors and/or style of the selected digital component. An enlarged version of the Mario Brother received digital component (icon)) 850E is provided for additional clarity. The human-perceptible Mario Brother icon is associated with each human-visual display area of a group of human-visual display areas, for example by placement in a right hand corner of a title bar of the display area 846. By observing the Mario Brother icon associated with each element of a group of elements, "Roy" will have information on which he may base a decision whether each element is displayed in response to the trusted program by the computing environment.

Figure 33:
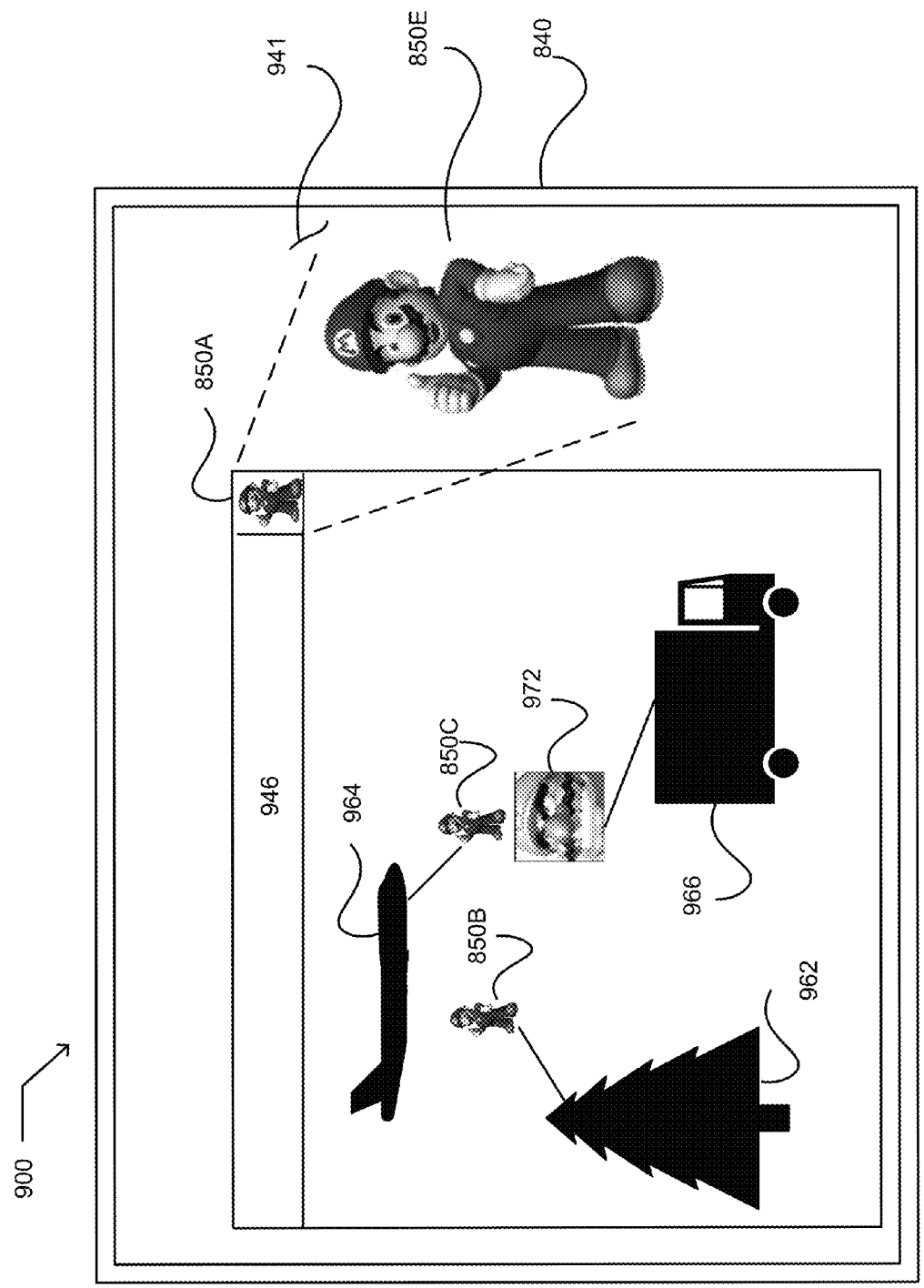
FIG. 33 illustrates an exemplary display environment that may be provided by the computing environment of FIG. 32.

FIG. 33 illustrates an exemplary display environment 900 that may be provided by the computing environment 800 of FIG. 32. The visual display 840 is illustrated as including a visual display surface 941 operable to display a window 946 operable to display a group of elements in response to a trusted program of the computing environment 800. The group of elements is illustrated as a tree 962, an airplane 964, and a truck 966. In an embodiment, at least one of the elements may be dynamic, such as moving relative to a plane of the visual display surface, or rotating about an axis. For example, the tree may be swaying as if blown by a wind, the airplane may move across the window 946 as if flying, and the truck may move across the window as if being driven. By way of further example, the airplane may also drop bombs (not illustrated). The selected digital component 850 Mario Brother is associated with each element displayed in response to a trusted program running in the computing environment. The window 946 displays a Mario Brother icon 850A associated in an upper right corner, the tree has a Mario Brother icon 850B proximately associated, and the airplane has a Mario Brother icon 850C also proximately associated. These associations indicate that the elements are displayed in response to a trusted program. However, the truck does not have a Mario Brother icon associated with it. Instead, a villain icon 972 from Super Mario Bros.© Nintendo is proximately displayed, indicating to the user "Roy"

that the truck is a spoofed or a masquerading element displayed in response to a non-trusted program. A non-trusted program may be was restricted from accessing the designated digital component by the rights management operation 660 of the operational flow 600 described in conjunction with FIG. 20. In another embodiment, the truck may not have any digital component associated with it. Such absence of an associated digital component also indicates to the user "Roy" that the truck is a spoofed or a masquerading element displayed in response to a non-trusted program.

Figure 34:
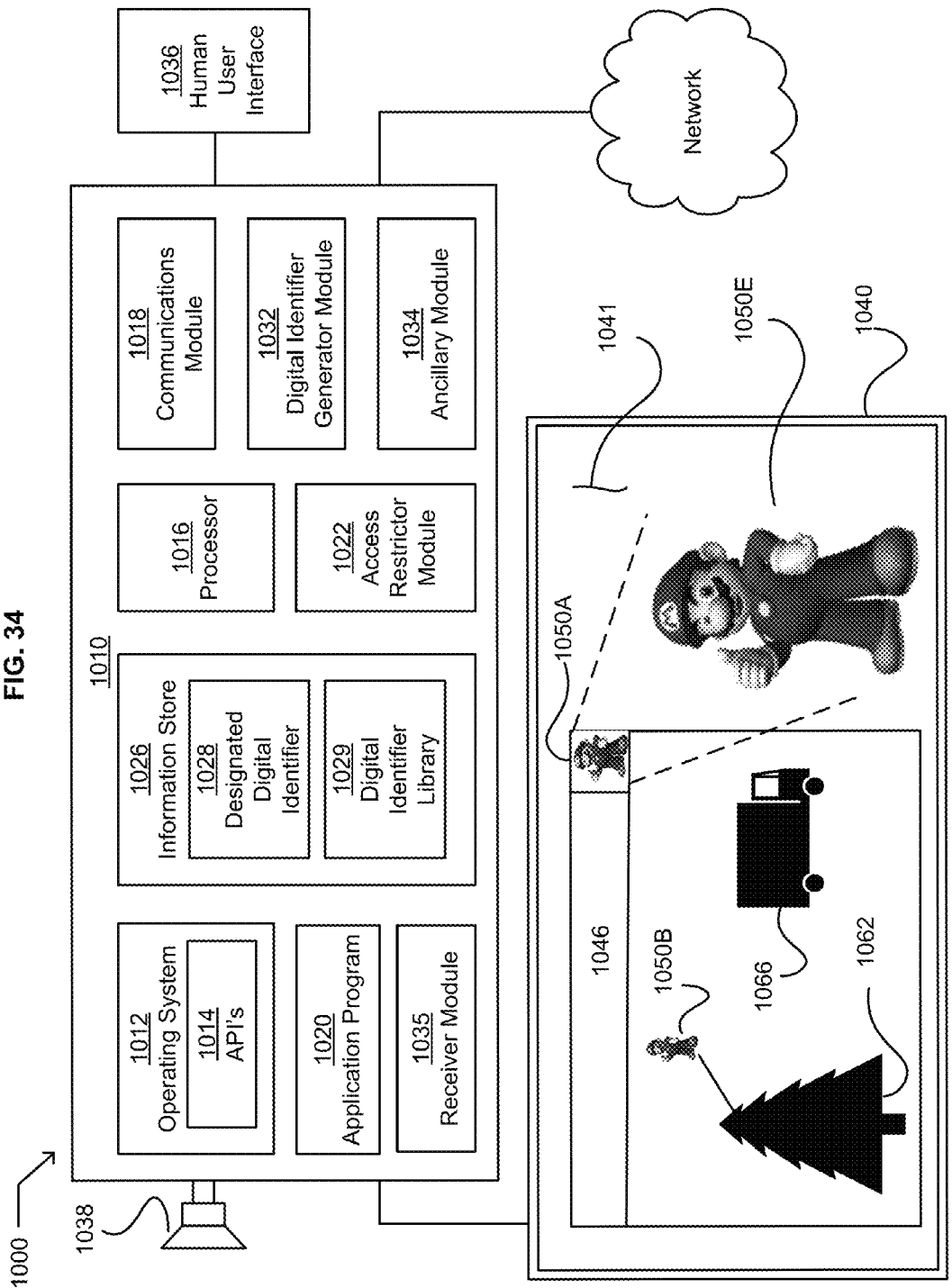
FIG. 34 illustrates an exemplary computing environment in which embodiments may be implemented.

FIG. 34 illustrates an exemplary computing environment 1000 in which embodiments may be implemented. The computing environment includes a computing device 1010 coupled with a network, a human user interface 1036, an audio display 1038, and a visual display 1040.

The computing device 1010 also includes an information store 1026 configurable by a computer program. The computer program may be included in an operating system 1012, an application program 1020, and/or another program. The computer program may be a stand-alone program. The computer program includes instructions operable to perform a process in a processor 1016. The process includes receiving a designation of an individualized digital identifier. The designation may be received by a receiver module 1035 from any source, including from a user via the human user interface 1036, a generator module 1032, and/or a selector module. In an embodiment, the process including receiving a designation of an individualized digital identifier further includes a process including receiving a designation of at least one of an individualized digital visual identifier and/or an individualized digital audio identifier. The process also includes limiting access to the designated individualized digital identifier to an application programming interface (API's 1014) callable by a privileged code. The limiting access may include limiting at least one of a read, a write, and/or an update access. The privileged code may include at least one of an operating system, an application program, and/or an application program granted an access right by at least one of a user and/or the operating system. The process further includes associating a human-perceptible form of the designated individualized digital identifier with each element of a group of elements displayed in response to a program running in the computing device. The visual display includes a display operable to present visually each element of the group of elements to a human user.

The visual display 1040 may include visual display surface 1041 operable to display an output of a program running in the computing device. The display surface is also operable to visually present a group of elements to a human user by at least one human-perceivable area, illustrated as a human-visual display area 1046. The computing environment illustrates an example where the Mario Brother icon constitutes a human-perceptible form of the designated digital component 850 received by the acquiring operation 610 of operational flow 600 of FIG. 20. The display area 1046 is illustrated as including a Mario Brother 1050A associated with the display area 1046, and a Mario Brother 1050B associated with a tree 1062. The display area is also illustrated as including a truck 1066 without the designated digital component associated with it.

FIG. 35 illustrates an exemplary computer program product 1110 in which embodiments may be implemented. The computer program producing includes a computer-readable signal-bearing medium 1105 bearing program instructions 1110. The program instructions are operable to perform a process in a computing device. The process includes receiving a designation of an individualized digital identifier, and restricting access to the designated individualized digital identifier to an operating system program. The process also includes associating a human-perceptible form of the designated individualized digital identifier with each human-perceivable element of a group of elements displayed in response to the operating system program of the computing device. In an embodiment, the process including associating a human-perceptible form of the designated individualized digital identifier with each human-perceivable element of a group of elements displayed in response to the operating system program of the computing device further includes a process 1112 including associating a human-perceptible form of the designated individualized digital identifier with each human-perceivable element of a group of elements displayed in response to the operating system program of the computing device, wherein the group of human-perceivable elements displayed includes at least one of a window, a content, a streaming content, a presentation, a facsimile, an avatar, a gif, a button, and/or a bitmap.

In another embodiment, the computer-readable signal-bearing medium 1105 includes a computer storage medium 1122. In a further embodiment, the computer-readable signal-bearing medium includes a communication medium 1124.

FIG. 36 illustrates an exemplary operational flow 1200 implemented in a computing environment and operable to practice embodiments. After a start operation, the operational flow includes an acquisition operation 1210. The acquisition operation receives an instruction operable to create a visual presentation corresponding to a bitmap content. The acquisition operation may receive the instruction from a remote source, a local source, a computing device, a program, an application program, and/or a program running in the computing environment. The acquisition operation may receive the instruction via a network, such as a LAN, a WAN, and/or the Internet. The acquisition operation may receive one or more instructions which in combination are operable to create a visual presentation corresponding to a bitmap content. The bitmap content may include digital data that includes an indicium of a digital watermark. The bitmap content may include a representation of a window. The bitmap content may include a content, a streaming content, a presentation, a facsimile, an avatar, a gif, a button, and/or a bitmap. The bitmap content may include a content having a TIFF, a GIF, a JPEG, and/or a BMP format.

The operational flow 1200 also includes an inspection operation 1220. The inspection operation determines if the instruction operable to create a visual presentation corresponding to a bitmap content includes an instruction operable to create a visual presentation corresponding to a bitmap content having an indicium of a digital watermark. The operational flow further includes an effectuation operation 1230. In response to the inspection operation 1220, the effectuation operation initiates an action with respect to the instruction operable to create a visual presentation corresponding to a bitmap content. The operational flow moves to an end operation.

The operational flow 1200 may be performed proximate in time to the computing environment receiving the instruction operable to create a visual presentation corresponding to a bitmap content, proximate in time to the computing environment displaying a content responsive to the instruction operable to create a visual presentation corresponding to a bitmap content, or at a time intermediate to the receiving the instruction and the displaying a content.

FIG. 37 illustrates an alternative embodiment of the exemplary operational flow 1200 of FIG. 36. The effectuation operation 1230 may include at least one additional operation. The at least one additional operation may include an operation 1232, an operation 1234, and/or an operation 1236. The operation 1232 initiates a quarantine of the instruction operable to create a visual presentation corresponding to a bitmap content in response to the determining. The operation 1234 initiates an exposure of the instruction operable to create a visual presentation corresponding to a bitmap content to a program associated with the computing environment. The operation 1236 initiates a human-perceptible indication that a visual presentation of the bitmap content is at least unlikely to include a visual presentation of a digital watermark.

FIG. 38 illustrates another alternative embodiment of the exemplary operational flow 1200 of FIG. 36. The effectuation operation 1230 may include at least one additional operation. The at least one additional operation may include an operation 1238, and/or an operation 1242. The operation 1238 initiates a human-perceptible indication that a visual presentation of the bitmap content is at least likely to include a digital watermark not significantly corresponding with a preselected digital watermark associated with the computing environment. The operation 1242 initiates a human-perceptible indication that a visual presentation of the bitmap content will include a digital watermark at least significantly corresponding with an individualized digital watermark associated with the computing environment.

Figure 39:
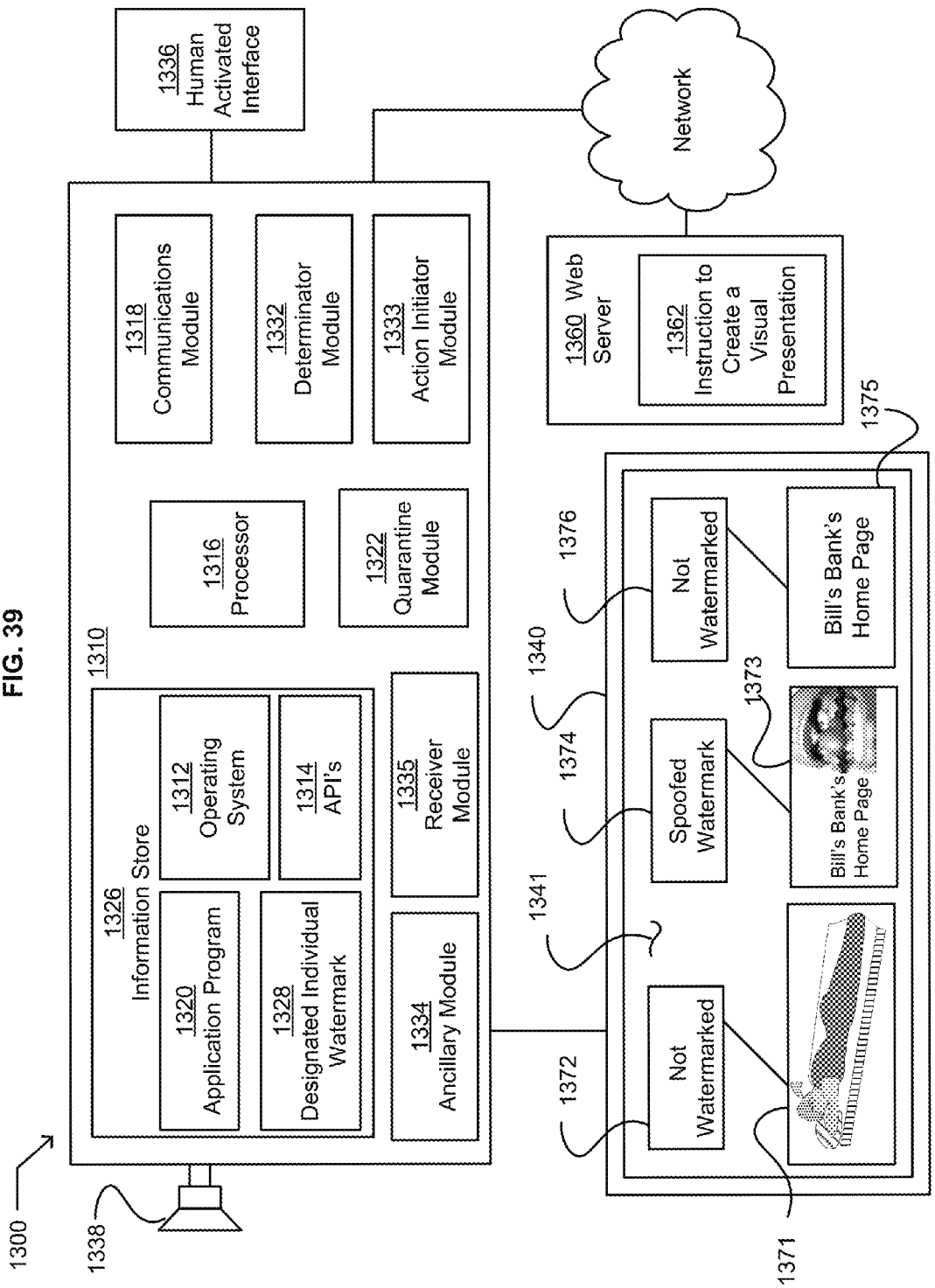
FIG. 39 illustrates an exemplary computing environment in which embodiments of the operational flow of FIG. 36 may be implemented.

FIG. 39 illustrates an exemplary computing environment 1300 in which embodiments of the operational flow 1200 of FIG. 36 may be implemented. In addition, the exemplary computing environment illustrates an environment in which other embodiments may be implemented. The computing environment includes a computing device 1310, a human activated interface 1336, an audio display device 1338 illustrated as a speaker, and a visual display device 1370. The computing device includes an information store configured by computer program that includes computer program instructions. The computer program includes instructions operable to perform a process in a computer processor 1316. The process includes receiving an instruction to create a visual presentation corresponding to a bitmap content. The process also includes determining if the instruction to create a visual presentation corresponding to a bitmap content includes an instruction to create a visual presentation corresponding to a bitmap content having an indicium of a digital watermark. The process further includes initiating an action with respect to the instruction to create a visual presentation corresponding to a bitmap content, the action being responsive to the determining.

In another embodiment, the determining process further includes a process that determines if the instruction to create a visual presentation corresponding to a bitmap content includes an instruction to create a visual presentation corresponding to an individualized digital watermark associated with the computing device. In a further embodiment, the determining process further includes a process that determines if the instruction to create a visual presentation corresponding to a bitmap content includes an instruction to create a visual presentation corresponding to an individualized digital watermark associated with the computing device. The digital watermark may include at least one of a user-originated digital watermark, a user selected digital watermark, a digital watermark selected by a user from at least two digital watermarks, a digital watermark selected by a user from a library of digital watermarks that includes at least two human-differentiable digital watermarks, a digital watermark selected from at least two human-differentiable polymorphic digital watermarks, a digital watermark generated in response to an algorithm, and/or a digital watermark selected from at least two human-differentiable digital watermarks in response to an algorithm.

In an embodiment, the process that receives an instruction further includes a process including receive an instruction to create a visual presentation corresponding to a bitmap content, the instruction to create a visual presentation corresponding to a bitmap content includes at least two instruction that in a combination create a visual presentation corresponding to a bitmap content. In another embodiment, the process that includes initiating an action further includes a process including quarantining the instruction to create a visual presentation corresponding to a bitmap content from a program associated with the computing environment. In a further embodiment, the process that includes initiating an action further includes a process including allowing at least one of an operating system, a database management system, and/or a communications protocol privileges to the instruction to create a visual presentation corresponding to a bitmap content.

In an embodiment, the process that initiates an action further includes a process including allowing at least one program full privileges to the instruction to create a visual presentation corresponding to a bitmap content and limiting another program's privileges to the instruction to create a visual presentation corresponding to a bitmap content. In another embodiment, the process that initiates an action further includes a process including exposing the instruction to create a visual presentation corresponding to a bitmap content to a program associated with the computing environment.

In operation, for illustrative purposes a user named "Bill" looking at a visual display surface 1341 of a display device 1340 may see three elements that include a photograph of a woman sleeping 1371, a window of his bank's home page with a watermark 1373, and a window of his bank's home page 1375 without a watermark. While the three elements might be displayed at least simultaneously, in a more likely example, the elements may be displayed sequentially as Bill uses his computer over time. The photograph of a woman, like most personal photographs, would not expected to include a digital watermark. When Bill views the photograph of woman, an action is initiated that displays a popup box 1372 indicating that the photograph does not contain a digital watermark. This indication reflects Bill's expected property of the personal photograph. When Bill views the window of his bank's home page with a watermark 1373, he may expect to see a watermark. However, an action is initiated that displays a popup box 1374 warning Bill that visual presentation of his bank's home page includes a spoofed watermark. Bill may use the information provided by the popup box 1374 to avoid any interaction with the visual presentation of his bank's home page. When Bill views the window of his bank's home page without a watermark 1375, he may not notice that his expected digital watermark is absent. An action is initiated that displays a popup box 1376 warning Bill that visual presentation of his bank's home page does not include a watermark. Bill may use the information provided by the popup box 1376 to avoid any interaction with the visual presentation of his bank's home page.

FIG. 40 illustrates an exemplary computer program product 1400 in which embodiments may be implemented. The computer program product includes a computer-readable signal-bearing medium 1405 bearing program instructions 1410. The program instructions are operable to perform a process in a computing device of a computing environment. The process includes receiving an instruction operable to create a visual presentation corresponding to a bitmap content. The process also includes determining if the instruction operable to create a visual presentation corresponding to a bitmap content includes an instruction operable to create a visual presentation corresponding to a bitmap content having an indicium of a digital watermark. The process further includes initiating an action with respect to the instruction operable to create a visual presentation corresponding to a bitmap content in response to the determining.

In an embodiment, the computer-readable signal-bearing medium 1405 includes a computer storage medium 1422. In another embodiment, the computer-readable signal-bearing medium includes a communication medium 1424.

Figure 41:
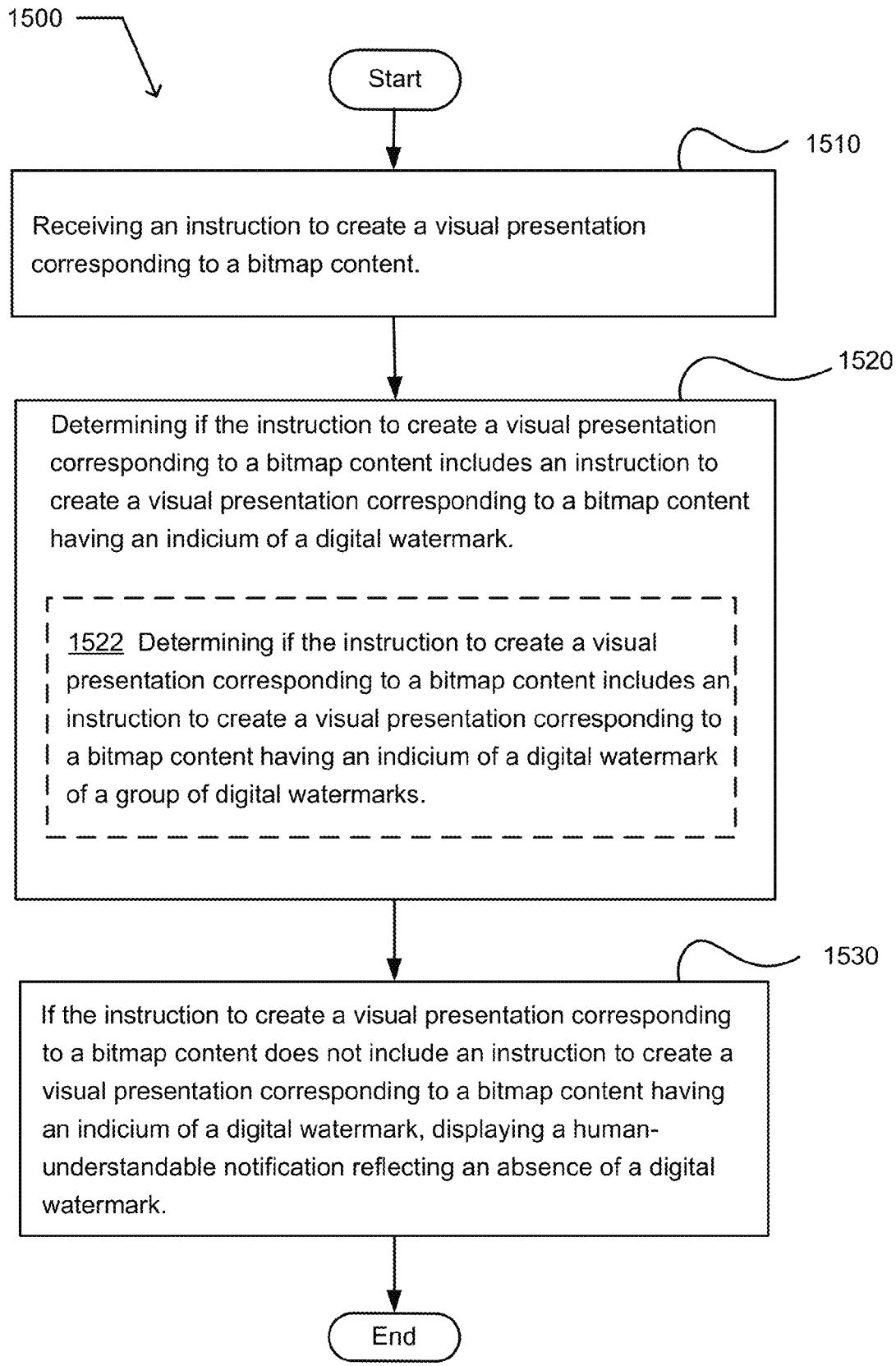
FIG. 41 illustrates an exemplary operational flow in which embodiments may be implemented.

FIG. 41 illustrates an exemplary operational flow 1500 in which embodiments may be implemented. After a start operation, the operational flow moves to an acquisition operation 1510. The acquisition operation receives an instruction to create a visual presentation corresponding to a bitmap content. An inspection operation 1520 determines if the instruction to create a visual presentation corresponding to a bitmap content includes an instruction to create a visual presentation corresponding to a bitmap content having an indicium of a digital watermark. If the instruction to create a visual presentation corresponding to a bitmap content does not include an instruction to create a visual presentation corresponding to a bitmap content having an indicium of a digital watermark, an effectuation operation 1530 displays a human-understandable notification reflecting an absence of a digital watermark. In an alternative embodiment, the inspection operation determines if the instruction to create a visual presentation corresponding to a bitmap content includes an instruction to create a visual presentation corresponding to a bitmap content having an indicium of a digital watermark of a group of digital watermarks.

Figure 42:
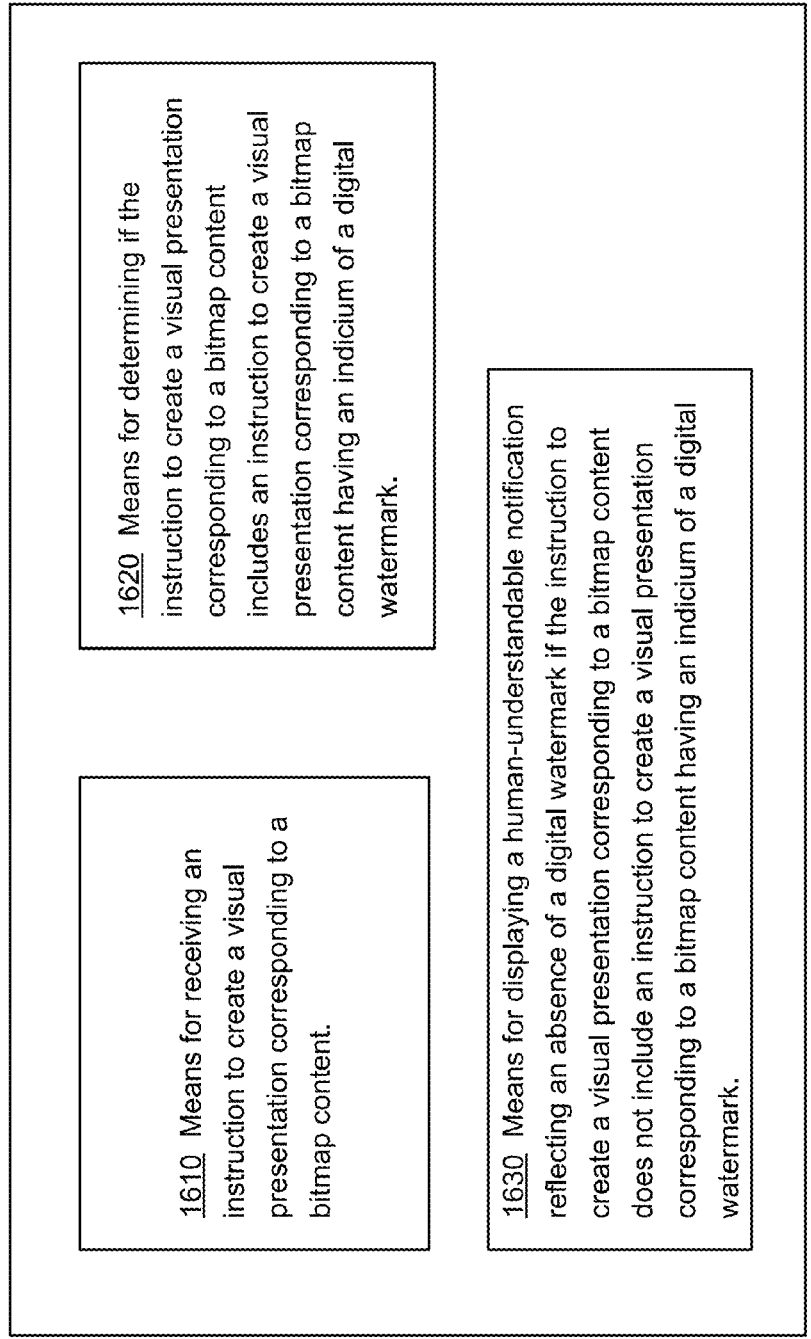
FIG. 42 illustrates an exemplary computing environment that may implement embodiments.

FIG. 42 illustrates an exemplary computing environment 1600 that may implement embodiments. The computing environment includes means 1610 for receiving an instruction to create a visual presentation corresponding to a bitmap content. The computing environment also includes means 1620 for determining if the instruction to create a visual presentation corresponding to a bitmap content includes an instruction to create a visual presentation corresponding to a bitmap content having an indicium of a digital watermark. The computing environment further includes means 1630 for displaying a human-understandable notification reflecting an absence of a digital watermark if the instruction to create a visual presentation corresponding to a bitmap content does not include an instruction to create a visual presentation corresponding to a bitmap content having an indicium of a digital watermark.

FIG. 43 illustrates a computer program product 1700 in which embodiments may be implemented. The computer program product includes a computer-readable signal-bearing medium 1705 bearing program instructions 1710. The program instructions are operable to perform a process in a computing device of a computing environment. The process includes receiving an instruction to create a visual presentation corresponding to a bitmap content. The processes also includes determining if the instruction to create a visual presentation corresponding to a bitmap content includes an instruction to create a visual presentation corresponding to a bitmap content having an indicium of a digital watermark. The process further includes displaying a human-understandable notification reflecting an absence of a digital watermark if the instruction to create a visual presentation corresponding to a bitmap content does not include an instruction to create a visual presentation corresponding to a bitmap content having an indicium of a digital watermark.

In another embodiment, the computer-readable signal-bearing medium 1705 includes a computer storage medium 1722. In a further embodiment, the computer-readable signal-bearing medium includes a communication medium 1724.

FIG. 44 illustrates an exemplary operational flow 1800 implemented in a computing environment that includes a system digital watermark. A human-perceptible manifestation of the system digital watermark is incorporatable in a displayable content provided by a program running in the computing environment. After a start operation, the operational flow includes an acquisition operation 1810. The acquisition operation receives digital data that includes an instruction to create a visual presentation corresponding to a bitmap. A decision operation 1820 determines if the instruction to create a visual presentation corresponding to a bitmap includes an instruction to create a visual presentation corresponding to a bitmap having an indicium of a digital watermark. If the decision operation determines that the instruction to create a visual presentation corresponding to a bitmap includes an instruction to create a visual presentation corresponding to a bitmap having an indicium of a digital watermark, the operational flow moves to an analysis operation 1830. Otherwise, the operational flow moves to an end operation.

At the analysis operation 1830, a correlation is established between the indicium of a digital watermark and the system digital watermark. The correlation may be established to any desired degree or measure. For example, a correlation may be established when there is an at least substantial correlation, i.e., such as a correspondence level of at least 50% between the indicium of a digital watermark and the system digital watermark. In another example, a correlation may be established when there is a confidence level of at least 30%. In another example, a correlation may be established when there is a correspondence level of at least 80% between the indicium of a digital watermark and the system digital watermark. A broadcast operation 1850 displays a human-understandable information responsive to the determined correlation between the indicium of the digital watermark and the system digital watermark. For example, the broadcast operation may display a dialog box indicating the digital data includes a visual presentation spoofing the system digital watermark. The operational flow the moves to the end operation.

FIG. 45 illustrates an alternative embodiment of the operational flow 1800 described in conjunction with FIG. 44. The analysis operation 1830 may include at least one additional operation. The at least one additional operation may include an operation 1832 and/or an operation 1834. The operation 1832 establishes a correlation between the indicium of a digital watermark and a system digital watermark personalized to a human user of the computing environment. The operation 1834 establishes a correlation between the indicium of a digital watermark and a human-perceptible system digital watermark.

FIG. 46 illustrates a further embodiment of the operational flow 1800 described in conjunction with FIG. 44. The analysis operation 1830 may include at least one additional operation. The at least one additional operation may include an operation 1836, an operation 1838, and/or an operation 1842. The operation 1836 establishes a correlation between the indicium of a digital watermark and a human-imperceptible system digital watermark. The operation 1838 establishes a correlation between the indicium of a digital watermark and at least one of a selected, a received, and/or a generated system digital watermark. The operation 1842 establishes a correlation between the indicium of a digital watermark and a digital watermark associated with a program running in the computing environment.

Figure 47:
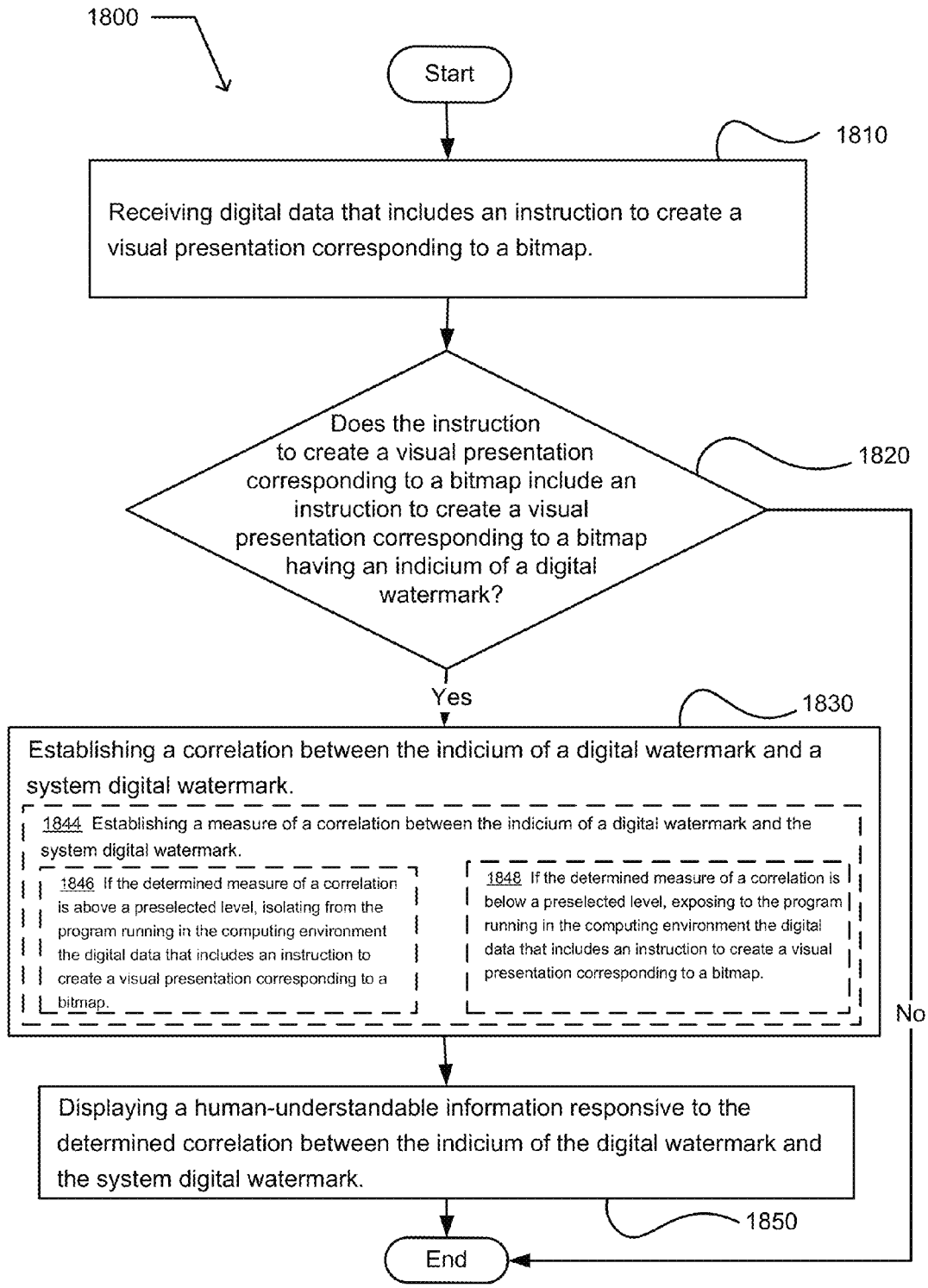
FIG. 47 illustrates another embodiment of the operational flow described in conjunction with FIG. 44.

FIG. 47 illustrates another embodiment of the operational flow 1800 described in conjunction with FIG. 44. The analysis operation 1830 may include at least one additional operation. The at least one additional operation may include an operation 1844. The operation 1844 establishes a measure of a correlation between the indicium of a digital watermark and the system digital watermark. The operation 1844 may include at least one additional operation. The at least one additional operation may include an operation 1846, and/or an operation 1848. The operation 1848 exposes to the program running in the computing environment the digital data that includes an instruction to create a visual presentation corresponding to a bitmap if the determined measure of a correlation is below a preselected level. The program may include an operating system and/or a production environment running in the computing environment. The operation 1846 isolating from the program running in the computing environment the digital data that includes an instruction to create a visual presentation corresponding to a bitmap if the determined measure of a correlation is above a preselected level.

FIG. 48 illustrates an exemplary computer program product 1900 in which embodiments may be implemented. The computer program product includes a computer-readable signal-bearing medium 1905 bearing program instructions 1910. The program instructions are operable to perform a process in a computing device. The process includes receiving digital data that includes an instruction to create a visual presentation corresponding to a bitmap. The process also includes determining if the instruction to create a visual presentation corresponding to a bitmap includes an instruction to create a visual presentation corresponding to a bitmap having an indicium of a digital watermark. If the instruction to create a visual presentation corresponding to a bitmap includes an instruction to create a visual presentation corresponding to a bitmap having an indicium of a digital watermark, the process establishes a correlation between the indicium of a digital watermark and a system digital watermark of a computing environment that includes the computing device. The process also displays a human-understandable information responsive to the determined correlation between the indicium of the digital watermark and the system digital watermark.

In an embodiment, the computer-readable signal-bearing medium 1905 includes a computer storage medium 1922. In another embodiment, the computer-readable signal-bearing medium includes a communications medium 1924.

Figure 49:
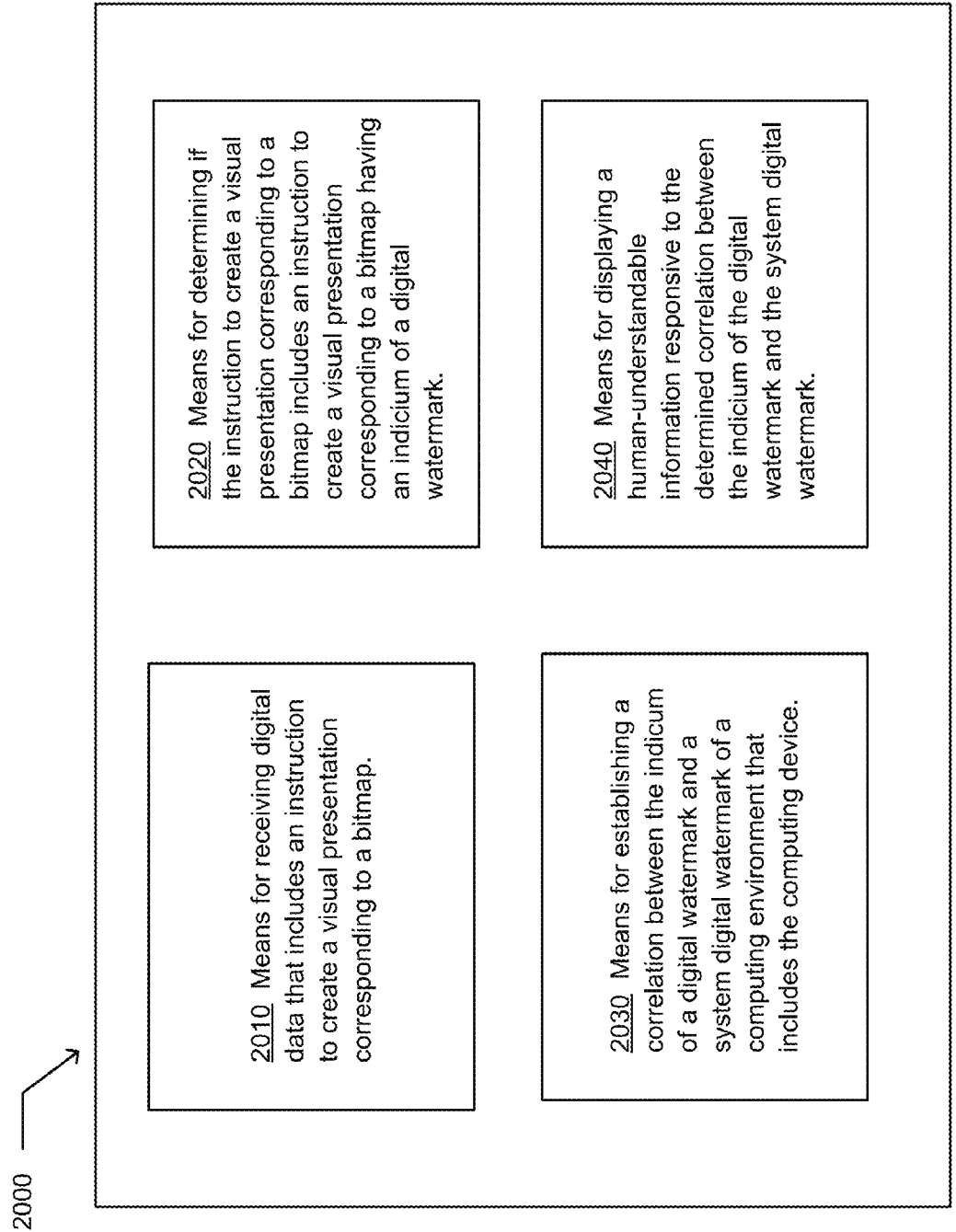
FIG. 49 illustrates an exemplary computing device that may implement embodiments.

FIG. 49 illustrates an exemplary computing device 2000 that may implement embodiments. The computing device includes means 2010 for receiving digital data that includes an instruction to create a visual presentation corresponding to a bitmap. The computing device also includes means 2020 for determining if the instruction to create a visual presentation corresponding to a bitmap includes an instruction to create a visual presentation corresponding to a bitmap having an indicium of a digital watermark. The computing device further includes means 2030 for establishing a correlation between the indicium of a digital watermark and a system digital watermark of a computing environment that includes the computing device. The computing device also includes means 2040 for displaying a human-understandable information responsive to the determined correlation between the indicium of the digital watermark and the system digital watermark.

It will be understood by those skilled in the art that the various components and elements disclosed herein and in the drawings, as well as the various steps and substeps disclosed herein and in the drawings, may be incorporated together in different combinations to implement embodiments and enhance possible benefits and advantages. The exemplary system, apparatus, and computer program product embodiment disclosed herein, including FIGS. 1, 18, 19, 32-35, 39-40, 42-43, and 48-49, along with other components, devices, know-how, skill, and techniques that are known in the art have a capability of implementing and practicing methods and process illustrated in FIGS. 2-17, 20-31, 36-38, 41, and 44-47. It is to be understood that the methods and processes can be incorporated in one or more different types of computer program products with a carrier medium having program instructions encoded thereon. However, it is to be further understood by those skilled in the art that other systems, apparatus, and technology may be used to implement and practice such methods and processes.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving a designation of an individualized digital identifier;
   associating, using a trusted program, a human-perceptible form of the designated individualized digital identifier with at least one pictorial element of a group of human-perceivable pictorial elements displayable by a display device,
   indicating with the display device the human-perceptible form of the designated individualized digital identifier in response a determination that the at least one pictorial element of the group of human-perceivable pictorial elements is associated with the individualized digital identifier;
   determining that another pictorial element of the group of human-perceivable pictorial elements is not associated with the individualized digital identifier in response to a scanning of at least one pictorial element of the group of human-perceivable pictorial elements for a presence of the designated individualized digital identifier; and
   indicating with the display device a human-understandable notification in response to the determining that the another pictorial element of the scanned one or more pictorial elements of the group of human-perceivable pictorial elements absent the presence of the designated individualized digital identifier is not associated with the individualized digital identifier,
   wherein at least one of receiving or associating is at least partially implemented using one or more processing devices executing at least the trusted program.

2. The method of claim 1, wherein determining that another element of the group of human-perceivable pictorial elements is not associated with the individualized digital identifier by scanning the another element of the group of human-perceivable pictorial elements for a presence of the designated individualized digital identifier; and indicating with the display device a human-understandable notification in response to a determination the determining that another pictorial element of the group of human-perceivable pictorial elements is not associated with the individualized digital identifier includes:

determining that another displayed element of the group of human-perceivable pictorial elements is not associated with the individualized digital identifier by scanning the another displayed pictorial element of the group of human-perceivable elements for a presence of the designated individualized digital identifier; and indicating with the display device a human-understandable notification in response to the determining that another displayed pictorial element of the group of human-perceivable pictorial elements is not associated with the individualized digital identifier.

3. A method, comprising:

receiving a designation of an individualized digital identifier;

restricting access to the designated individualized digital identifier to a trusted program;

embedding a human-perceptible form of the designated individualized digital identifier in at least one element of a group of human-perceivable elements displayable in a display device during execution of the trusted program, indicating via the display device the human-perceptible form of the designated individualized digital identifier in response a determination that the at least one element of the group of human-perceivable elements is embedded with the individualized digital identifier; and indicating via the display device a human-understandable notification in response to a determination that another element of the group of human-perceivable elements is not embedded with the individualized digital identifier by scanning the another element of the group of human-perceivable elements for a presence of the designated individualized digital identifier;

wherein at least one of receiving, restricting, or associating is at least partially implemented using one or more processing devices.

4. The method of claim 3, wherein receiving a designation of an individualized digital identifier includes:
receiving a designation of an individualized digital identifier from a human user.

5. The method of claim 3, wherein receiving a designation of an individualized digital identifier includes:
receiving a designation of an individualized digital identifier from a digital identifier generator.

6. The method of claim 3, wherein receiving a designation of an individualized digital identifier includes:
receiving a designation of an individualized digital identifier from a digital identifier selection algorithm.

7. The method of claim 3, wherein receiving a designation of an individualized digital identifier includes:
receiving a designation of an individualized digital identifier from an operating system.

8. The method of claim 3, wherein receiving a designation of an individualized digital identifier includes:
receiving a designation of an individualized digital identifier from the trusted program.

9. The method of claim 3, wherein receiving a designation of an individualized digital identifier includes:
receiving a designation of an individualized digital identifier from another program.

10. The method of claim 3, wherein receiving a designation of an individualized digital identifier includes:
receiving a designation of at least one individualized digital identifier useable in a visual display by the computing environment.

11. The method of claim 3, wherein receiving a designation of an individualized digital identifier includes:
receiving a designation of at least one individualized digital identifier useable in an audio display by the computing environment.

12. The method of claim 3, wherein receiving a designation of an individualized digital identifier includes:
receiving a designation of an at least relatively unique digital identifier.

13. The method of claim 3, wherein receiving a designation of an individualized digital identifier includes:
receiving a designation of a unique digital identifier.

14. The method of claim 3, wherein receiving a designation of an individualized digital identifier includes:
receiving a designation of an individualized digital identifier selected from a library of digital identifiers.

15. The method of claim 3, wherein receiving a designation of an individualized digital identifier includes:
receiving a designation of an individualized digital identifier received from a source.

16. The method of claim 3, wherein receiving a designation of an individualized digital identifier includes:
receiving a designation of a human-distinguishable individualized digital identifier selected by a human user.

17. The method of claim 3, wherein receiving a designation of an individualized digital identifier includes:
receiving a designation of an individualized digital identifier generated by a digital identifier generator module.

18. The method of claim 3, wherein receiving a designation of an individualized digital identifier includes:
receiving a designation of a machine-distinguishable individualized digital identifier.

19. The method of claim 3, wherein restricting access to the designated individualized digital identifier to a trusted program includes:
restricting the trusted program to at least one of a read, a write, or an update access to the designated individualized digital identifier.

20. The method of claim 3, wherein restricting access to the designated individualized digital identifier to a trusted program includes:
restricting access to the designated individualized digital identifier to a program trusted by an operating system running in the computing environment.

21. The method of claim 3, wherein restricting access to the designated individualized digital identifier to a trusted program includes:
restricting access to the designated individualized digital identifier to an application program having a trusted status.

22. The method of claim 3, wherein restricting access to the designated individualized digital identifier to a trusted program includes:
restricting access to the designated individualized digital identifier to an application granted an access right by at least one of a human user or an operating system.

23. The method of claim 3, wherein embedding a human-perceptible form of the designated individualized digital identifier in at least one element of a group of human-perceivable elements displayable in a display device during execution of the trusted program includes:
at least one of visually and proximately associating, or aurally and temporally embedding a human-perceptible form of the designated individualized digital identifier in at least one element of a group of human-perceivable elements displayable in a display device during execution of the trusted program.

24. The method of claim 3, wherein a human-perceptible form of the designated individualized digital identifier in at least one element of a group of human-perceivable elements displayable in a display device during execution of the trusted program includes:
  embedding a human-perceptible form of the designated individualized digital identifier with at least one element of a group of human-perceivable elements displayable in a display device during execution of the trusted program, the group of human-perceivable elements including at least one of: a group of windows, a group a content type, a group of a streaming content type, a group of a presentation type, a group of facsimiles, a group of avatars, a group of gifs, a group of buttons, or a group of bitmaps.

25. The method of claim 3, wherein embedding a human-perceptible form of the designated individualized digital identifier in at least one element of a group of human-perceivable elements displayable in a display device during execution of the trusted program includes:
  embedding a human-perceptible form of the designated individualized digital identifier in at least one element of a group of human-perceivable elements displayable in a display device during execution of the trusted program.

26. The method of claim 3, further comprising: scanning an element displayed for a presence of the designated individualized digital identifier; and
  broadcasting a human recognizable notification if the designated individualized digital identifier is not present within the displayed element.

27. The method of claim 3, wherein the individualized digital identifier includes a digital watermark.

28. The method of claim 27, wherein indicating with the display device the human-understandable notification in response to a determination that the another element of the group of human-perceivable elements is not embedded with the individualized digital identifier includes:
  indicating with the display device the human-understandable notification in response to a determination made by scanning the another element of the group of human-perceivable elements that the another element of the group of human-perceivable elements is not embedded with the digital watermark.

29. The method of claim 3, wherein the group of human-perceivable elements displayable and the at least one element are human-perceivable pictorial elements that include at least one of a picture or an icon.

30. The method of claim 29, wherein the determination that the at least one pictorial element of the group of human-perceivable elements is embedded with the individualized digital identifier is in response to a selection of the at least one pictorial element via the display device.

31. The method of claim 29, wherein the scanning of one or more pictorial elements of the group of human-perceivable elements for the presence of the designated individualized digital identifier is in response to a selection of at least one pictorial element via the display device.

32. An apparatus, comprising:
  at least one non-transitory medium bearing at least:
    one or more instructions for receiving a designation of an individualized digital identifier;
    one or more instructing for limiting access to the designated individualized digital identifier to an application programming interface callable by a privileged code;
    one or more instructing for embedding a human-perceptible form of the designated individualized digital identifier in at least one element of a group of pictorial elements displayable via a display device;
    one or more instructing for indicating via the display device the human-perceptible form of the designated individualized digital identifier in response a determination that the at least one element of the group of human-perceivable pictorial elements is embedded with the individualized digital identifier; and
    one or more instructing for indicating via the display device a human-understandable notification in response to a determination that another element of the group of human-perceivable pictorial elements is not embedded with the individualized digital identifier by scanning the another element of the group of human-perceivable pictorial elements for a presence of the designated individualized digital identifier.

33. The apparatus of claim 32, wherein the one or more instructions for receiving a designation of an individualized digital identifier includes:
  one or more instructions for receiving a designation of at least one of an individualized digital visual identifier or an individualized digital audio identifier.

34. The method of claim 3, wherein indicating via the display device a human-understandable notification includes:
  indicating an absence of a designated individualized digital identifier in response to a determination that another element of the group of human-perceivable elements is not embedded with the individualized digital identifier.

* * * * *